US012449062B2

(12) United States Patent
Jelken et al.

(10) Patent No.: US 12,449,062 B2
(45) Date of Patent: Oct. 21, 2025

(54) METHODS AND APPARATUS TO ANALYZE VALVE CHARACTERISTICS

(71) Applicant: Fisher Controls International LLC, Marshalltown, IA (US)

(72) Inventors: Shannon Jelken, Marshalltown, IA (US); John Fuller, Marshalltown, IA (US); Bret Dahme, Tama, IA (US); Aaron Shelly, Mount Healthy, OH (US)

(73) Assignee: Fisher Controls International LLC, Marshalltown, IA (US)

( * ) Notice: Subject to any disclaimer, the term of this patent is extended or adjusted under 35 U.S.C. 154(b) by 429 days.

(21) Appl. No.: 18/056,451

(22) Filed: Nov. 17, 2022

(65) Prior Publication Data
US 2024/0167583 A1 May 23, 2024

(51) Int. Cl.
*G06F 11/30* (2006.01)
*F16K 37/00* (2006.01)

(52) U.S. Cl.
CPC .............................. *F16K 37/0083* (2013.01)

(58) Field of Classification Search
CPC .................................................. F16K 37/0083
See application file for complete search history.

(56) References Cited

U.S. PATENT DOCUMENTS

2012/0139725 A1\* 6/2012 Grumstrup .......... F16K 37/0091
702/183
2012/0274333 A1\* 11/2012 Anderson ............ G01N 29/348
324/511

OTHER PUBLICATIONS

Guo et al., "Wind Turbine Gearbox Conditioning Monitoring with AAKR and Moving Window Statistic Method," Energies, vol. 4, Nov. 23, 2011, 17 pages (Year: 2011).\*
Guo et al., "Wind Turbine Gearbox Condition Monitoring with AAKR and Moving Window Statistic Methods," Energies, vol. 4, Nov. 23, 2011, 17 pages.

\* cited by examiner

*Primary Examiner* — Phuong Huynh
(74) *Attorney, Agent, or Firm* — Hanley, Flight & Zimmerman, LLC

(57) ABSTRACT

Methods and apparatus to analyze valve characteristics are disclosed. A disclosed example apparatus to determine at least one characteristic of a valve includes at least one memory, machine readable instructions, and processor circuitry to at least one of instantiate or execute the machine readable instructions to partition a valve stroke curve of the valve to define bins thereof, the valve stroke curve corresponding to stroke data of the valve, filter data points associated with a seat contact portion of the valve stroke curve, fit curves of the bins to define fitted curves, and characterize a seat contact of the valve based on the fitted curves.

21 Claims, 50 Drawing Sheets

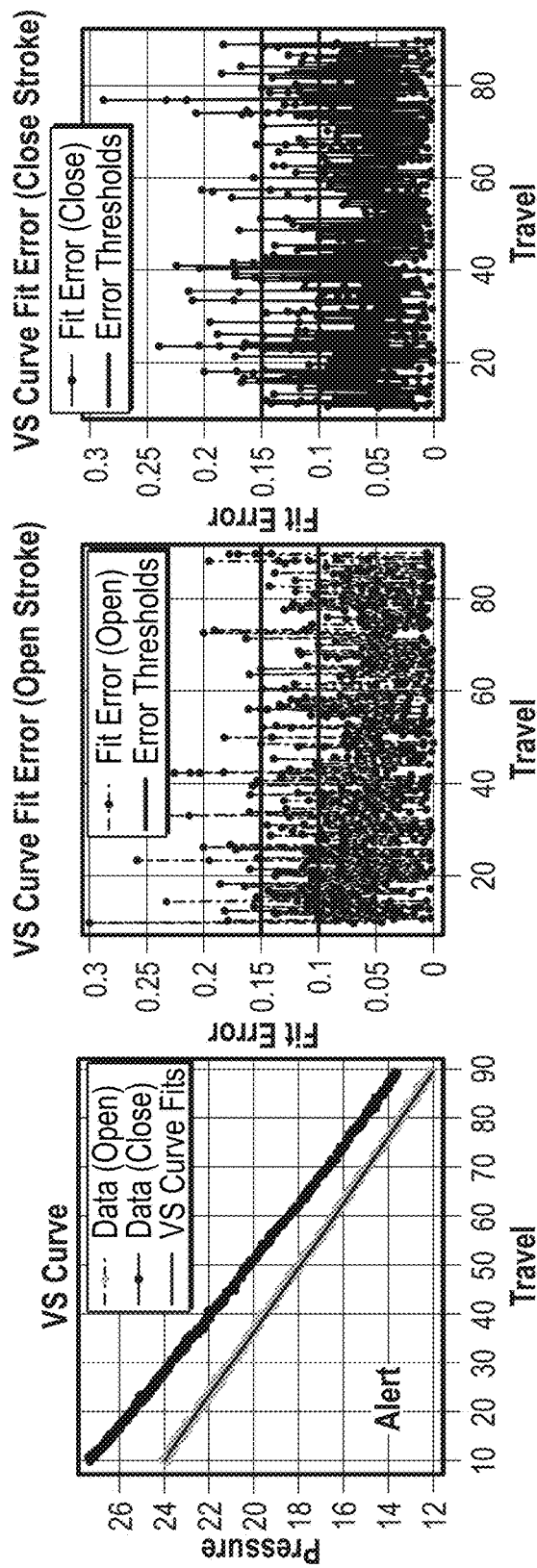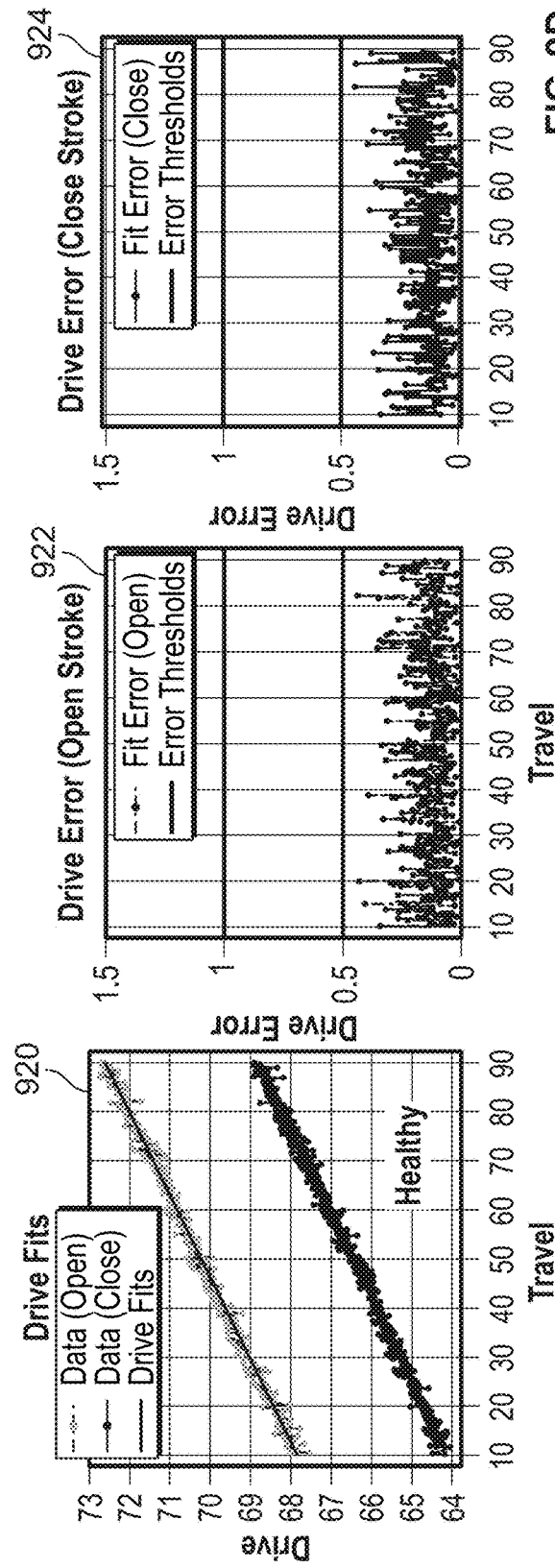
FIG. 9C
FIG. 9D

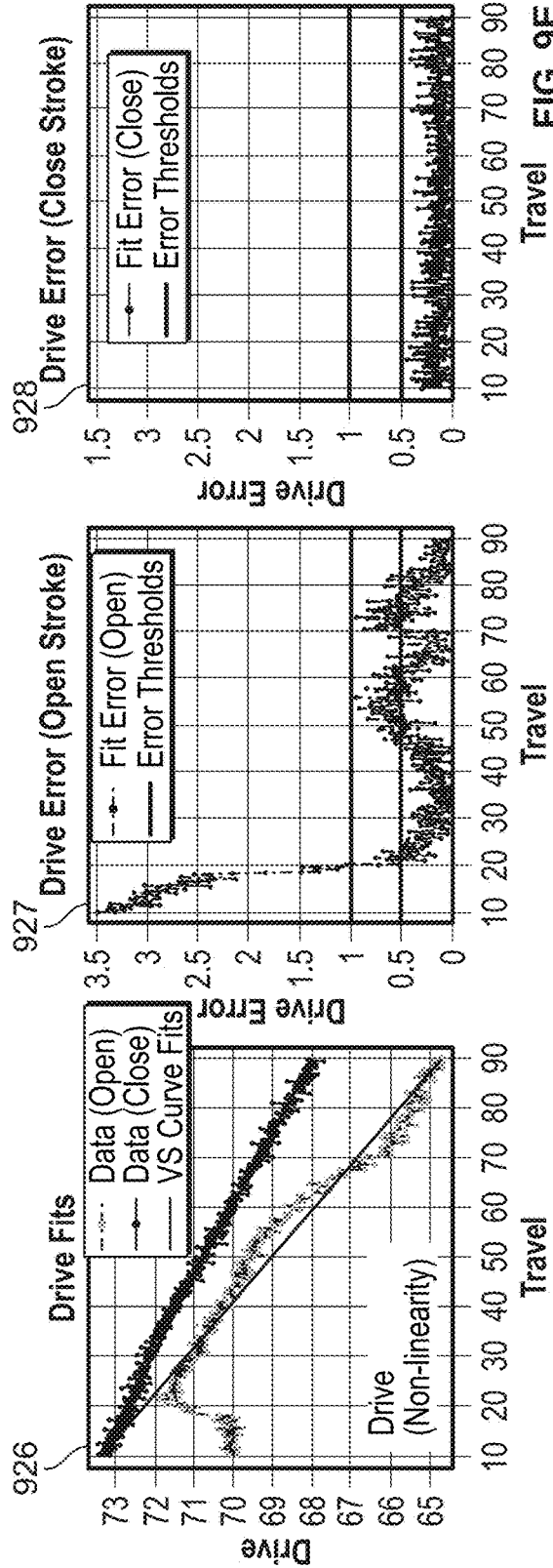
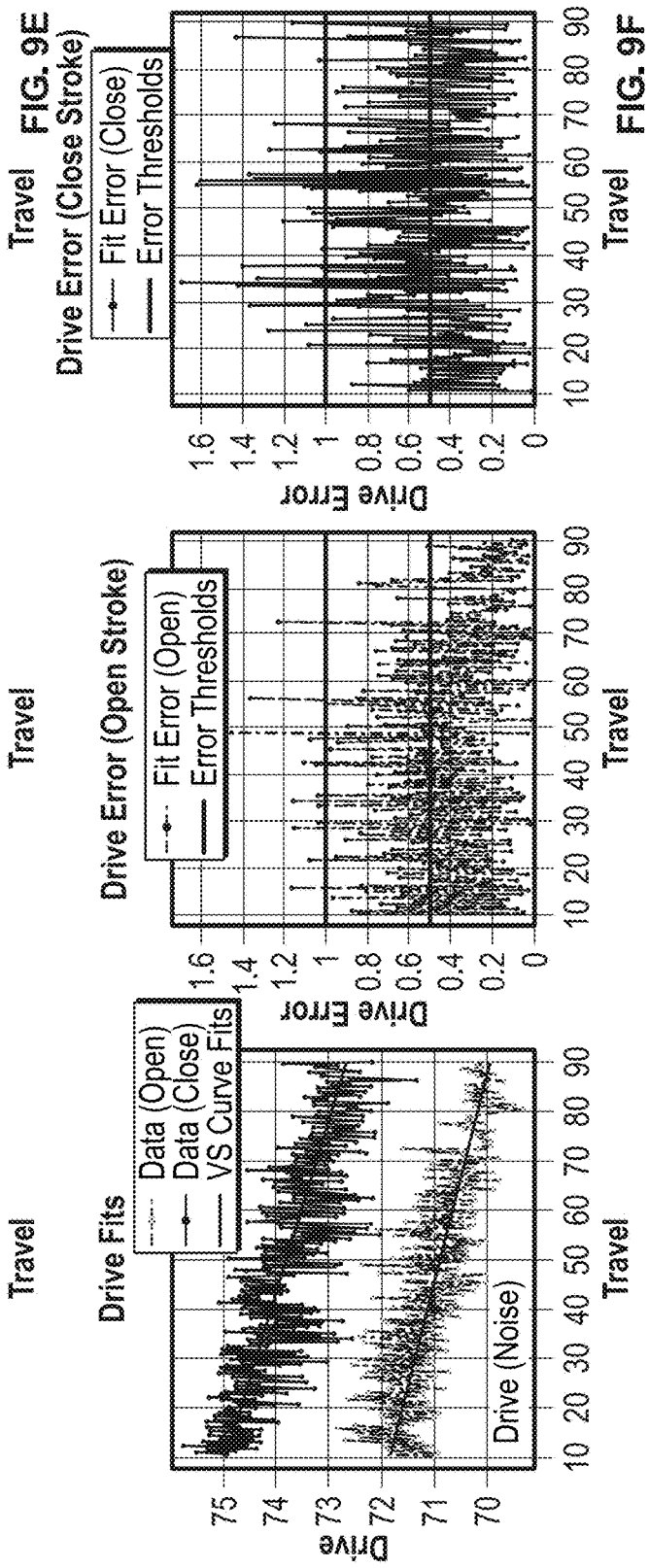

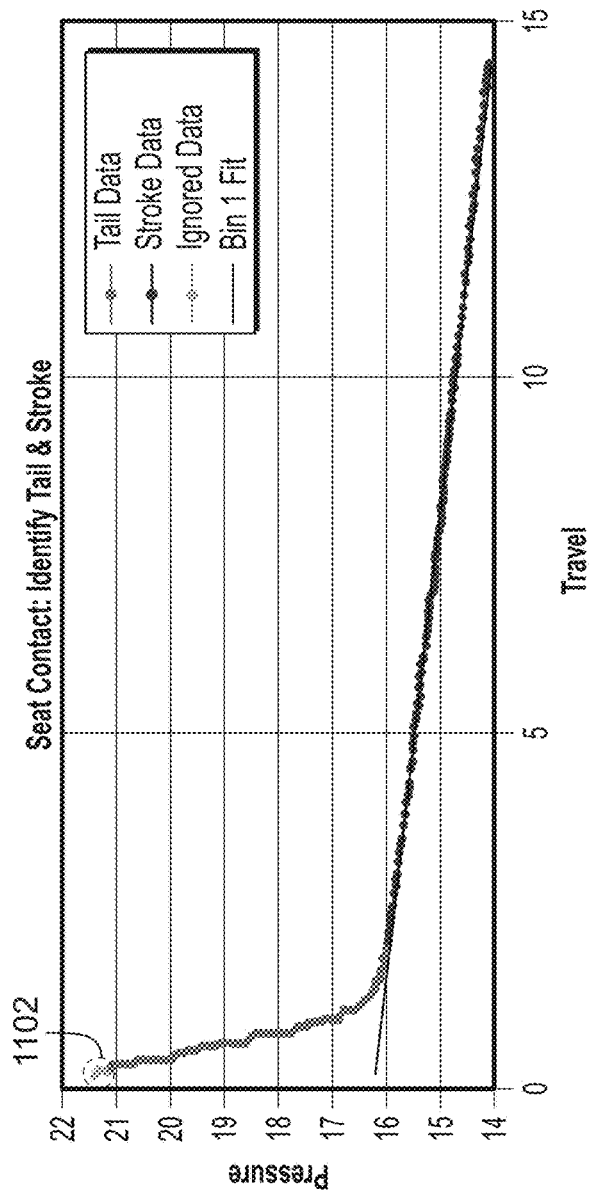
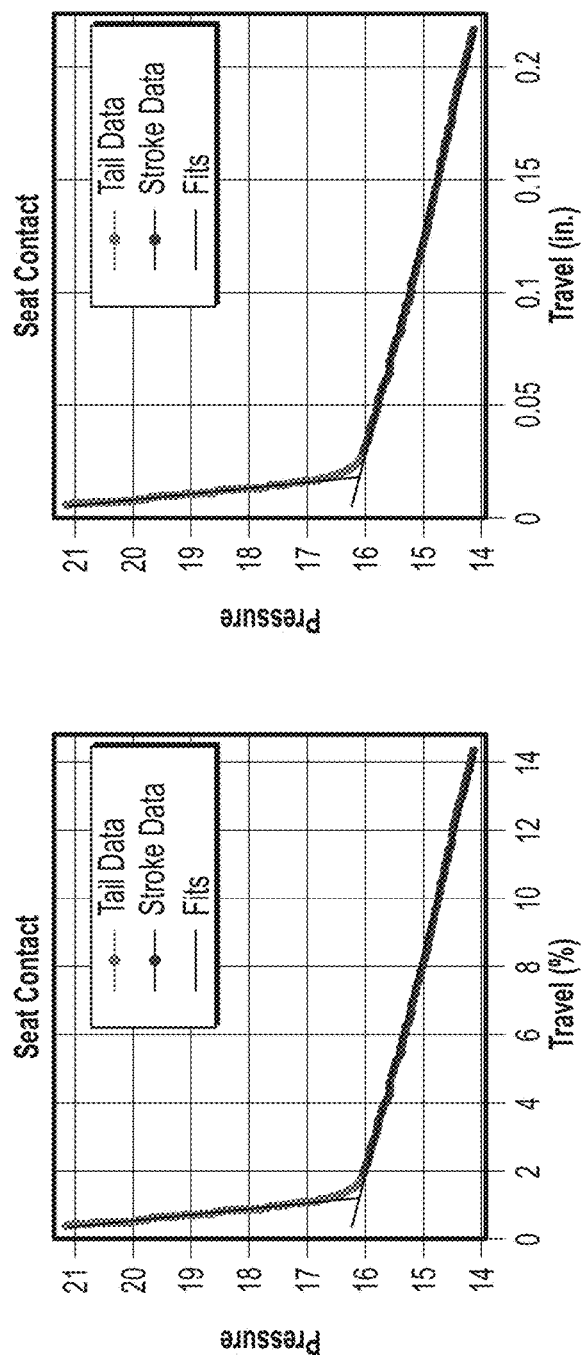
FIG. 11C
FIG. 11D

METHODS AND APPARATUS TO ANALYZE VALVE CHARACTERISTICS

FIELD OF THE DISCLOSURE

This disclosure relates generally to process control devices and, more particularly, to methods and apparatus to analyze valve characteristics.

BACKGROUND

In recent years, industrial plants and manufacturers have developed and implemented valve controllers for production and workflow control. These known valve controllers monitor and control fluid valves to govern process fluids (e.g., natural gas, water, etc.) within a process control system. In particular, the controlled valves vary flow of the process fluids by moving or displacing flow control members, such as valve plugs, via actuators based on settings and/or parameters that may be manually programmed. Such flow control members have associated implementation and/or design parameters, such as seating forces/torques, breakout forces/torques, breakout times, etc. These parameters are typically determined or calculated based on manual measurements, which can be time consuming and/or labor intensive to perform.

SUMMARY

An example apparatus to determine at least one characteristic of a valve includes at least one memory, machine readable instructions, and processor circuitry to at least one of instantiate or execute the machine readable instructions to partition a valve stroke curve of the valve to define bins thereof, the valve stroke curve corresponding to stroke data of the valve, filter data points associated with a seat contact portion of the valve stroke curve, fit curves of the bins to define fitted curves, and characterize a seat contact of the valve based on the fitted curves.

An example non-transitory machine readable storage medium comprising instructions that, when executed, cause processor circuitry to at least partition a valve stroke curve of a valve to define bins of the valve stroke curve, the valve stroke curve corresponding to stroke data of the valve, filter data points associated with a seat contact portion of the valve stroke curve, fit curves of the bins to define fitted curves, and characterize a seat contact of the valve based on the fitted curves.

An example method includes partitioning, by executing instructions with processor circuitry, a valve stroke curve of a valve to define bins of the valve stroke curve, the valve stroke curve corresponding to stroke data of the valve, filtering, by executing instructions with the processor circuitry, data points associated with a seat contact portion of the valve stroke curve, fitting, by executing instructions with the processor circuitry, curves of the bins to define fitted curves, and characterizing, by executing instructions with the processor circuitry, a seat contact of the valve based on the fitted curves.

BRIEF DESCRIPTION OF THE DRAWINGS

FIGS. 9A-9I illustrate example feature extraction and/or health information determination that can be implemented in examples disclosed herein.

FIGS. 11A-11E illustrate an example angle fit analysis that can be implemented in examples disclosed herein.

Figure 1A:
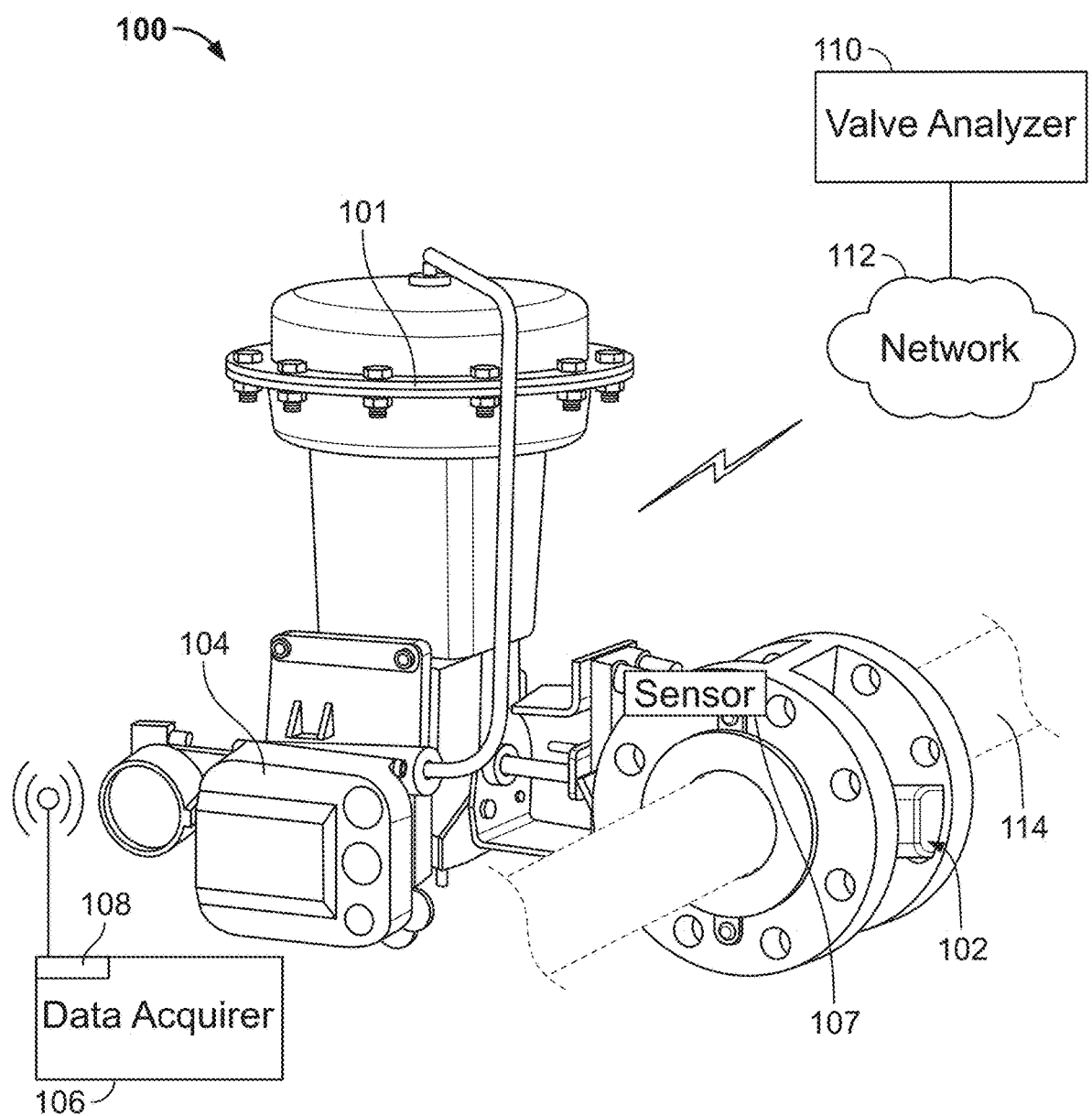
FIG. 1A is an example process control analysis system in which examples disclosed herein can be implemented.

As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs).

As used herein, the terms "valve stroke curve," "valve signature curve" and "valve stroke data" refer to data corresponding to a valve that relates resultant behavior as a flow control member is moved through its range of motion relative to a valve seat (e.g., from a closed stop to its travel stop). As used herein, the term "valve" refers to a device, system, component and/or assembly that moves a sealing member to vary an amount of fluid flowing through a portion of a flow channel or other fluid conduit. Accordingly, the term "valve" can refer to an actuator along with a flow control member (e.g., a seating member) that varies an amount of fluid moving through the flow channel. As used herein, the term "seating point" refers to a position in which a valve flow control member (e.g., a valve plug, a movable plug, etc.) is considered to have begun contact and/or engaged a valve seat of the valve. As used herein, the term "breakout point" refers to a position in which the flow control member has left and/or begun to leave an end of travel corresponding to the closed position and/or disengages from the valve seat. As used herein, the term "bench set" refers to a characteristic and/or behavior of a valve that are independent of friction and/or friction effects. Accordingly, the term "bench set" can refer to characteristics of a valve that defines the endpoints of a range over which the valve will stroke independent of friction.

DETAILED DESCRIPTION

Apparatus and methods to characterize control valves are disclosed. Industrial plants and manufacturers typically utilize valves to control process fluids (e.g., natural gas, water, etc.) within a process control system. Often, these valves are controlled by valve controllers that have sensors (e.g., flow meters, hall effect sensors, etc.) to monitor parameters associated with these valves, such as flow rates, positions of valve plugs, etc. To control movement of the process fluids, these conventional valve controllers move (e.g., move via an actuator) a flow control member or plug between an open position and a closed position relative to a valve seat at least partially based on the monitored parameters. Movement of the aforementioned flow control member is typically governed by parameters and/or settings that that can be part of the design/configuration and/or programmed into a valve controller, which may include a seating force, a breakout force, a breakout time, etc. However, the process to determine, set and/or adjust these parameters may necessitate manual labor and time including determining a seating point and a breakout point associated with the valves. Further, manual determination(s) and/or adjustment(s) may be subject to operator error and/or inaccuracies.

Examples disclosed herein can determine and/or characterize a valve via movement of a flow control member (e.g., a valve plug, a valve member, a disk, a ball, a needle, etc.) between a seating point and a travel limit associated with the valve. The seating point and travel limit behavior of the valve can be characterized and/or determined to facilitate effective control of the valve. For example, the characterization of the valve may be utilized for programming associated valve controllers to control movement of the flow control member between the seating point and the travel limit. Examples disclosed herein can enable feature extraction of the valve, thereby reducing commissioning time and the associated costs of determining feature(s) of the valve. Examples disclosed herein can also effectively determine a health and/or operational condition of the valve, all of which can be utilized to prompt servicing of the valve prior to the valve malfunctioning and/or operating out of operational specifications, thereby reducing any significant downtime of the valve, for example.

Examples disclosed herein characterize operation of a valve (e.g., a sliding stem valve, a rotary valve, etc.) by portioning, binning and/or segmenting a valve stroke curve (e.g., a valve signature curve) corresponding to stroke data of the flow control member of the valve (e.g., stroke data between open and closed states of the valve) to define bins or segments of the valve stroke curve. In particular, according to examples disclosed herein, travel edges are determined based on the stroke data, data points corresponding to the travel edges are filtered, and the data analyzed based on the bins and/or filtered data to define fitted curves (e.g., fitted curve segments, linear line segments, curved segments). According to examples disclosed herein, the curves are fit utilizing data points of at least one bin of the valve stroke curve. As a result, at least one characteristic and/or operational condition of the valve (e.g., whether the valve is at a normal operating condition, a warning operating condition or an alert operating condition, etc.) is determined based on the fitted curves. In some examples, the curves include bins/segments that are fit with a linear fit. The curves may or may not be separated by gaps therebetween. Additionally or alternatively, the curves may include curved segments that are fit with a polynomial or quadratic function. According to examples disclosed herein, errors and/or residuals associated with fits of the curves are utilized to determine the operating condition (e.g., the health) of the valve.

In some examples, a valve stroke curve (e.g., a valve signature curve) is generated. In some examples, bench set data may be determined, characterized and/or generated based on at least one fitted curve at or proximate endpoints of the valve stroke curve. Additionally or alternatively, residuals (e.g., residual errors) of the curve fits are utilized to indicate and/or determine a health of the valve. In some such examples, residuals exceeding a threshold residual value can indicate that the valve is due for service and/or replacement (e.g., immediate replacement). In some examples, an operational life of the valve is predicted and/or determined based on the fitted curves. In some examples, bins/segments are fit with a curve fit, such as a polynomial fit or a quadratic function fit. In some such examples, the operational life of the valve can be predicted based on a curve fit error. In some examples, tail bins and stroke bins of the valve stroke curve are determined and/or characterized. For example, highly accurate portions of both ends of the valve stroke curve can be generated (e.g. graphed, charted, etc.) for characterization of the valve.

In some examples, features of the valve are determined and/or extracted for control and/or setup of an actuator that moves and/or adjusts a position of the flow control member relative to the aforementioned valve seat. For example, bench sets (e.g., lower and upper bench set data) can be determined. In some such examples, the bench set is determined from the data in the bins associated with an end of the valve stroke curve. Additionally or alternatively, in some examples, aspects of the seat contact (e.g., seat contact distance, seat contact angle, etc.) are characterized.

In some examples, a health and/or health index of the valve is determined and transmitted via a network (e.g., to signal that the valve is healthy or due for service or replacement). This determination of the health may be based on curve fit errors associated with the bins. Additionally or alternatively, examples disclosed can instruct the valve and/or associated hardware to move the valve control member in a stroke motion to gather data associated with characteristics (e.g., unique characteristics) and/or properties of the valve.

FIG. 1A is an example process control analysis system 100 in which examples disclosed herein can be implemented. As can be seen in the illustrated example of FIG. 1A, the process control analysis system 100 includes an actuator 101, and a valve 102 with a controller/positioner 104. In turn, the example controller 104 include a data acquisition system 106, at least one sensor (e.g., a Hall effect sensor, a pressure sensor, etc.) 107 and a transceiver 108, which is communicatively coupled to a valve analyzer 110 via a wired or wireless network 112. In some other examples, the valve analyzer 110 is part of the valve 102, the controller 104 and/or the actuator 101. Further, the valve 102 is operatively coupled to a fluid channel 114.

In operation, the valve 102 of the illustrated example is controlled and/or directed to vary a degree of fluid moving through the fluid channel 114. In particular, movement of an example valve flow control member 122 shown in FIG. 1B causes an opening of the fluid channel 114 to be opened or closed. In some examples, a variable degree to which the fluid channel 114 enables fluid to move therethrough is controlled. In other words, some examples disclosed herein enable a flow between fully opened and fully closed states of the valve 102 (e.g., a partially open state of the valve 102).

To characterize and/or determine an operational status of the valve 102, the actuator 101 is driven to move the valve 102 through an entire operational range of movement and, in turn, data regarding operation of the valve 102 and/or the actuator 101 is obtained via at least one of the sensors 107. In turn, a valve stroke curve or valve signature curve is generated from the aforementioned data, the data is filtered and separated into bins that are fit to curves (e.g., linear curves, quadratic curves, etc.) for characterization of the valve 102 and/or the actuator 101.

Figure 1B:
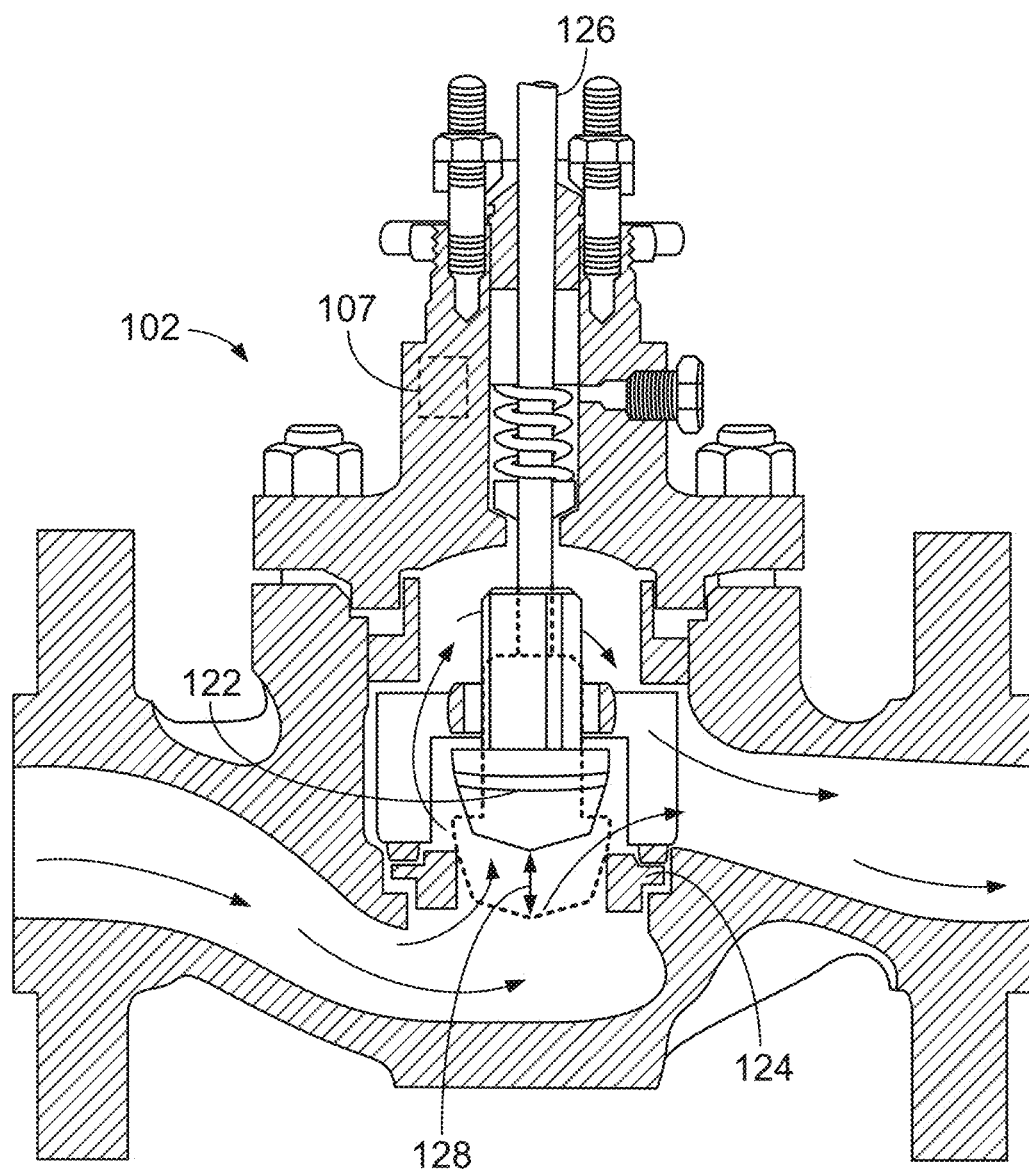
FIG. 1B depicts a cross-sectional view of an example valve for which examples disclosed herein can be implemented.

FIG. 1B depicts a detailed cross-sectional view of the example valve 102 (shown in FIG. 1A) with the aforementioned flow control member 122 disposed within a fluid chamber thereof. According to the illustrated example, the flow control member 122 may be any suitable valve plug (e.g., a cylindrical plug, a conical plug, a tapered plug, etc.) that varies an amount of flow of the process fluid moving through the valve 102 when the flow control member 122 is moved relative to (e.g., toward and/or away from) a valve seat 124 via movement of a valve stem 126. In particular, the example flow control member 122 moves along a direction generally indicated by a double arrow 128 between an open position and a closed position of the valve 102, both of which are shown in FIG. 1B for clarity. In the illustrated example of FIG. 1B, when the flow control member 122 is in the closed position (represented by the dotted/dashed lines of FIG. 1B), the flow control member 122 contacts and/or engages the valve seat 124, thereby significantly reducing or preventing flow of the process fluid.

As described above in connection with FIG. 1A, the sensor 107 of the valve 102 detects a position, a change in the position and/or displacement of the flow control member 122. Additionally or alternatively, an additional sensor measures a pressure and/or force associated with flow control member 122 as the flow control member 122 is moved. In this example, the sensor 107 measures position(s) of the flow control member 122 and/or associated pressure(s) corresponding to the open position and/or the closed position. In other examples, at least one of the sensors 107 measures actuator pressure for use in determining force applied to a valve plug or flow control member. Additionally or alternatively, at least one of the sensors 107 is implemented as a flow rate and/or a fluid flow sensor. In some examples, data during normal operation of the valve 102 is utilized to generate valve stroke curves. In other words, examples disclosed herein may utilize data obtained during normal operation of the valve 102.

Operation and control of the valve 102 is at least partially dependent on a seating point and/or a breakout/breakaway point associated with the valve 102. For example, a force sufficient to move the flow control member 122 to the seating point in which the flow control member 122 is considered to have begun contact and/or engaged the valve seat 124 in the closed position may be determined to control movement of the flow control member 122. Likewise, a force sufficient to move the flow control member 122 from the breakout point at which the flow control member 122 has begun to separate from an end of travel and/or disengage from closure against the valve seat 124 (e.g., the flow control member 122 leaves from an extreme closure position) may be determined to govern movement of the flow control member 122. According to some examples disclosed herein, information and/or characteristics regarding the valve 102 can be effectively and accurately determined based on data (e.g., pressure data, force data, displacement data, etc.) associated with displacement and/or movement of the flow control member 122. For example, a health and/or an operational status of the valve 102 can be obtained based on data corresponding to movement of the flow control member 122.

While the examples of FIGS. 1A and 1B are shown in the context of a sliding stem valve, examples disclosed herein can be implemented in any appropriate other type of valve including, but not limited to, rotary valves, vee-ball valves, ball valves, butterfly valves, etc. Even further, examples disclosed herein can be applied to any appropriate object that moves in a sealing or closure action.

Figure 2A:
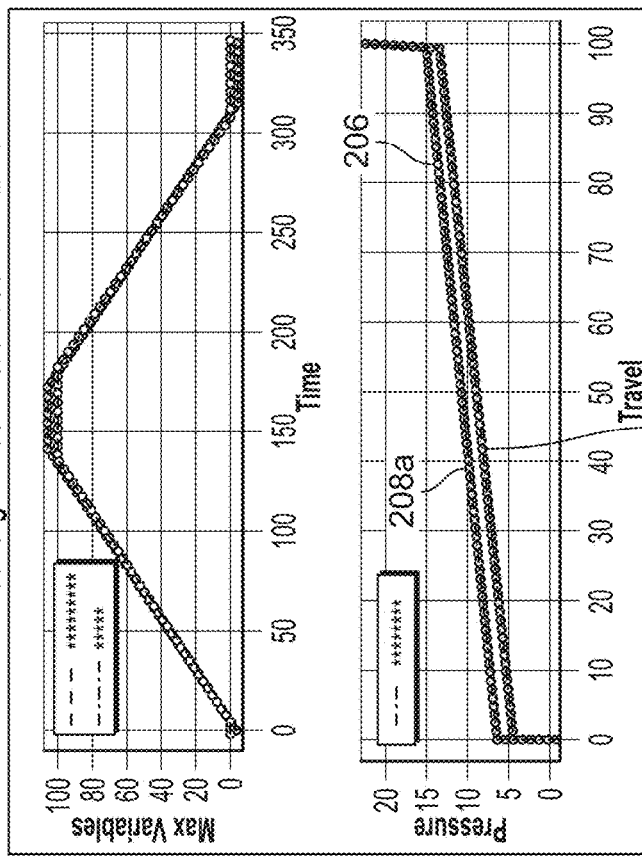
FIGS. 2A and 2B depict an overview of an example analysis that can be performed in accordance with teachings of this disclosure.
Figure 2A:
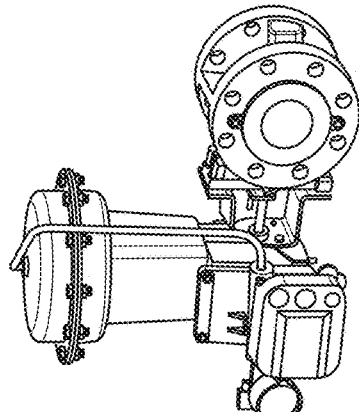
Figure 2A:
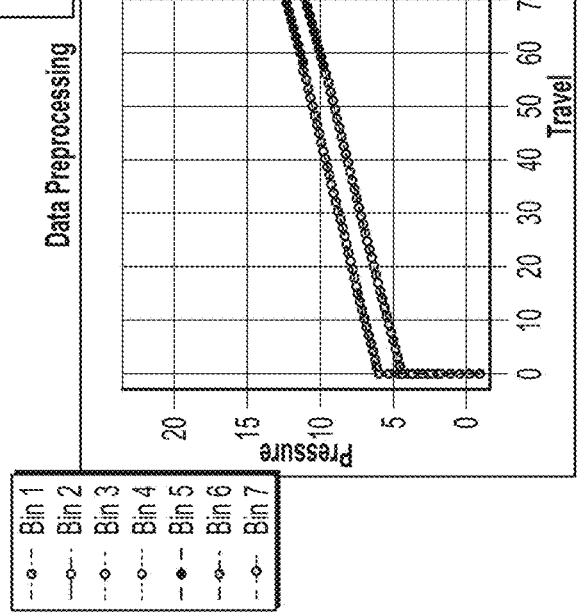
Figure 2A:
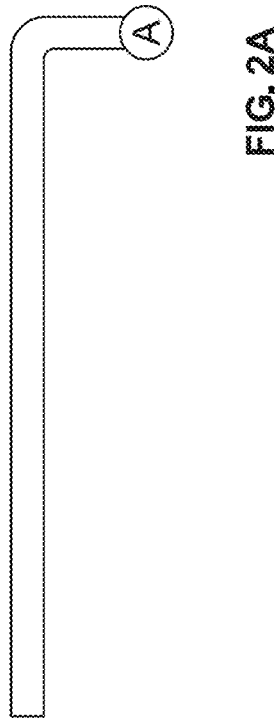
Figure 2B:
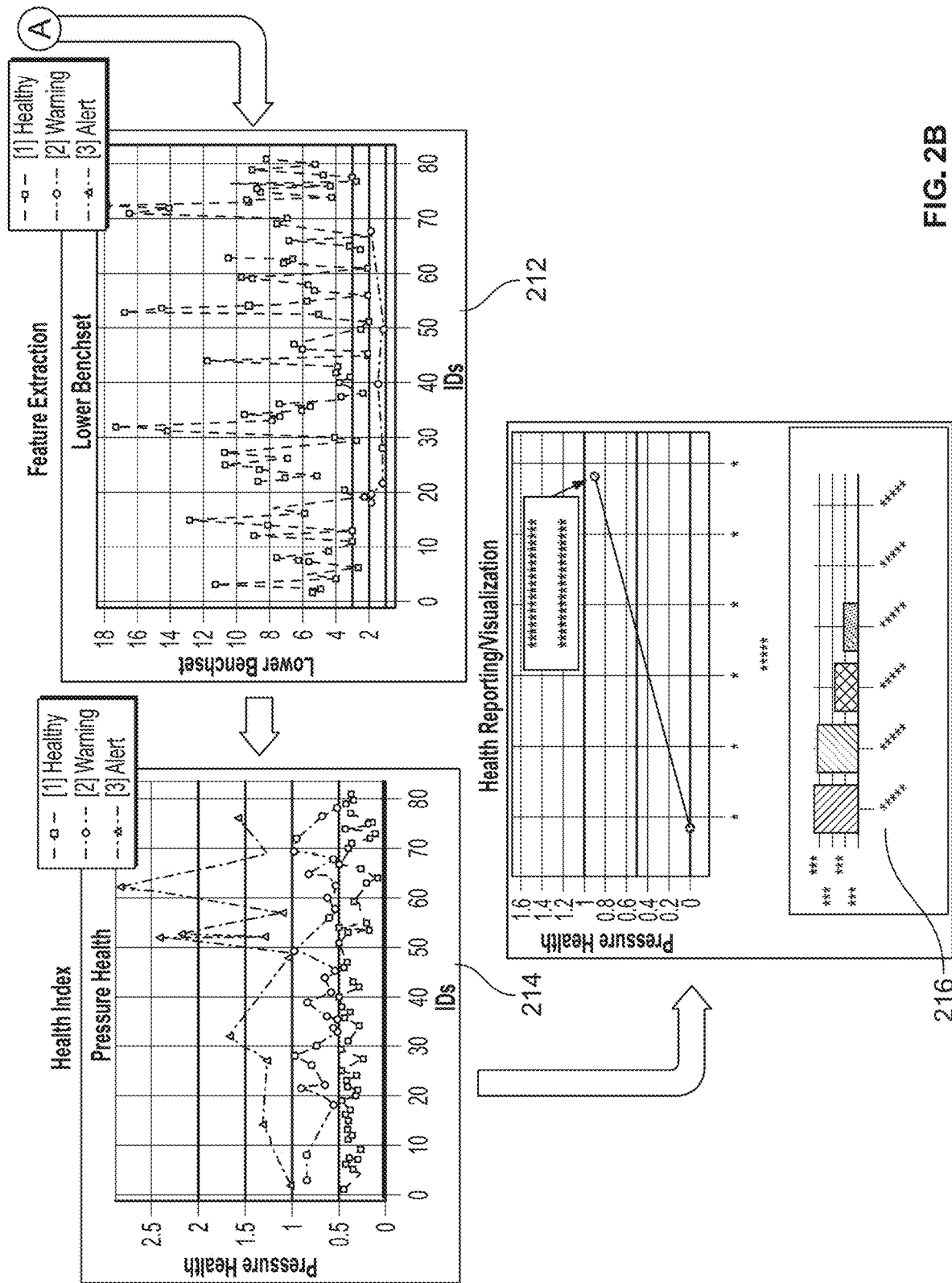

FIGS. 2A and 2B depict an overview of an example analysis that can be performed in accordance with examples disclosed herein. According to examples disclosed herein, at step 202, data is obtained from the valve 102 (e.g., via the sensor(s) 107) shown in FIGS. 1A and 1B. In this example, the data pertains to and/or includes valve stroke data of the valve 102 corresponding to a full opening and closure cycle thereof. At step 204, the aforementioned data can be organized and visualized. In this example, a valve stroke curve 206 relates pressure (y-axis) to travel (x-axis), and includes an opening portion 208*a* and a closing portion 208*b*. At step 210, data pre-processing is performed on the valve stroke data. According to examples disclosed herein, the valve stroke curve and/or data is separated into bins (e.g., segments, a bin corresponding to a seat/exit approach, a bin corresponding to a travel stop exit/approach, a bin corresponding to the travel stroking region, etc.). In some examples, at least some data points corresponding to the valve stroke curve 206 is filtered. In turn, curves are fit based on the individual bins and/or subdivided segments of the bins.

At step 212, features are extracted from the pre-processed data mentioned above in connection with the step 210. For example, aspects that characterize operational parameters of the valve 102, including but not limited to, bench set bench set information, friction, spring rate, drive range, seat contact characteristics, travel end (tail) behavior, seat contact distance, etc., can be accurately determined by examples disclosed herein.

At step 214, according to some examples disclosed herein, a health index of the valve 102 is determined based on analysis of the pre-processed data (e.g., the filtered pre-processed data). In some such examples, the health index can be associated with and/or utilized to determine a predicted operational life of the valve 102. In some examples, the health index can indicate and/or correspond to a "drift" over time (e.g., over an operational life) of an operation of the valve 102.

At step 216, in some examples, health reporting and/or visualization can be provided and/or generated based on the aforementioned pre-processed data and/or health indices associated with step 214.

Figure 3:
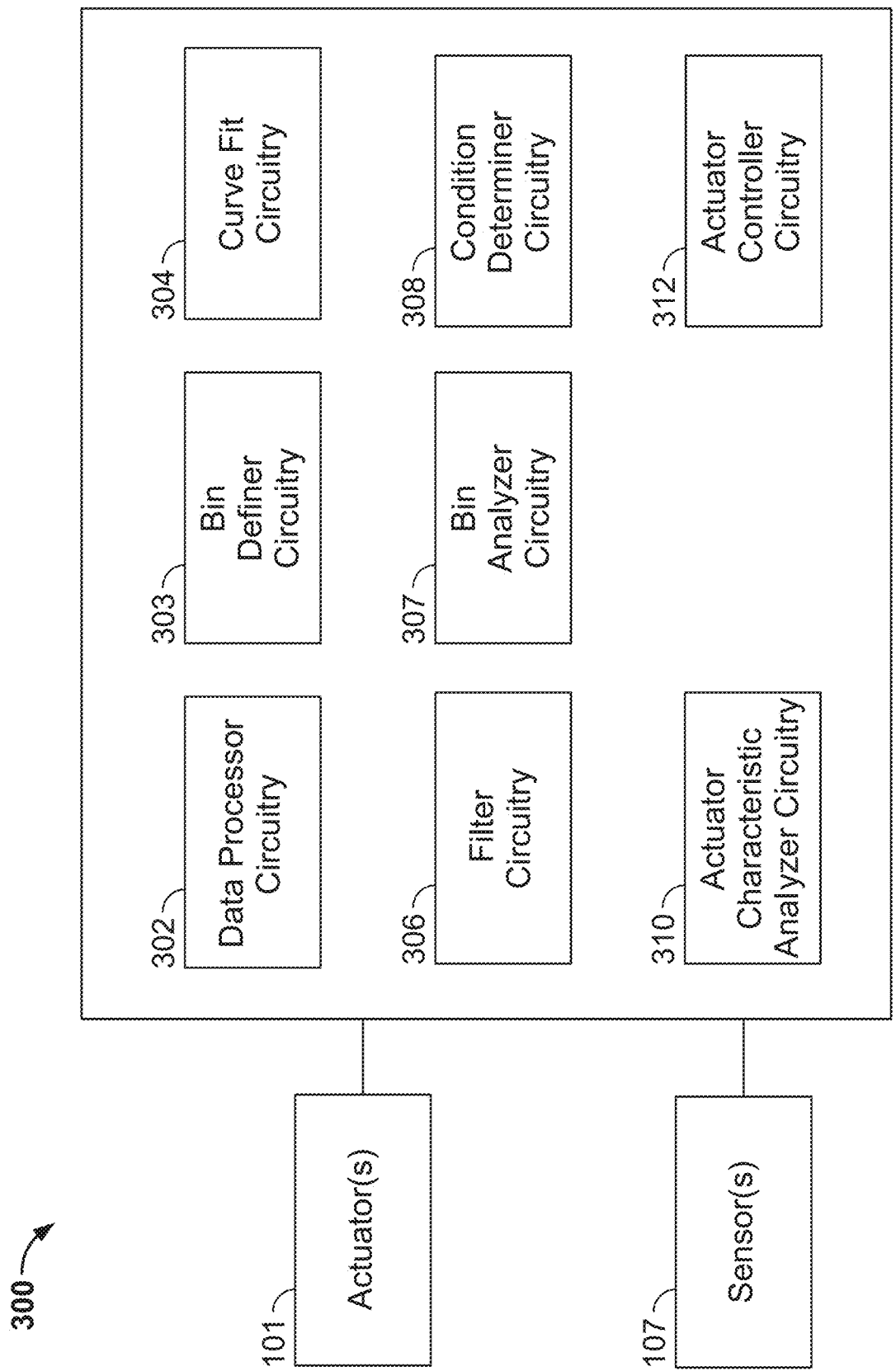
FIG. 3 is a schematic overview of an example valve analysis system in accordance with teachings of this disclosure.

FIG. 3 is a block diagram of an example valve characteristic analyzer 300 to analyze characteristics and extract features of valves. The valve characteristic analyzer 300 be implemented in the controller 104, the data acquirer 106 and/or the valve analyzer 110. The example valve characteristic analyzer 300 of FIG. 3 may be instantiated (e.g., creating an instance of, bring into being for any length of time, materialize, implement, etc.) by processor circuitry such as a central processing unit executing instructions. Additionally or alternatively, the valve characteristic analyzer 300 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by microprocessor circuitry executing instructions to implement one or more virtual machines and/or containers.

The example valve characteristic analyzer 300 of FIG. 3 includes example data processor circuitry 302, example bin definer circuitry 303, example curve fit circuitry 304, example filter circuitry 306, example bin analyzer circuitry 307, example condition determiner circuitry 308, example actuator characteristic analyzer circuitry 310, and example actuator controller circuitry 312. In the illustrated example of FIG. 3, the valve characteristic analyzer 300 includes and/or is communicatively coupled to the actuator(s) 101 and the sensor(s) 107.

The example data processor circuitry 302 receives, accesses and/or collects data obtained by the sensor 107 (e.g., as signal output from the sensor 107) that pertains to movement of the flow control member 122 (e.g., across a full range of motion of the flow control member 122). In some examples, the data processor circuitry 302 organizes, arranges and/or sorts data obtained by the sensor 107 corresponding to a full range of motion of the flow control member 122 (e.g., a range of motion from fully open to fully closed and vice-versa). In this example, the data collected by the sensor 107 is captured and/or adapted into a valve stroke curve. In some examples, the data processor circuitry 302 is instantiated by processor circuitry executing data processor circuitry instructions and/or configured to perform operations such as those represented by the flowcharts of FIGS. 4A-4D.

The bin definer circuitry 303 of the illustrated example is implemented to create, generate and/or define bins (e.g., segments, bins including multiple segments, etc.) of the aforementioned valve-stroke curve. In other words, the valve stroke curve is partitioned into the bins, each of which can include one or more segments. In this example, the bin definer circuitry 303 separates the valve stroke curve into discrete bins and/or segments. In some examples, the bins are equal in width and, alternatively, the bins are of different widths (e.g., along an x-axis of the valve stroke curve). In some examples, the valve stroke curve is separated into (e.g., indexed to) open and closed sections and/or portions (e.g., each of the open and closed sections and/or portions are separated into their respective bins). In some examples, certain portions and/or regions of the valve stroke curve are provided with smaller bins than other regions for increased resolution. In some examples, the bin definer circuitry 303 is instantiated by processor circuitry executing bin definer instructions and/or configured to perform operations such as those represented by the flowcharts of FIGS. 4A-4D.

In the illustrated example of FIG. 3, the example curve fit circuitry 304 fits curves to respective ones of the aforementioned bins. In particular, the example curve fit circuitry 304 fits at least one curve for each of the bins. In some examples, the curve fit circuitry 304 fits linear lines for each bin and/or segment (e.g., via a linear regression technique). Additionally or alternatively, at least some of the bins are fit with curvature fits (e.g., via a polynomial regression technique). In some examples, different ones of the bins are fit with different and/or multiple curve fit techniques from one another. In some examples, bins proximate ends of the valve stroke curve, which are known as travel edges, are fit with curves based on neighboring and/or proximate curve fits to mitigate and/or account for errors or inaccuracies associated with end effects and/or behavior of the valve stroke curve at travel edges. In some examples, the curve fit circuitry 304 is instantiated by processor circuitry executing curve fit circuitry instructions and/or configured to perform operations such as those represented by the flowcharts of FIGS. 4A-4D.

The example filter circuitry 306 is implemented to filter and/or process data points of the valve signature curve. In this example, the filter circuitry 306 removes and/or filters data points and/or bins from the valve stroke curve based on error metrics. In some examples, the example filter circuitry 306 can utilize an error threshold and/or error deviations exceeding an error threshold (e.g. error differences from expected values that exceed an error difference threshold, etc.), to filter (e.g., remove) ones of the data points of the aforementioned valve signature curve. The error threshold can be calculated for each of the data points, for example, and data points corresponding to error thresholds that exceed the error threshold can be removed and/or ignored (e.g., for subsequent analysis). Additionally or alternatively, data points that differ greatly from adjacent and/or proximate data points are filtered. In particular, data points corresponding to "spikes" or differences with proximate or adjacent points that exceed a threshold, and, thus, that may not correspond to actual movement of the flow control member 122 (shown in FIG. 1B), for example. In other words, a differential between neighboring or proximate data points exceeding a differential threshold can cause at least one of the data points to be filtered and/or removed. Additionally or alternatively, data points that are significantly different from a fit curve are filtered. In some examples, data points exceeding a threshold pressure are filtered. In some examples, the filter circuitry 306 is instantiated by processor circuitry executing bin filter instructions and/or configured to perform operations such as those represented by the flowcharts of FIGS. 4A-4D.

In the illustrated example, the bin analyzer circuitry 307 is implemented to analyze, process and/or characterize bins and/or segments of the valve stroke curve. In some examples, the example bin analyzer circuitry 307 determines a bench set (e.g., bench set values for a bench set curve) associated with operation of the valve 102. In some such examples, the bin analyzer circuitry 307 determines a lower and an upper bench set corresponding to seat contact and travel stop behavior, respectively. Additionally or alternatively, valve features, such as a seat load and travel stop pressures of the valve 102, are determined by the example bin analyzer circuitry 307. In some examples, a stroke region of the valve stroke curve is analyzed and/or characterized. In some examples, a curvature (e.g., arc-shaped curvature, "s"-shaped curvature, etc.) of at least one of the bins (e.g., segments) is determined. In such examples, an error of fit may indicate a health or operational status of the valve 102. In some examples, inconsistent friction through a range of motion and/or travel of the flow control member 122 is characterized and/or determined.

Additionally or alternatively, the bin analyzer circuitry 307 characterizes a seat load (e.g., a seat load region of the valve stroke curve). In some examples, the bin analyzer circuitry 307 and/or the condition determiner circuitry 308 characterizes/extracts seat contact behavior (e.g., a seat contact region of the valve stroke curve) of the valve 102. In some examples, the bin analyzer circuitry 307 and/or the condition determiner circuitry 308 characterizes a stroking region of the valve stroke curve (e.g., fits a curve corresponding to the stroking region of the valve stroke curve). In some examples, the bin analyzer circuitry 307 and/or the condition determiner circuitry 308 utilizes a seat contact distance relative in conjunction with a seat load slope for determination of a health metric and/or operational status of the valve 102. According to examples disclosed herein, the bin analyzer circuitry 307 and/or the condition determiner circuitry 308 calculates scaled residuals for inputs in determining a health condition of the valve 102. In some examples, the bin analyzer circuitry 307 is instantiated by processor circuitry executing condition determiner instructions and/or configured to perform operations such as those represented by the flowcharts of FIGS. 4A-4D.

The condition determiner circuitry 308 of the illustrated example determines a condition, characteristic, operating condition, health and/or predicted operational life of the valve 102, the valve stroke member 122 and/or the actuator 101. According to examples disclosed herein, the condition determiner circuitry 308 can determine a health index associated with the valve 102. In some such examples, a relative comparison of the health index with respect to thresholds (e.g., warning or alert thresholds) can correspond to a predicted degree of remaining operational life (e.g., a predicted time for the valve 102 to further operate within specifications).

The example actuator characteristic analyzer circuitry 310 is implemented to characterize, analyze and/or determine characteristics associated with operation of the actuator 101. According to examples disclosed herein, the actuator characteristic analyzer circuitry 310 may determine outputs and/or operational setpoints of the actuator 101 based on extracted features (e.g., bench set values/curve, seat contact points, travel stop limits, etc.), thereby enabling more accurate and precise control of the actuator 101. Additionally or alternatively, the example actuator characteristic analyzer circuitry 310 is utilized to calibrate the actuator 101 with respect to operation of the valve 102 and/or movement of the flow control member 122. In some examples, the actuator characteristic analyzer circuitry 310 is instantiated by processor circuitry executing actuator characteristic analyzer instructions and/or configured to perform operations such as those represented by the flowcharts of FIGS. 4A-4D.

In the illustrated example, the actuator controller circuitry 312 is utilized to control and/or initiate operation of the actuator 101. In some examples, the actuator controller circuitry 312 is operated to direct the actuator 101 to move the flow control member 122 across its entire range of motion (e.g., from fully closed to a travel stop limit of being fully opened) for data collection to generate, augment and/or correct a valve stroke curve. In some examples, the actuator controller circuitry 312 is instantiated by processor circuitry executing actuator controller instructions and/or configured to perform operations such as those represented by the flowcharts of FIGS. 4A-4D. Further, any aspects (e.g., computational analysis, data processing, visualization, etc.) shown and described in connection with FIGS. 4A-12H can be combined with other aspects.

While an example manner of implementing the valve characteristic analyzer 300 of FIG. 3 is illustrated in FIG. 3, one or more of the elements, processes, and/or devices illustrated in FIG. 3 may be combined, divided, re-arranged, omitted, eliminated, and/or implemented in any other way. Further, the example data processor circuitry 302, the example bin definer circuitry 303, the example curve fit circuitry 304, the example filter circuitry 306, the example bin analyzer circuitry 307, the example condition determiner circuitry 308, the example actuator characteristic analyzer circuitry 310, and/or, more generally, the example valve characteristic analyzer 300 of FIG. 3, may be implemented by hardware alone or by hardware in combination with software and/or firmware. Thus, for example, any of the example data processor circuitry 302, the example bin definer circuitry 303, the example curve fit circuitry 304, the example filter circuitry 306, the example bin analyzer circuitry 307, the example condition determiner circuitry 308, the example actuator characteristic analyzer circuitry 310, and/or, more generally, the example valve characteristic analyzer 300, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)) or other application specific integrated circuit(s) (ASIC(s. Further still, the example valve characteristic analyzer 300 of FIG. 3 may include one or more elements, processes, and/or devices in addition to, or instead of, those illustrated in FIG. 3, and/or may include more than one of any or all of the illustrated elements, processes and devices.

Flowcharts representative of example machine readable instructions, which may be executed to configure processor circuitry to implement the valve characteristic analyzer 300 of FIG. 3, are shown in FIGS. 4A-4D. The machine readable instructions may be one or more executable programs or portion(s) of an executable program for execution by processor circuitry, such as the processor circuitry 1312 shown in the example processor platform 1300 discussed in connection with FIG. 13 and/or the example processor circuitry discussed in connection with FIGS. 14 and/or 15. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example programs is described with reference to the flowcharts illustrated in FIGS. 4A-4D, many other methods of implementing the example characteristic analyzer 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or an ASIC located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4A-4D may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 4A:
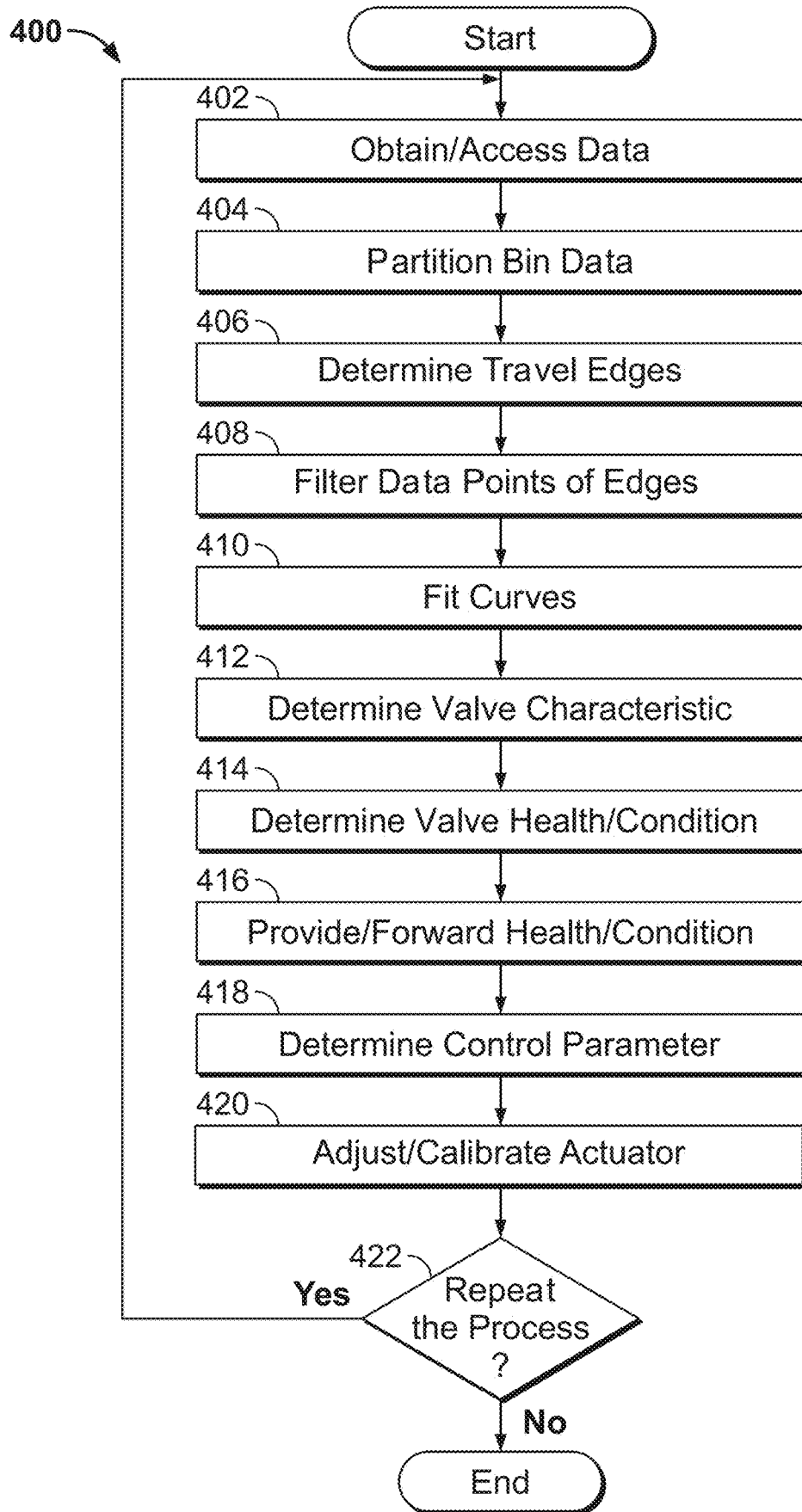
FIGS. 4A-4D are flowcharts representative of example machine readable instructions and/or example operations that may be executed by example processor circuitry to implement the example process control analysis system of FIG. 1A and/or the example valve analysis system of FIG. 3.

FIG. 4A is a flowchart representative of example machine readable instructions and/or example operations 400 that may be executed and/or instantiated by processor circuitry to characterize at least one characteristic and/or operational condition of the example valve 102. The machine readable instructions and/or the operations 400 of FIG. 4 begin at block 402, at which the example data processor circuitry 302 obtains/accesses data related to the valve 102 and/or movement of the fluid control member 122 (e.g., across a range of motion of the fluid control member 122). In the illustrated example, the example data processor circuitry 302 obtains the data as a valve stroke curve and/or data obtained by the example sensor 107.

In some examples, metadata related to multiple valves are obtained. In some such examples, each run is a unique valve stroke curve. The metadata can include a name, an identifier, a timestamp, an indication of a valid test, data (signal values such as travel, pressure, etc.), index utilized to partition data (e.g., between open and close) and/or feature (e.g., a feature matrix populated during feature extraction). In some examples, the metadata is matched with respective valve runs. In some examples, certain valve types (e.g., rotary, vee-ball, etc.) are excluded from the metadata.

At block 404, the bin definer circuitry 303 of the illustrated example partitions and/or segments the data associated with the valve stroke curve, thereby defining bins of the aforementioned valve stroke curve. According to examples disclosed herein, the segment definer circuitry 303 uniformly divides the bins (e.g., the bins are uniformly divided across an entire range of travel of the flow control member 122). Alternatively, the valve stroke curve can be divided with non-uniform bins (e.g., a greater amount of segments and/or segment resolution at the closed portion in comparison to the opening portion).

At block 406, the example curve fit circuitry 304 and/or the bin analyzer circuitry 307 determines travel edges of the valve stroke curve. In the illustrated example of FIG. 4A, the travel edges are associated with ends of the valve stroke curve including, but not limited to, a first end corresponding to a travel stop portion of the valve stroke curve and a second end corresponding to a seat contact portion of the valve stroke curve.

At block 408, the example filter circuitry 306 filters data points of and/or associated with the travel edges. In this example, the filter circuitry 306 filters data points of the valve stroke curve associated with the aforementioned travel edges. In some particular examples, data points that deviate beyond a threshold (e.g., a differential threshold with neighboring/proximate data points) are eliminated. As a result, the filtered valve stroke curve can be utilized for relatively accurate determinations. In some examples, the filter circuitry 306 filters the data points prior to the valve stroke curve being separated into bins.

At block 410, the curve fit circuitry 304 of the illustrated example fits curves of the bins of the valve stroke curve. In particular, curves are fit to ones of the bins. In some examples, a linear fit is applied (e.g., a linear regression fit) is applied to ones of the bins. Additionally or alternatively, a curved fit (e.g., a polynomial fit) is applied to ones of the bins.

At block 412, the example bin analyzer circuitry 307 and/or the example condition determiner circuitry 308 determines at least one valve characteristic, feature, characteristic curve and/or condition of the valve 102, as will be discussed in greater detail below in connection with FIGS. 4B and 4C. According to examples disclosed herein, the characteristic and/or condition of the valve 102 may be based on analyzing bins of a portion and/or region of the valve stroke curve, such as the tail ends (e.g., travel edges) thereof, for example. The example bin analyzer circuitry 307 and/or the example condition determiner circuitry 308 can determine and/or characterize a bench set (e.g., an upper bench set, a lower bench set), seat contact behavior, error residuals, etc. Additionally or alternatively, the example bin analyzer circuitry 307 and/or the example condition determiner circuitry 308 can generate curves (e.g., plots) associated with operation of the valve 102.

At block 414, in some examples, the condition determiner circuitry 308 determines a health and/or an operating condition of the valve 102 and/or the actuator 101. The health may correspond to a predicted operational life of the valve 102 (e.g., a predicted remaining life of the valve 102).

At block 416, in some examples, the health and/or the condition of the valve 102 is forwarded and/or provided. For example, the health and/or the condition is forwarded to a central office and/or servicer associated with the valve 102 and/or the actuator 101 so that the actuator can be appropriately serviced and/or replaced, for example. In some examples, the health and/or the condition of the valve 102 is forwarded and/or caused to be transmitted (e.g., via the network 112) when a risk index and/or value associated with the valve 102 exceeds a risk threshold value. As a result of providing indications of the health of the valve 102, downtime and costs associated with the downtime can be potentially avoided.

At block 418, in some examples, the actuator characterizer circuitry 310 determines at least one control parameter and/or characteristic of the actuator 101. In the illustrated example, the actuator characterizer circuitry 310 determines a range of movement and/or an effect of drive commands so that the flow control member 122 can be appropriately moved.

At block 420, in some examples, the actuator controller circuitry 312 adjusts and/or calibrates the actuator 101 and/or movement thereof. In some examples, the actuator characterizer circuitry 310 determines and/or adjusts drive parameters and/or settings of the actuator 101 based on at least one determined characteristic of the valve 102 (e.g., a fitted and filtered stroke curve of the valve 102).

At block 422, the example bin analyzer circuitry 307, the example condition determiner circuitry 308 and/or the example data processor circuitry 302 determines whether to repeat the process. If the process is to be repeated (block 422), control of the process returns to block 402. Otherwise, the process ends. The determination may be based on whether additional adjustments of the valve 102 are necessary, whether the data of the valve 102 and/or whether the corresponding stroke curve has requisite accuracy (e.g., sufficient data points, sufficiently fit curves, etc.). Additionally or alternatively, the determination whether to repeat the process can be based on whether additional valves are to be characterized and/or analyzed.

Figure 4B:
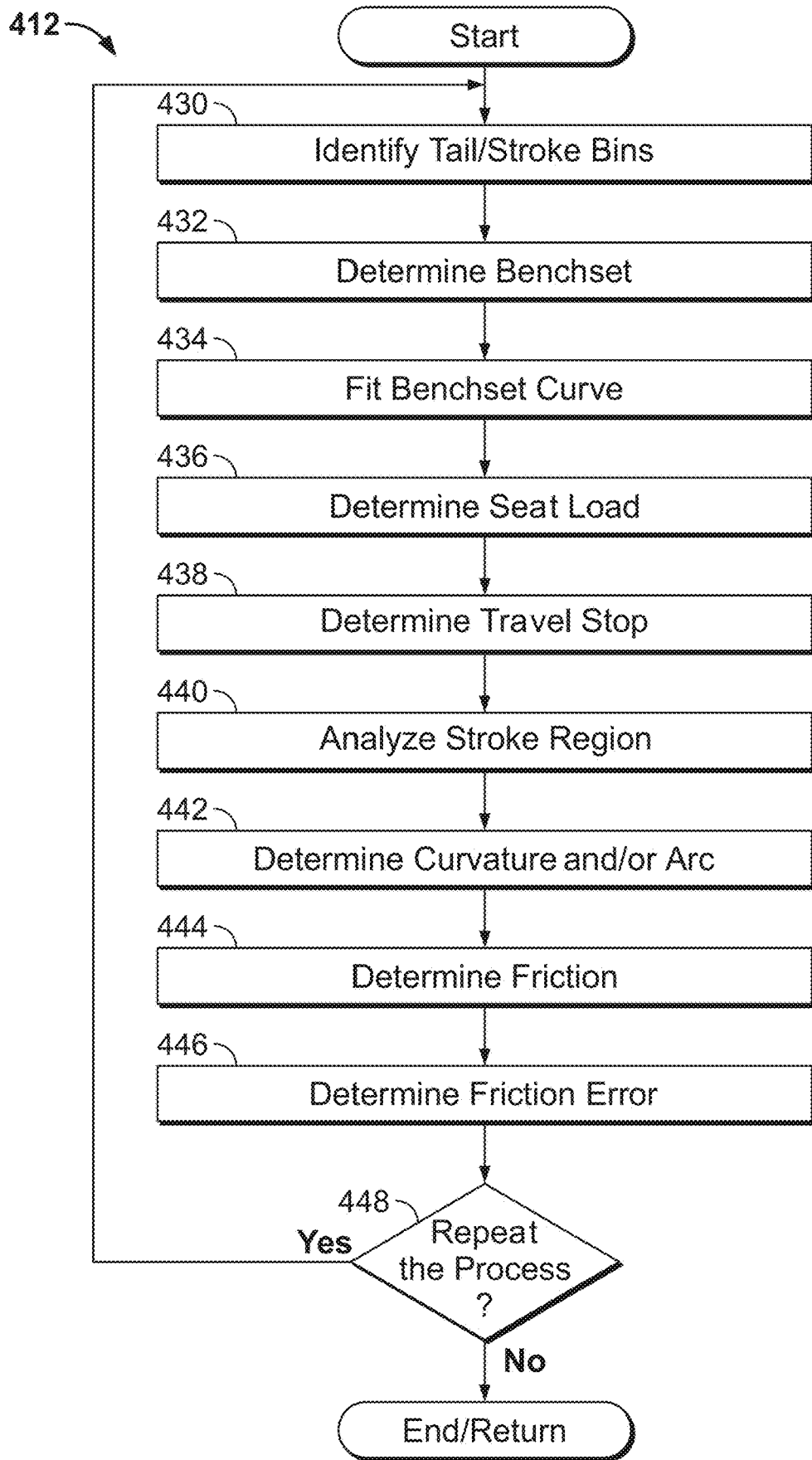

FIG. 4B is a flowchart representative of an example process 412 that may be executed and/or instantiated by processor circuitry to determine at least one characteristic of the example valve 102. The example process 412 can be implemented to characterize the valve 102 and/or extract features of the valve 102, amongst other potential advantageous uses.

At block 430, the example bin analyzer circuitry 307 identifies tail/stroke bins (e.g., bins and/or segments at the tail ends). In the illustrated example of FIG. 4B, the tail and stroke bins are identified by the bin analyzer circuitry 307 based on an overall shape and/or characteristics of the valve stroke curve (e.g., at defined or expected travel ranges, etc.). In some examples, the tail and stroke bins are each categorized and/or indexed into closing and opening bins (e.g., a first set of bins are associated with closing strokes while a second set of bins are associated with opening strokes).

At block 432, the example bin analyzer circuitry 307 determines a bench set and/or bench set information. In some examples, the bin analyzer circuitry 307 generates a table and/or chart/graph of bench set data. For example, the bin analyzer circuitry 307 generates an array of values corresponding to the bench set information.

At block 434, the example bin analyzer circuitry 307 fits a bench set curve based on the bench set data and/or the bench set information. In the illustrated example of FIG. 4C, the example bin analyzer circuitry 307 determines the bench set (e.g., bench set data, bench set plots, etc.) based on tail ends of the valve stroke curve (e.g., a seat exit approach portion and/or a travel stop exit portion of the valve stroke curve). In some such examples, bins of the valve stroke curve corresponding to the tail ends are utilized for curve fits instead of the stroking region of the valve stroke curve to mitigate the effects of inconsistent friction through the travel.

At block 436, the example bin analyzer circuitry 307 characterizes and/or determines a seat load (e.g., a seat pressure) associated with the valve stroke curve of the valve 102. In this example, the bin analyzer circuitry 307 determines and/or separates the seat load portion and/or at least one seat load bin associated with the valve stroke curve.

At block 438, the example bin analyzer circuitry 307 determines and/or characterizes a travel stop (e.g., a travel stop region) associated with the valve stroke curve. In this example, the bin analyzer circuitry 307 utilizes bins associated with the travel stop.

At block 440, the example bin analyzer circuitry 307 analyzes and/or determines a stroke/stroking region of the valve strokes curve. In this example, the bin analyzer circuitry 307 determines and/or separates the stroke/stroking portion and/or at least one seat load bin associated with the stroke/stroking portion.

At block 442, the example bin analyzer circuitry 307 determines a curvature and/or a presence of an arc-like shape of at least one segment and/or bin of the segmented valve stroke curve. According to examples disclosed herein, a relatively significant degree of curvature and/or a presence of an arc-like shape in the valve stroke curve can indicate inconsistent friction through the travel of the flow control member 122.

At block 446, the example bin analyzer circuitry 307 determines a friction error associated with at least one bin and/or segment of the valve stroke curve. According to examples disclosed herein, the friction error is based on a residual that is calculated as a difference between an expected/predicted friction value and a measured friction value.

At block 448, the example bin analyzer circuitry 307 determines whether to repeat the process. If the process is to be repeated (block 448), control of the process returns to block 430. Otherwise, the process ends/returns. The determination may be based on whether the example bin analyzer circuitry 307 determines that the characterization of the valve 102 has occurred with sufficient accuracy.

Figure 4C:
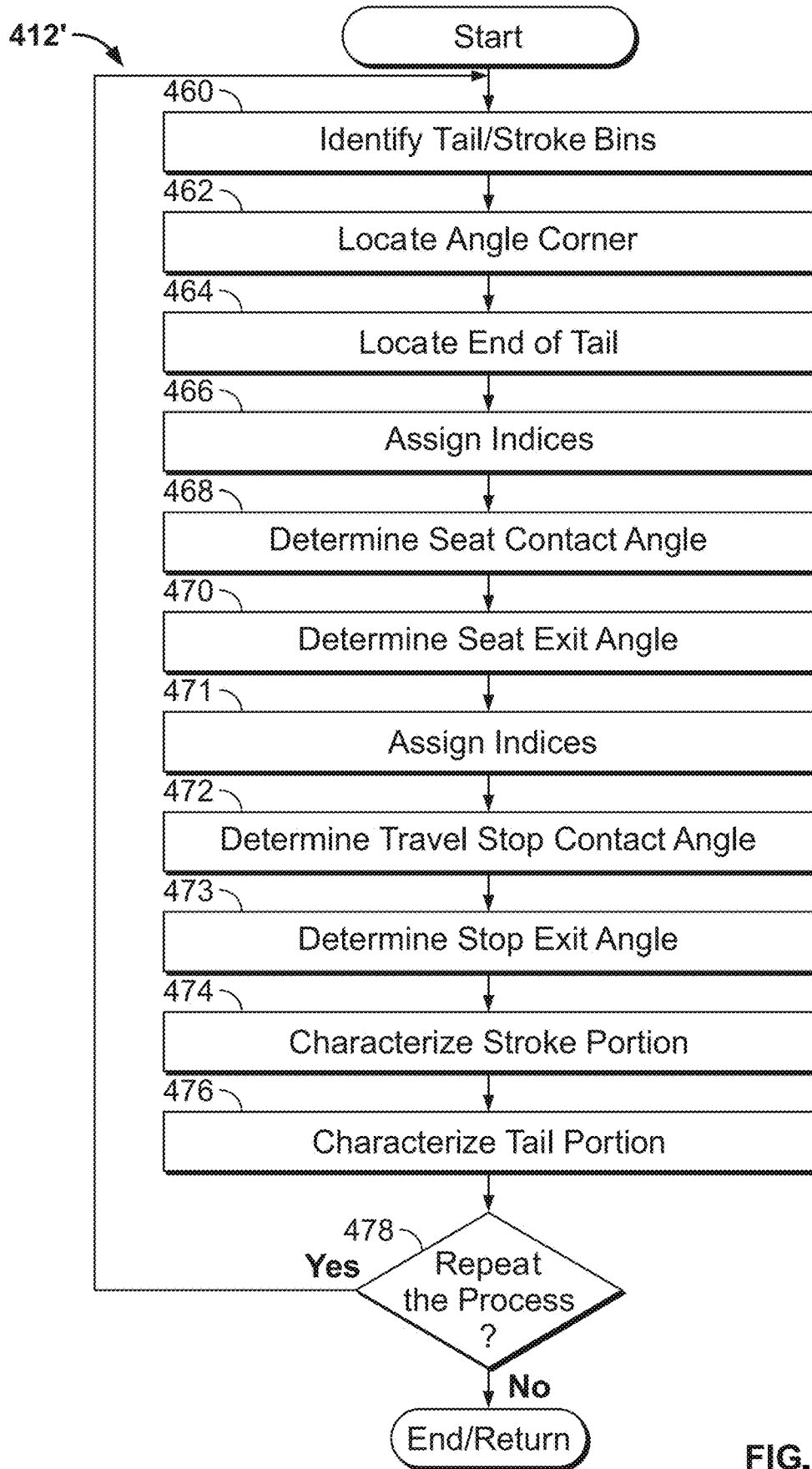

FIG. 4C is a flowchart representative of another example implementation of a process 412' that may be executed and/or instantiated by processor circuitry to determine at least one characteristic of the example valve 102. Any of the aspects of the example process 412 of FIG. 4B can be combined with those of the example process 412' and vice-versa.

At block 460, the example bin analyzer circuitry 307 identifies tail/stroke bins of the valve stroke curve. According to examples disclosed herein, the example bin analyzer circuitry 307 can separate bins and/or bins of the valve stroke curve associated with its corresponding tail or stroke portions.

At block 462, the example bin analyzer circuitry 307 determines and/or locates an angle corner of the valve stroke curve. In this example, the bin analyzer circuitry 307 determines the angle corner based on an expected behavior and/or shape of bins proximate a location and/or area of the valve stroke curve corresponding to the tail.

At block 464, the example bin analyzer circuitry 307 determines and/or locates an end of a tail of the valve stroke curve. In the illustrated example, the bin analyzer circuitry 307 identifies a position and/or range of the tail at a seat contact region of the valve stroke curve.

At block 466, example bin analyzer circuitry 307 assigns indices. In some examples, the bin analyzer circuitry 307 assigns different indices between the stroke portion of the valve stroke curve and the tail portion of the valve stroke curve. Additionally or alternatively, indices are assigned for exit angles, then the tail portion and, subsequently, the stroke portion, for example.

At block 468, the example bin analyzer circuitry 307 determines and/or locates a seat contact angle. In some examples, the determination of the seat contact angle by the example bin analyzer circuitry 307 is based on a shape of the valve stroke curve. In some examples, the seat contact angle is based on fits of bins and/or segments of the valve stroke curve.

At block 470, the example bin analyzer circuitry 307 determines and/or locates a seat exit angle. In this example, the seat exit angle is located to determine the seat distance. In turn, the seat exit angle can be utilized for metrics related to overall health of the valve 102.

At block 471, in some examples, the example bin analyzer circuitry 307 assigns indices. In this example, the indices are assigned by the example bin analyzer circuitry 307 for exit angles. In particular, the bins of the tail are assigned prior to the bins of the stroke, for example.

At block 472, the example bin analyzer circuitry 307 determines a travel stop contact angle. In this example, the bin analyzer circuitry 307 locates a corner point by locating a last data point within an error tolerance of the seat. In turn, a next data point is designated to be associated with the tail.

At block 473, the example bin analyzer circuitry 307 determines a stop exit angle. In this example, a corner point is located by determining a last point within error tolerance of the seat (e.g., the tail is then the following point).

At block 474, the example curve fit circuitry 304 and/or the example bin analyzer circuitry 307 fits a curve to a stroke portion of the valve stroke curve.

At block 476, the example curve fit circuitry 304 and/or the example bin analyzer circuitry 307 characterizes a tail portion of the valve stroke curve. In some examples, the example curve fit circuitry 304 and/or the example bin analyzer circuitry 307 fits at least one curve to the tail portion of the valve stroke curve.

At block 478, the example bin analyzer circuitry 307 and/or the example condition determiner circuitry 308 determines whether to repeat the process. If the process is to be repeated (block 478), control of the process returns to block 460. Otherwise, the process ends/returns.

As mentioned above, any of the aspects described above in connection with the example of FIG. 4C can be utilized with the example of FIG. 4B and vice-versa. In other words, any of the aspects and/or features described in FIGS. 4B and 4C can be combined with any other aspect or feature described.

Figure 4D:
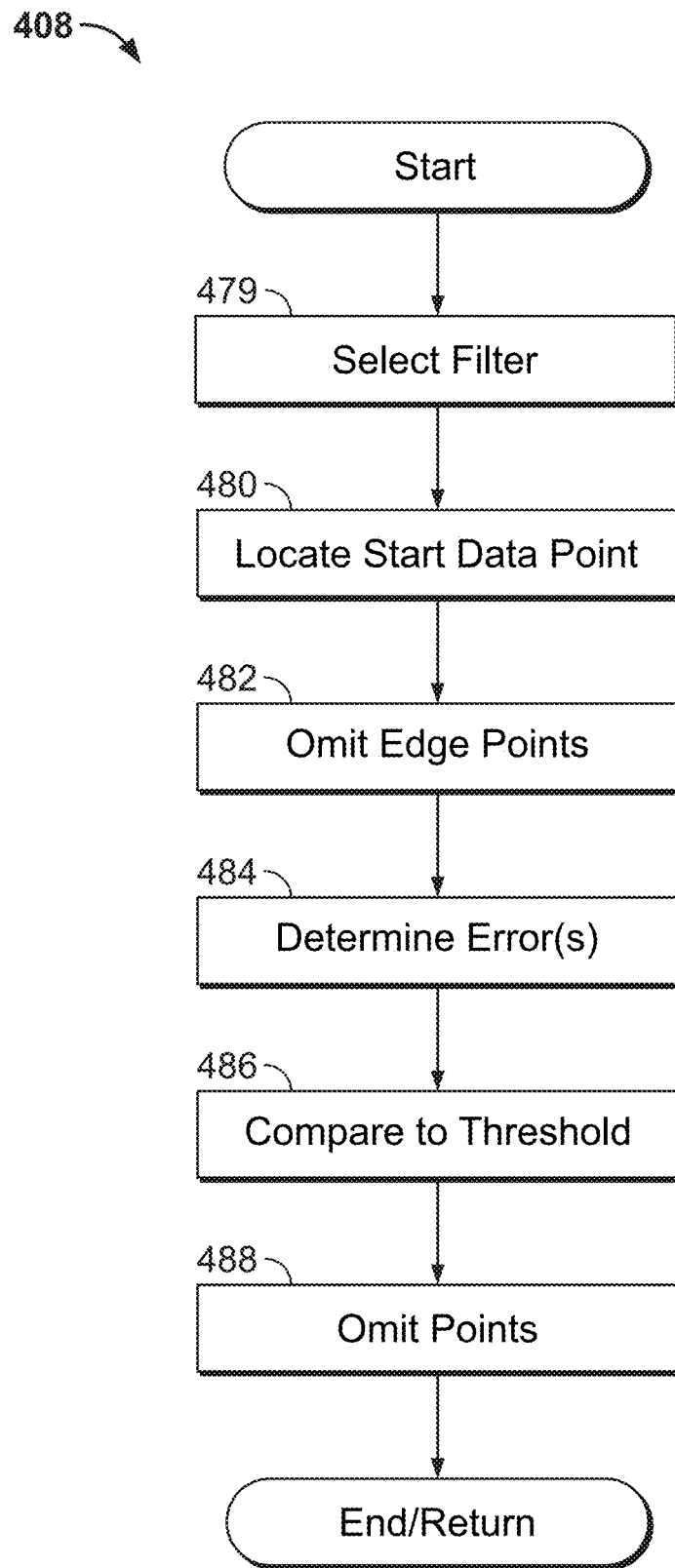

FIG. 4D is a flowchart representative of an example process 408 that may be executed and/or instantiated by processor circuitry to determine at least one characteristic of the example valve 102. The example process 412 can be implemented to characterize the valve 102 and/or extract features of the valve 102, amongst other potential advantageous uses.

At block 479, in some examples, the example filter circuitry 306 selects a filter and/or filter technique to be applied. According to examples disclosed herein, the filter and/or the filter technique is selected based on a degree of error of the valve stroke curve and/or a characteristic (e.g., a shape, a curvature of a portion of the valve stroke curve, etc.) of the valve stroke curve.

At block 480, the example filter circuitry 306 and/or the example bin analyzer circuitry 307 determines a start data point (e.g., a start data point of a tail) corresponding to a data point of and/or adjacent to a maximum/extreme data point of the valve stroke curve.

At block 482, the example filter circuitry 306 omits edge data points of the valve stroke curve. For example, the filter circuitry 306 can omit at least one data point (e.g., a single data point) to a side (e.g., aft) of the aforementioned maximum/extreme data point of the valve stroke curve.

At block 484, errors are determined by the filter circuitry 306 for the data points. For example, residual errors (e.g., residual pressure errors) are calculated such that a value of a data point is subtracted from an expected value (e.g., a value from a fit line, a known value, a reference value, etc.).

At block 486, in some examples, the errors are compared to an error threshold by the filter circuitry 306.

At block 488, the filter circuitry 306 of the illustrated example omits data points that have errors that exceed or meet the error threshold, and the process ends/returns.

Figure 5A:
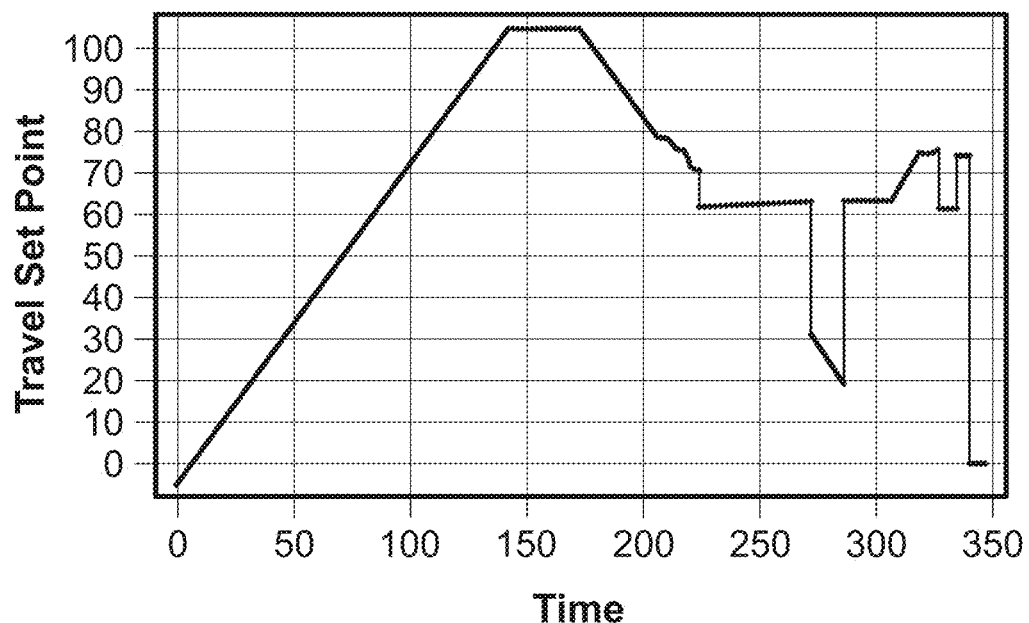
FIGS. 5A-5C illustrate pre-processing that can be implemented in examples disclosed herein.
Figure 5B:
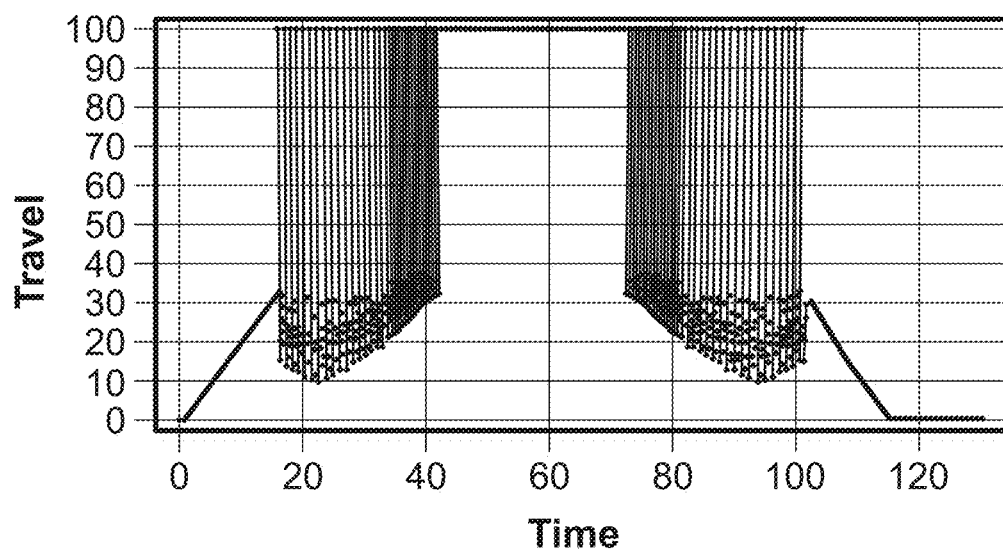
Figure 5C:
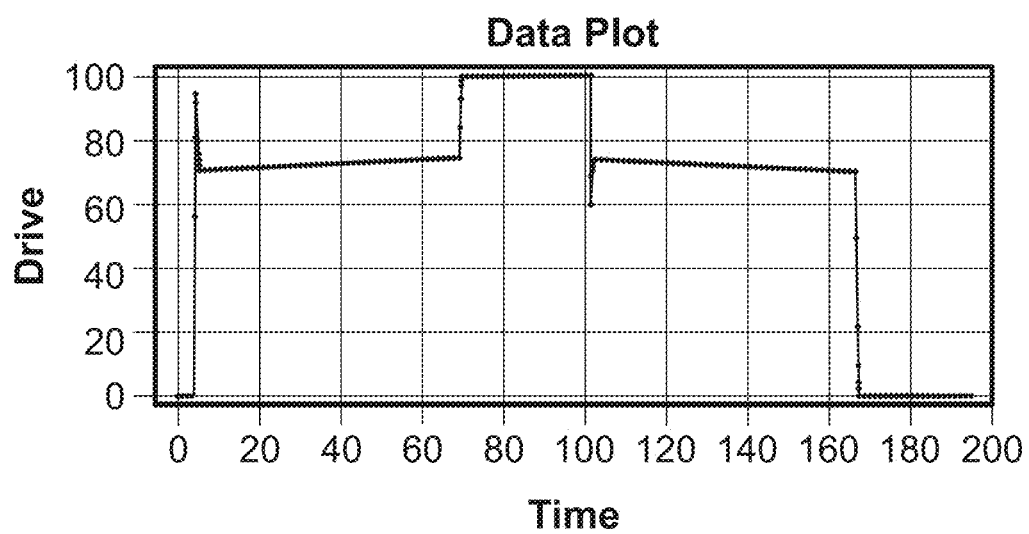

FIGS. 5A-5C illustrate pre-processing that can be implemented in examples disclosed herein. Turning to FIG. 5A, an example graph representing travel setpoint with respect to time is shown. In particular, the example of FIG. 5A depicts an example determination of test validity (e.g., validity of a test corresponding to obtaining data for a valve stroke curve) based on a travel set point. In some examples, a test can be determined to be valid based on whether dynamic scans pertaining to movement of the flow control member 122 indicate reversals in direction when the flow control member 122 is closed (e.g., against a sealing surface). According to examples disclosed herein, an assumption can be made that the valve 102 remains fully open and then reverses a signal to turn once to close. In some examples, if the test results are invalid, analysis of the valve stroke curve is ceased/stopped.

FIG. 5B depicts an example graph that relates travel with respect to time. In the illustrated example of FIG. 5B, utilization of dynamic scans related to testing a validity of data (e.g., based on travel) is shown. In this example, relatively large changes in travel (e.g., relatively large changes in travel that are not generally deemed to be realistic under normal and/or expected operation) can be utilized for determining that the valve stroke data corresponds to an invalid test.

FIG. 5C depicts an example graph that relates drive percentage with respect to time. According to examples disclosed herein, cutoffs can be enabled for testing such that the cutoffs can correspond to a drive percentage being less than or equal to 0. In some examples, a drive percentage exceeding 10% corresponds to cutoffs, which can be associated with an invalid test. In other words, a presence of cutoffs can correspond to the test being invalid. In some examples, analysis of the valve 102 is ceased after the test is deemed to be invalid.

Figure 6A:
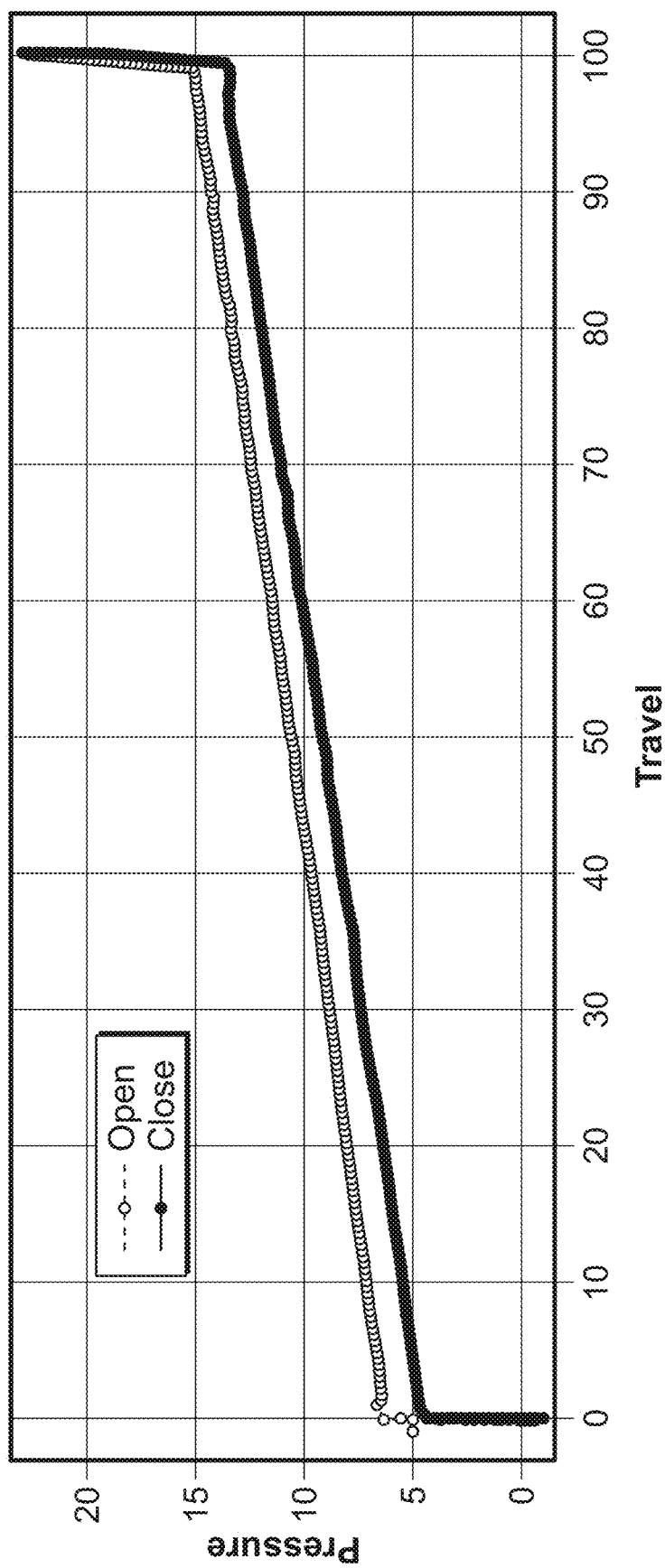
FIGS. 6A-6I illustrate example analysis of valve stroke curves that can be implemented in examples disclosed herein.

FIGS. 6A-6I illustrate example analyses of valve stroke curves that can be implemented in examples disclosed herein. In particular, the examples of FIGS. 6A-6I can be performed by the example bin analyzer circuitry 307 or any other circuitry shown in FIG. 3, for example. Turning to FIG. 6A, a valve stroke curve (e.g., a valve signature curve) is shown. In the illustrated example of FIG. 6A, an opening bin (e.g., an opening segment) or portion is shown along with a closing bin (e.g., a closing segment) or portion. In particular, the opening bin and the closing bin are separated by the peak pressure and minimum pressure, both of which can be based on air direction (e.g., a direction by which at least a portion of the actuator 101 is moved by air), for example. According to examples disclosed herein, the opening segment(s), stroke bin(s), and the closing bin(s) are demarcated on a valve stroke curve.

Figure 6B:
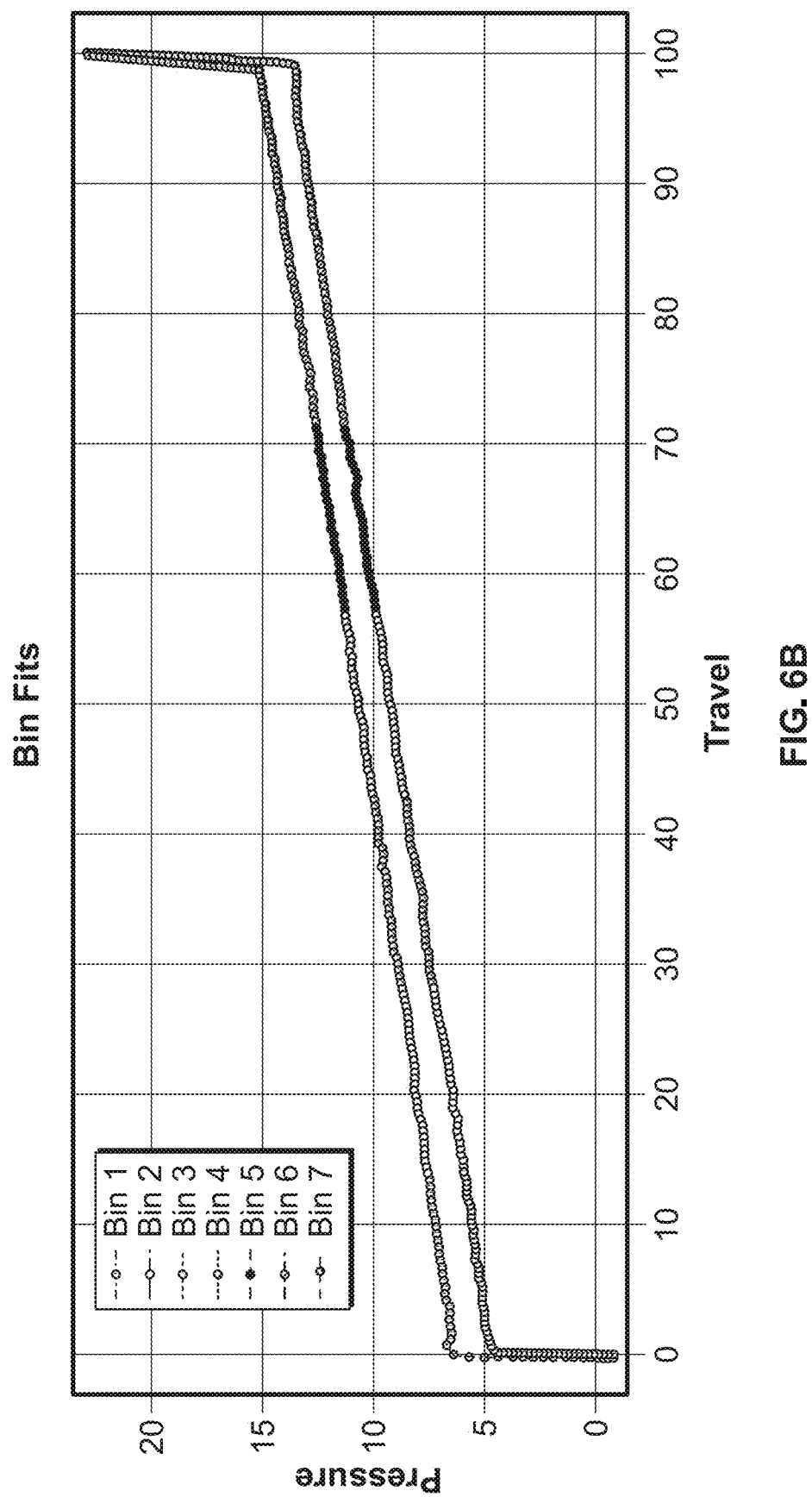

FIG. 6B is an example graph depicting the example valve stroke curve divided into bins/segments (e.g., by the bin definer circuitry 303). For example, the open, stroke and closing bins are each divided into at least one bin. In some particular examples, the opening bins are divided based on defined travel range sections/divisions.

Figure 6C:
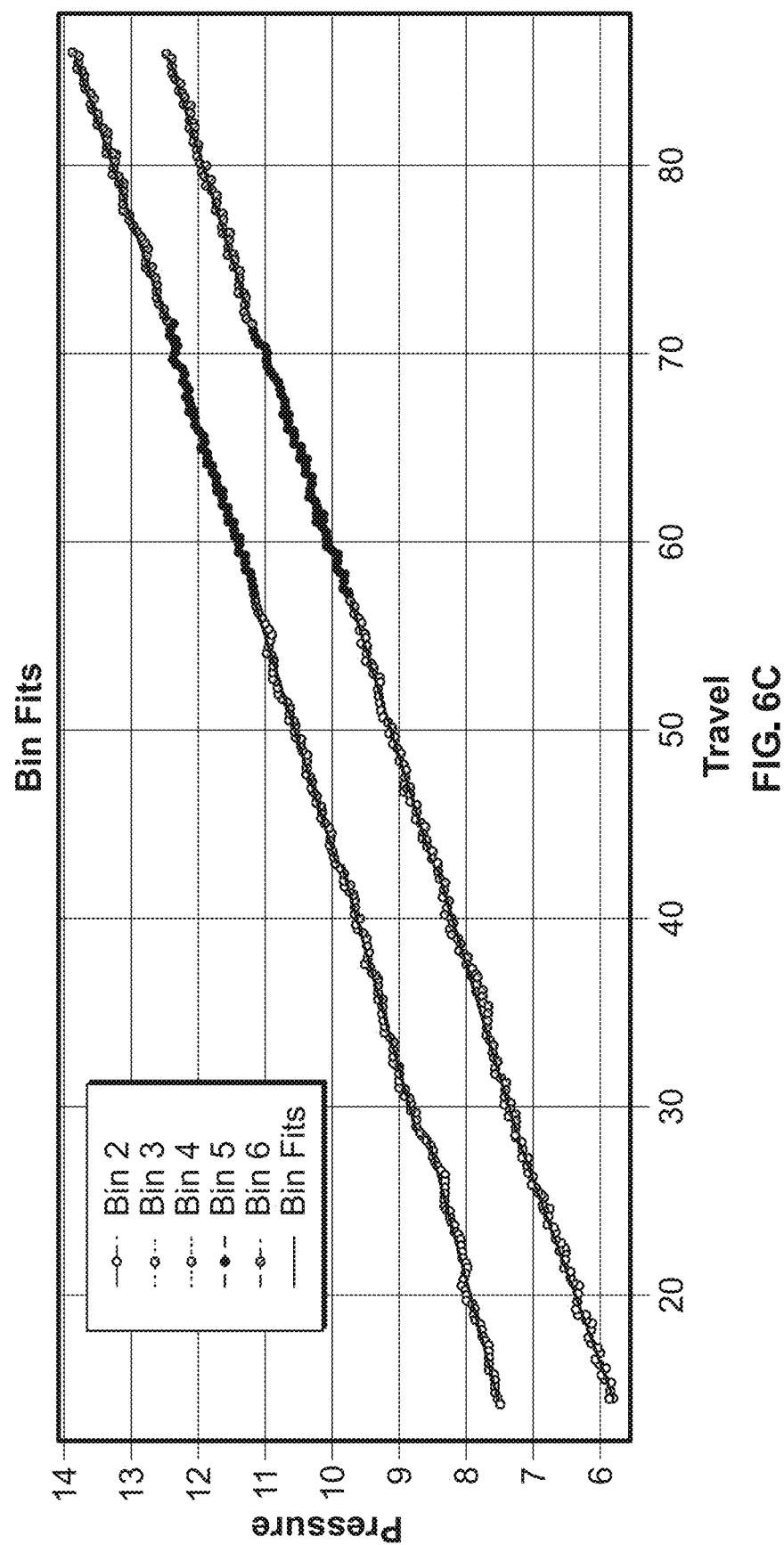

FIG. 6C depicts a portion of the valve stroke curve pertaining to a stroke and/or movement (e.g., intermediate movement portion, a travel portion, etc.) of the flow control member 122. In particular, a detailed portion of FIG. 6B is shown in FIG. 6C. As can be seen in the illustrated example of FIG. 6C, the bins/segments are each fit with a linear fit (e.g., a linear regression fit). In this example, the slopes of these linear fit curves represent spring rates. In some analyses, end effects from tail portions of the valve stroke curve are disregarded to focus on aspects of the stroke/movement portion. In other words, the example portion shown in FIG. 6C can be isolated and/or focused on for characterization of the valve 102, the flow control member 122 and/or the actuator 101. In some examples, gaps are present between the bins. In other words, the bins can be separated from one another. In some examples, at least one curve is fit utilizing the remaining bins having gaps therebetween.

Figure 6D:
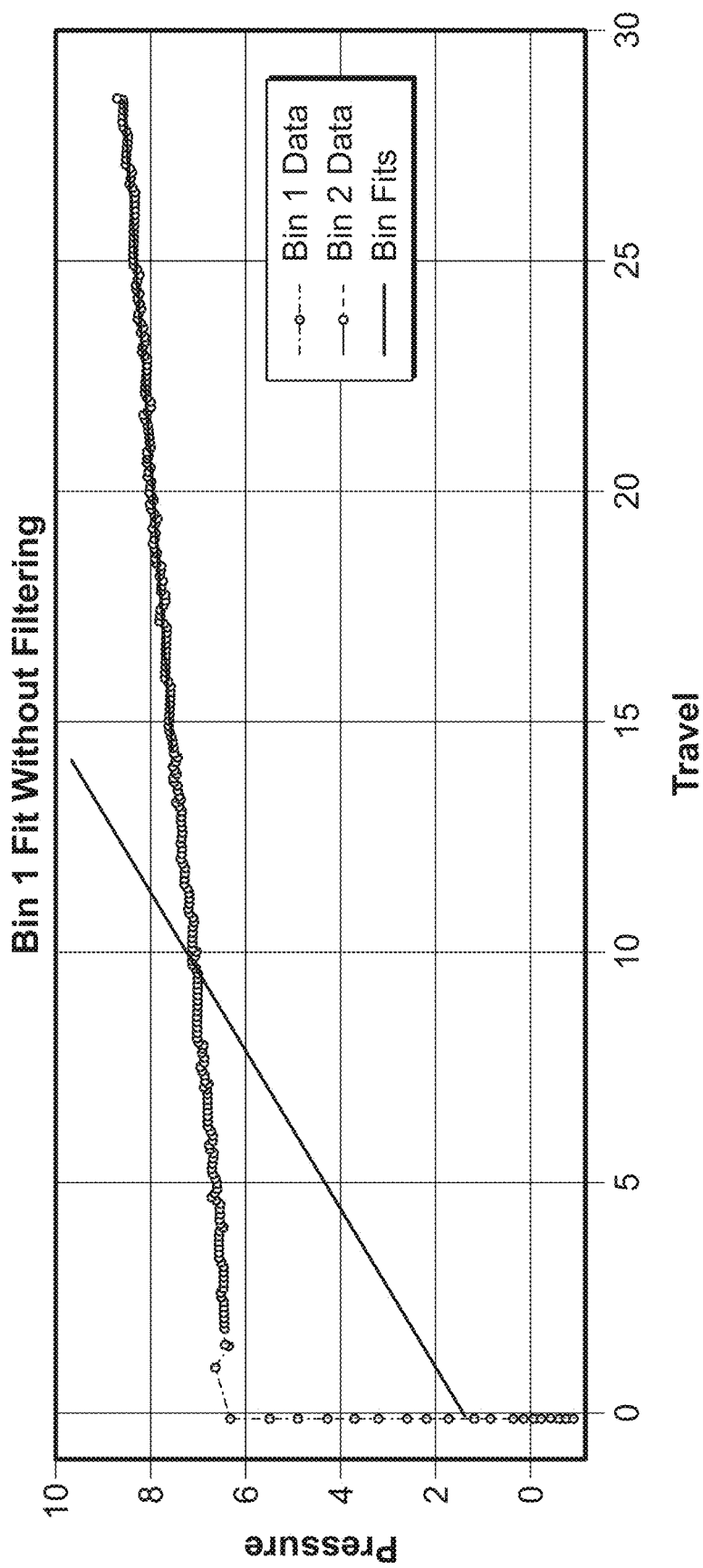

Turning to FIG. 6D, a graph depicting a tail portion (e.g., a tail end, a contact portion, etc.) is shown. In this example, a portion of the valve stroke curve corresponding to and/or proximate a travel value of approximately 0.0 is not filtered. As a result, a resultant fit of this portion of the valve stroke curve is poor and does not generally represent a characteristic shape of this portion of the valve stroke curve.

Figure 6E:
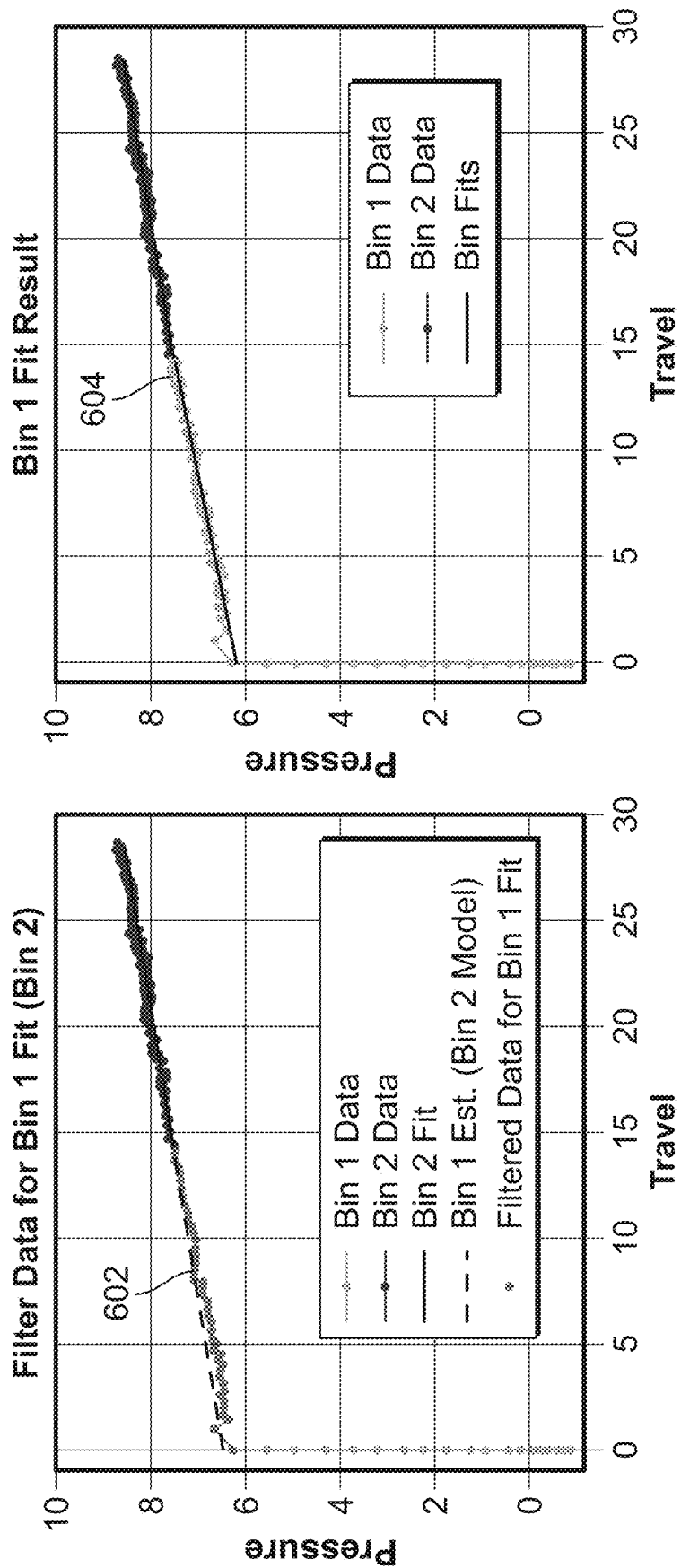

FIG. 6E represents filtering that can be implemented in examples disclosed herein. In this example, a second bin/segment, which is denoted as "Bin 2" in FIG. 6E, is utilized for a first bin that is designated as "Bin 1." In particular, the example second bin used to extrapolate a bin 602 to characterize at least a portion of the first bin (e.g., the bin 602 is extended for extrapolation of the first bin). In some examples, the bin 602 is extrapolated from a slope of a portion of the second point proximate and/or adjacent to the first bin. In this example, a fitted curve 604 is shown utilizing the aforementioned extrapolation. In other words, this portion of the valve stroke curve that corresponds to the first bin is filtered.

Figure 6F:
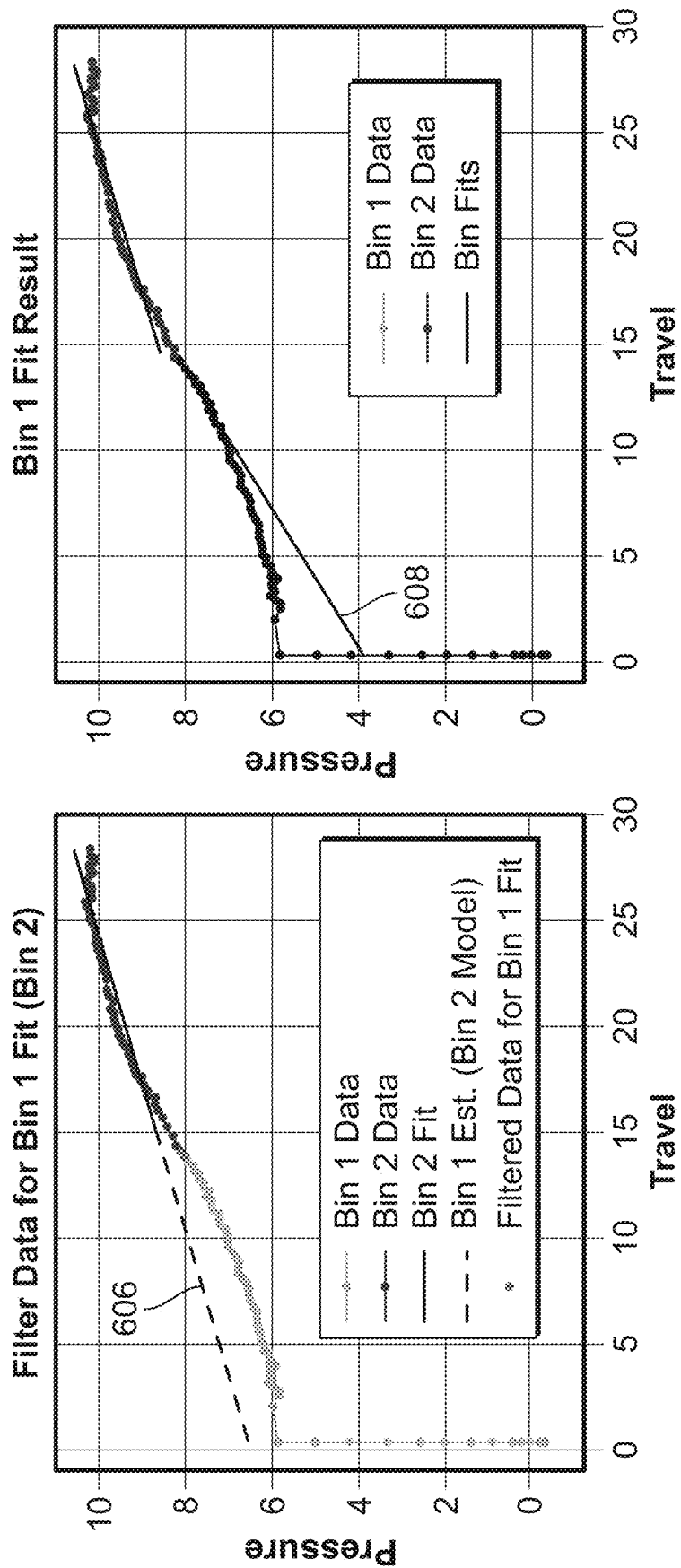

FIG. 6F depicts results of filtering of bins/segments related to a valve stroke curve. In this example, a curve 606 represents an extrapolation of a second bin of the valve stroke curve while a curve 608 represents a fit of the first bin of the valve stroke curve.

Figure 6G:
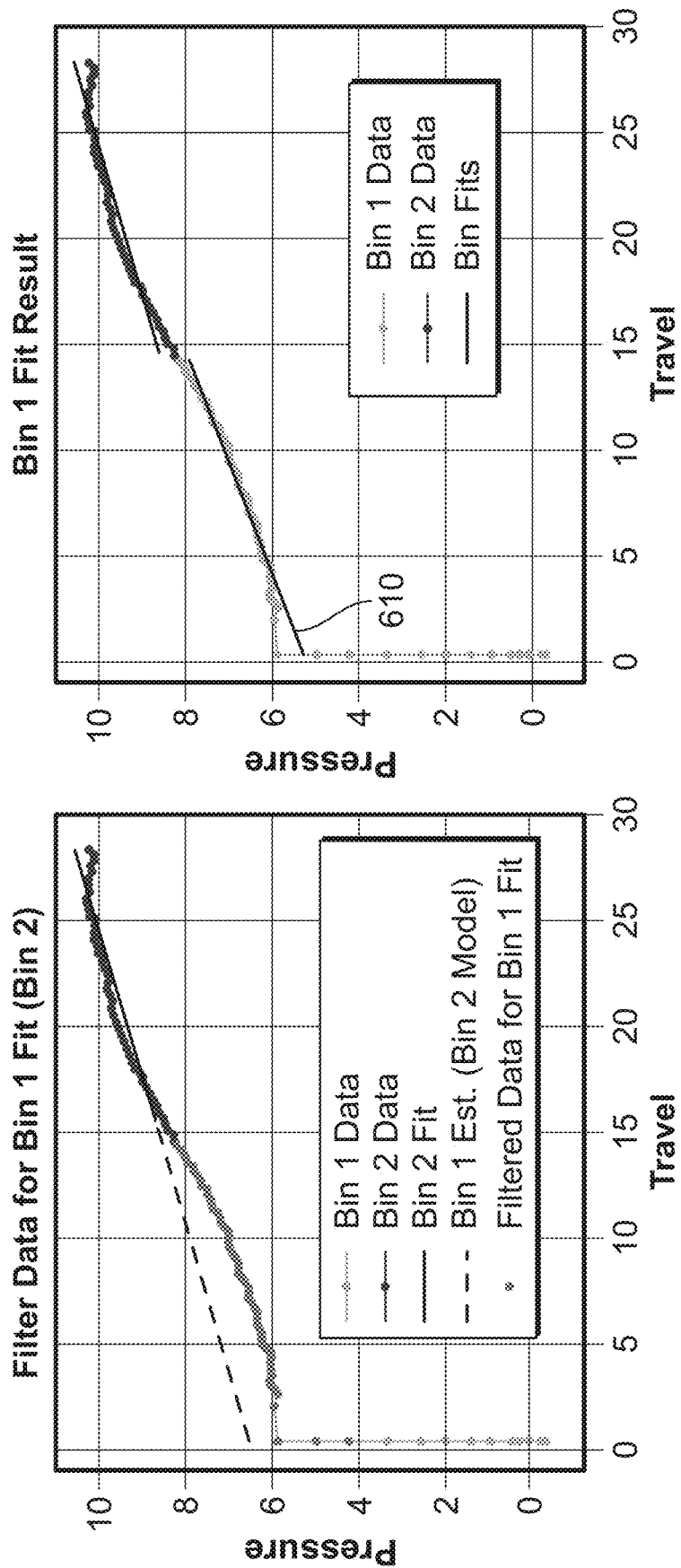

FIG. 6G depicts results of example alternative filtering of bins/segments associated with the valve stroke curve of FIG. 6F. In this example, a different filtering technique is utilized in contrast to that of FIG. 6F. As a result, a curve 610, which represents a fit of the first bin being filtered, has a significantly improved fit compared to that of the curve 608 of FIG. 6F. An example pseudocode of filtering that can be implemented in examples disclosed herein is shown below:

% If too many samples have been filtered out, instead use this logic to filter:
  % 1) Find first data point i psi from pressure extreme (depends on al z direction).
  % 2) Omit samples aft point found in step i.
  % 3) Also omit samples with pressure error greater than 3 (using bin 2s model) % Note: step 3 is a sort of middle ground from previous logic. This logic can still have trouble if the tail is not pronounced (<1 psi).

```
if sum (use_idx) < 20
fprintf ('#1\n')
if strcmp (air dir, 'Open')
    tail start idx=find(bin_fit(1).open.y > min(bin_fit(1).open.y) + 1, 1,
    'first');
else
    tail start idx =find(bin_fit(1).open.y > max(bin fit (i) .open.y) −1, 1,
    'first');
end
if isempty (tail_start_idx), error ( 'new'); end
if bin fit(1).open.N − tail_start_idx < 20, error ('new'); end % Still too
few.
use idx = false (bin_fit(1).open.N, 1);
use idx (tail_start_idx:end) = true;
use idx(y_err > 3) = false;
end
```

Figure 6H:
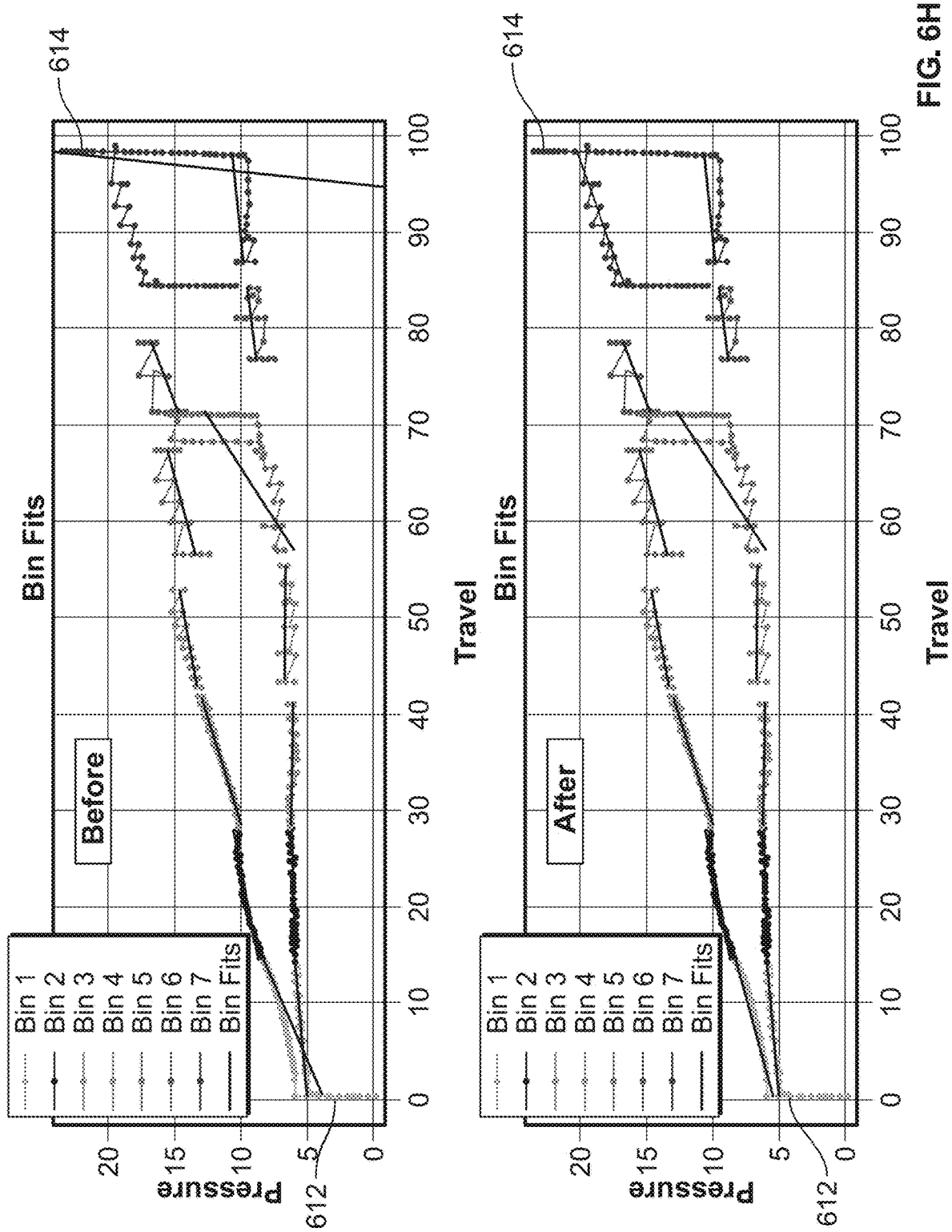

Turning to FIG. 6H, results of bin fits "before" and "after" filtering are shown. In particular, the graph marked "before" corresponds to curve fits of bins without executing a filtering step and/or implementation by the bin analyzer circuitry 307 and/or the filter circuitry 306. Conversely, the graph marked "after" corresponds to curve fits of the bins subsequent to filtering. As can be seen in the illustrated example of FIG. 6H, fits of bins corresponding to travel edges 612, 614 are considerably improved.

Figure 6I:
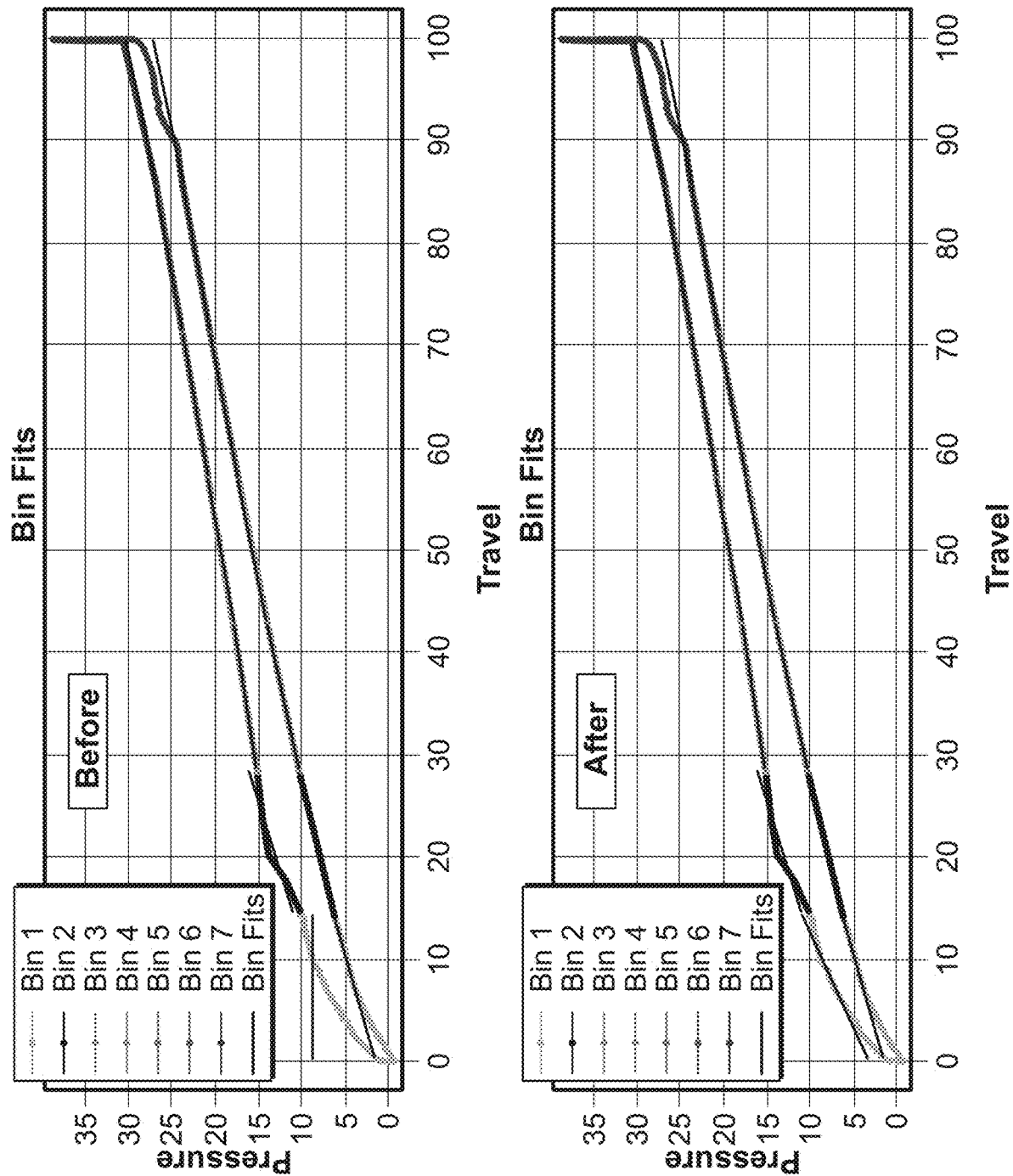

FIG. 6I also depicts improved curved fits between a graph corresponding to "before" filtering has occurred and another graph corresponding to fit results "after" filtering. Similar to the example of FIG. 6H, filtering according to examples disclosed herein enables considerably improved curve fits and, thus, characterization of the valve 102.

Figure 7A:
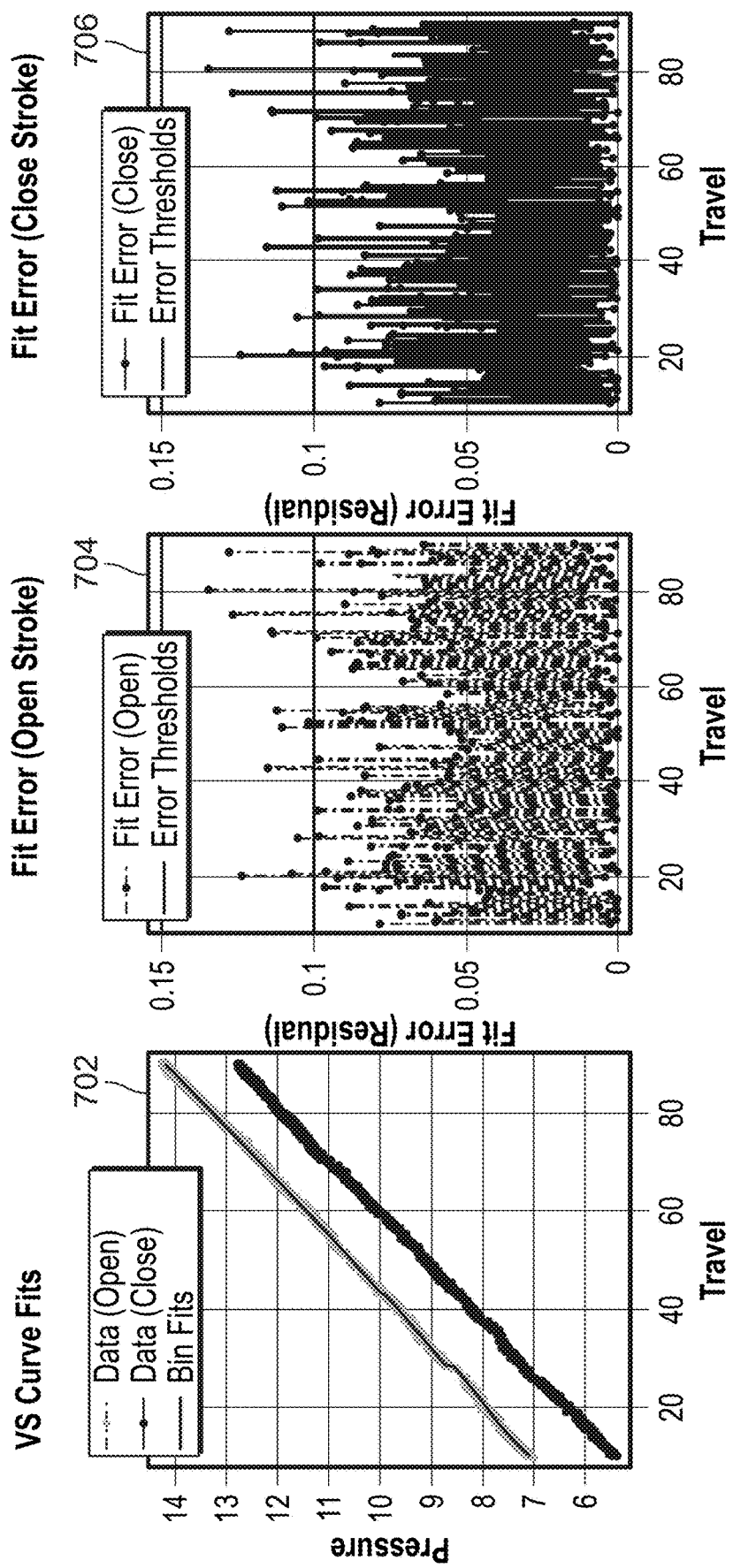
FIGS. 7A-7E illustrate example characterization of valve stroke curves that can be implemented in examples disclosed herein.

FIGS. 7A-7E illustrate example characterization of valve stroke curves that can be implemented in examples disclosed herein. For example, the characterization can be performed by the example bin analyzer circuitry 307. In particular, FIGS. 7A-7E illustrate different analyses and/or information that can be extracted from valve stroke curves (e.g., filtered valve stroke curves). Turning to FIG. 7A, an example calculation of open/close fit errors is shown. In this example, a graph 702 corresponds to a detailed (e.g., narrowed) portion of a range of a valve stroke curve. Further, an example graph 704 corresponds to fit errors of the aforementioned range during opening of the valve 102 (e.g., an opening stroke of the valve 102). Likewise, an example graph 706 corresponds to fit errors of the aforementioned range during closing of the valve 102 (e.g., a closing stroke of the valve 102). According to some examples disclosed herein, the fit errors can correspond to a difference between obtained values of the valve stroke curve and expected and/or predicted values. Additionally or alternatively, the fit errors can correspond to differences (e.g., differentials) between adjacent and/or proximate data points of the valve stroke curve. In this example, an error threshold is shown with respect to the aforementioned fit errors. According to examples disclosed herein, a fit error exceeding and/or meeting the error threshold can correspond to and/or indicate a degree to which the valve 102 and/or the actuator 101 will continue to operate normally and/or within specified operational parameters.

Figure 7B:
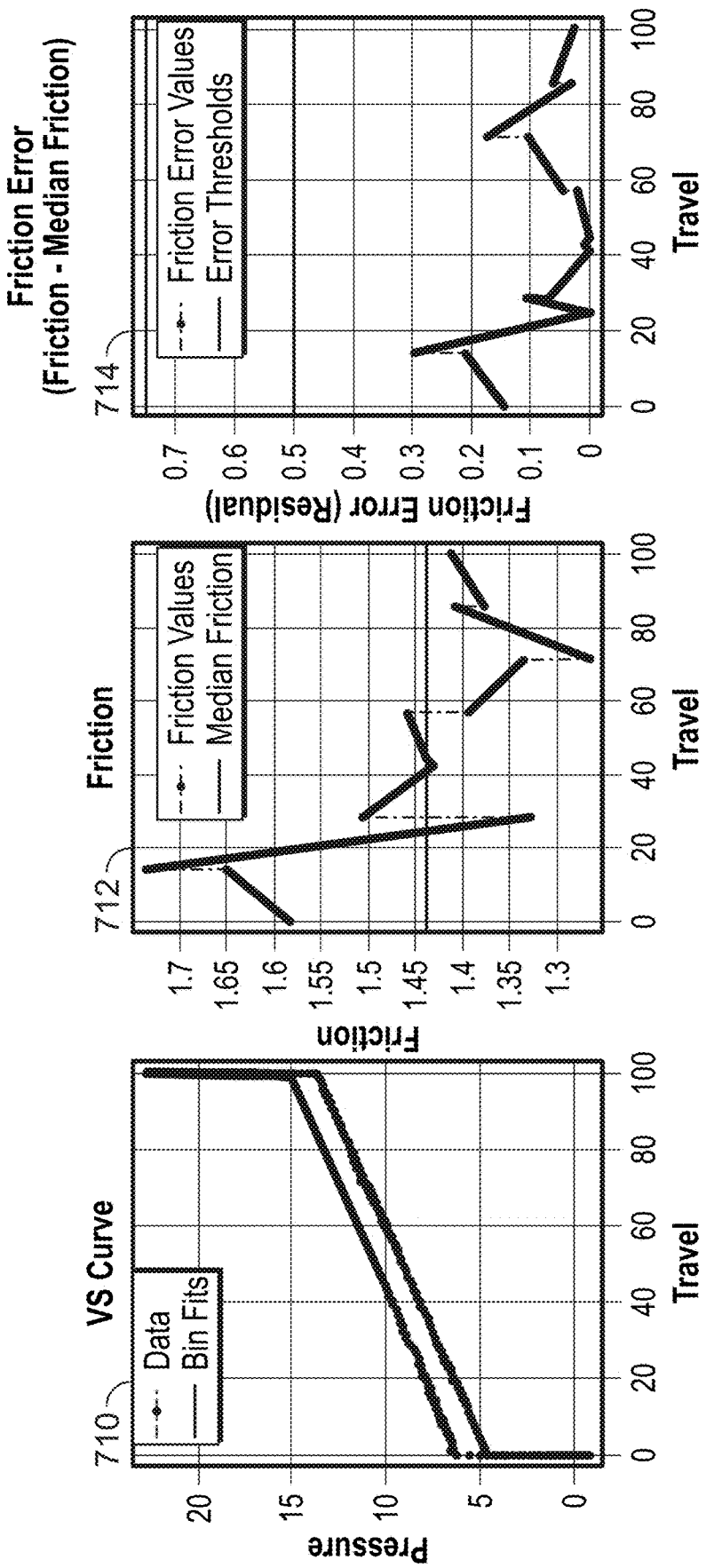

FIG. 7B depicts an example valve stroke curve 710 with a corresponding example friction graph 712 and an example friction error graph 714. In the illustrated example of FIG. 7B, the friction graph 712 corresponds to an amount of friction encountered through an entire range of movement of the flow control member 122 and the friction error graph 714 corresponds to friction error residuals that are normalized (e.g., unitless). In this example, fitted pressure values are utilized to mitigate, reduce and/or eliminate the effects of non-linearities and anomalies in the valve stroke curve (i.e., the unfiltered valve stroke curve).

In this example, as depicted in the friction graph 712, friction is calculated throughout an entire range of the valve stroke curve. In some examples, the friction is calculated based on a median friction (e.g., a median friction for each datapoint). Further, the example friction error graph 714 depicts how much the friction deviates from a mean.

In some examples, to calculate friction, a uniform travel vector is utilized for the valve 102 (e.g., every 0.1% between minimum and maximum values) and, in turn, it is determined which points are associated with and/or belong to certain bins. In some examples, expected friction values are calculated for each bin during opening or closing strokes. In some such examples, the friction values are calculated based on differences between the uniform travel vector and the expected friction values.

In this example, the graph 712 is depicted with a threshold friction error value and the graph 714 is depicted with a threshold friction error residual, which is normalized in this example. The thresholds depicted in FIG. 7B can be utilized to indicate and/or determine a degree of operational life and/or health, for example.

Figure 7C:
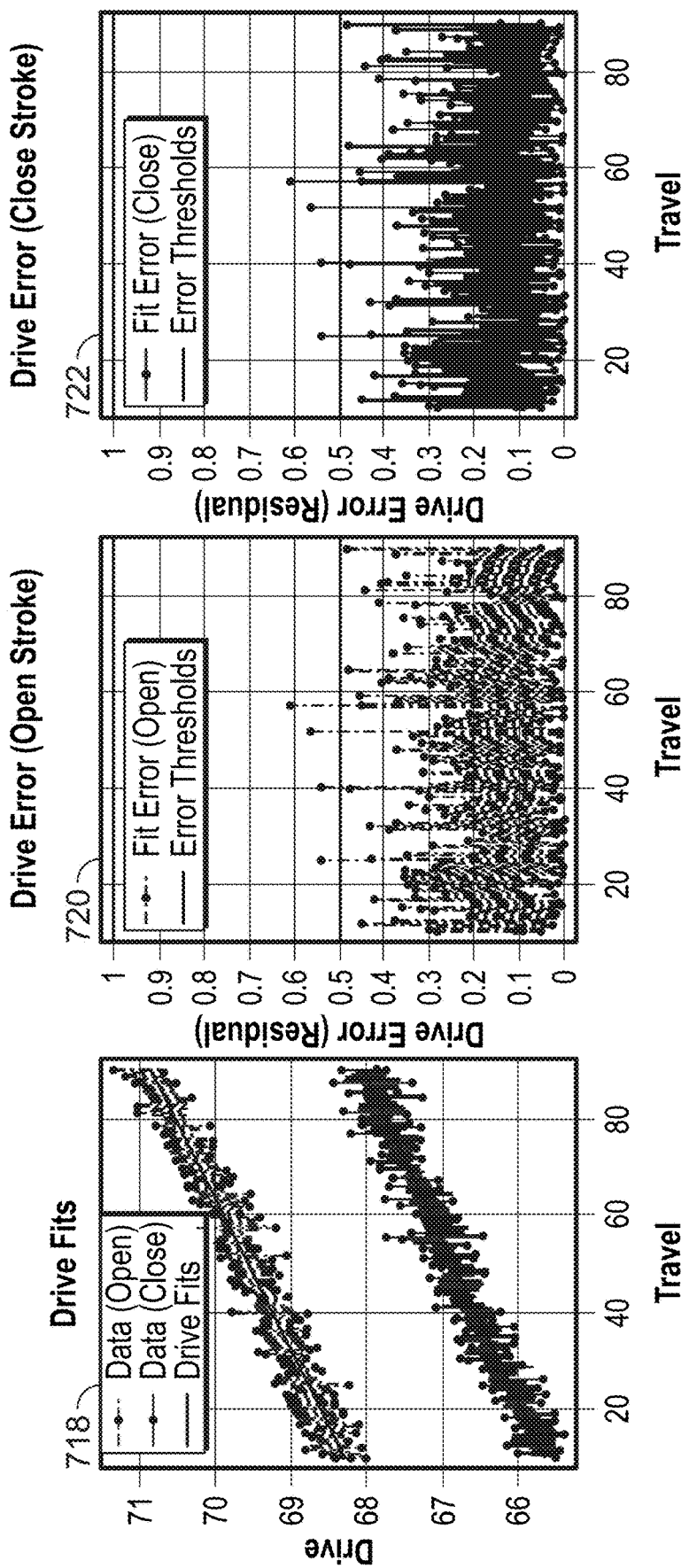

Turning to FIG. 7C, an example drive error analysis is shown. In this example, a first example graph 718 depicts drive data as a percentage of drive utilized with respect to travel. In the illustrated view of FIG. 7C, an example graph 720 represents drive error with respect to travel of the flow control member 122 during an opening stroke of the flow control member 122 while an example graph 722 represents drive error with respect to travel of the flow control member 122 during a closing stroke of the flow control member 122. Further, in this example, the graph 720 and the graph 722 both depict a drive error threshold. According to examples disclosed herein, drive error exceeding and/or meeting the error threshold can correspond to and/or indicate a degree to which the valve 102 and/or the actuator 101 will continue to operate normally and/or within specified operational parameters.

According to examples disclosed herein, characteristics that may indicate operation of the actuator 101 and/or the valve 102 include, but are not limited to, values of the valve stroke curve that are within specification range(s), non-linearities in the valve stroke curve (e.g., of the bins of the valve stroke curve, portions of the valve stroke curve, etc.), noise in the drive signal during a stroking movement. In some examples, only a portion or section of the valve stroke curve is analyzed for noise and non-linearities during a stroke (e.g., a narrowed range of travel between approximately 10% to 90% of the overall range of travel of the flow control member 122). Any of the aforementioned parameters and/or characteristics can be utilized in determining an operational condition and/or health of the valve 102.

In some examples, consecutive data at travel edges (e.g., extreme edges) of the valve stroke curve can be utilized to partition data. In some examples, a linear fit (e.g., a linear regression fit) is applied to data of the valve stroke curve with a regression process/methodology for relatively robust regression results.

Figure 7D:
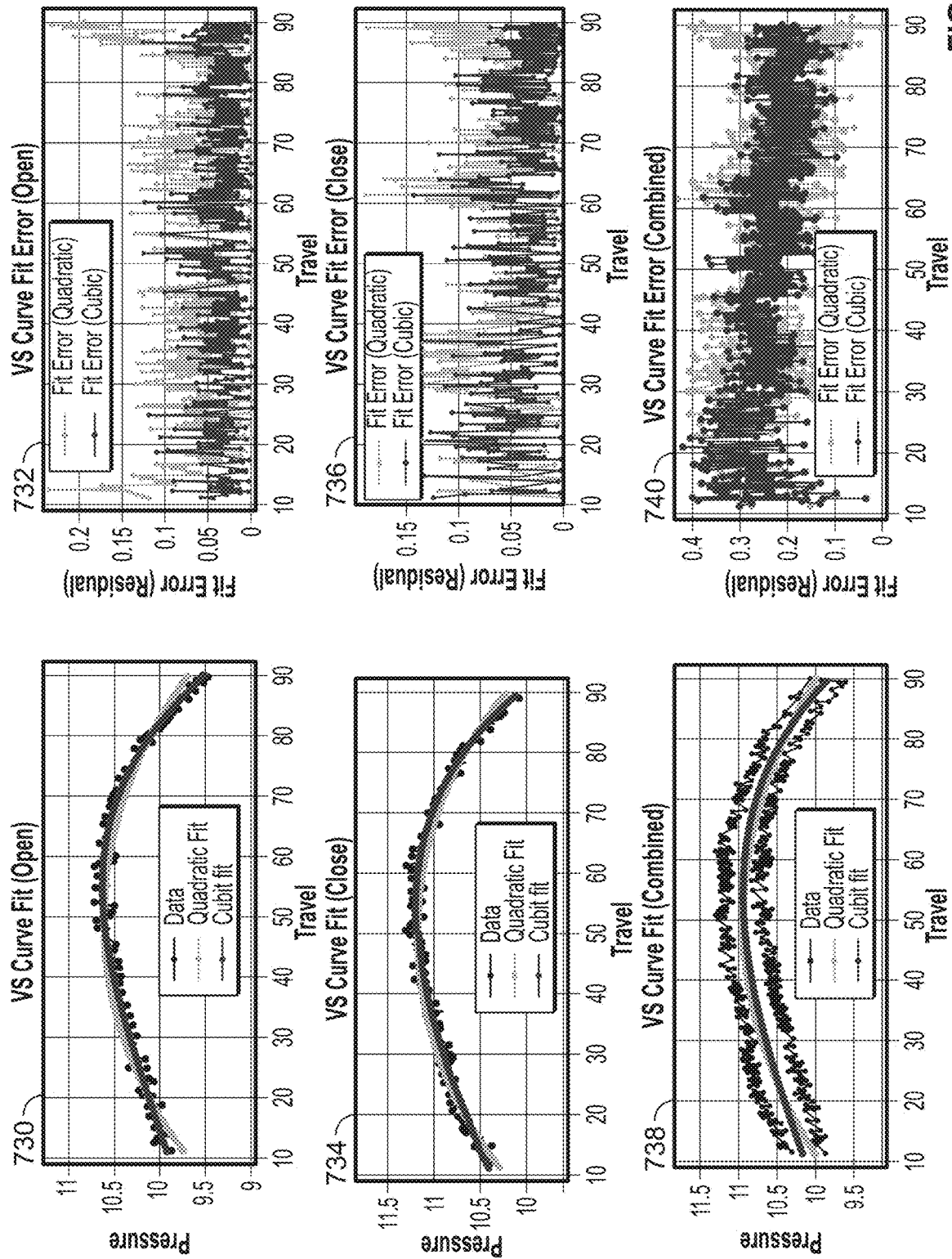

FIG. 7D depicts non-linear curve fit that can be implemented in examples disclosed herein. In this example, a graph 730 pertains to a portion of a valve stroke curve that generally exhibits non-linear behavior during an opening stroke of the valve 102. In particular, open, close and combined open/close data is shown. In this example, the data (e.g., at least one bin of the data) is fit with both a quadratic fit and a cubic fit. Further, an example graph 732 depicts fit errors for the quadratic and cubic fits shown in the graph 730.

According to the illustrated example of FIG. 7D, a graph 734 pertains to a portion of a valve stroke curve that generally exhibits non-linear behavior during a closing stroke of the valve 102. In this example, the data is fit with both a quadratic fit and a cubic fit. Further, an example graph 736 depicts fit errors for the quadratic and cubic fits shown in the graph 732.

In this example, a graph 738 depicts a combination of both closing and opening strokes. In the illustrated example of FIG. 7D, a quadratic fit curve and a cubic fit curve are fit for the aforementioned combination of closing and opening stroke data. Further, an example graph 740 depicts curve fit errors of the combination. Particularly, the example graph 740 depicts both quadratic and cubic fits of the combined data.

In some examples, the curve fit error can be utilized to determine potential errors and/or a predicted health of the valve 102 and/or the actuator 101. In some examples, an improvement from quadratic to cubic suggests an S-curve, which can be better represented by a cubic polynomial. In some examples, curve fits are performed for opening strokes, closing strokes and a combination of the opening and closing strokes. In some examples, data between the travel edges (e.g., data representing a travel range between 10% and 90% of the movement range) is excluded.

Figure 7E:
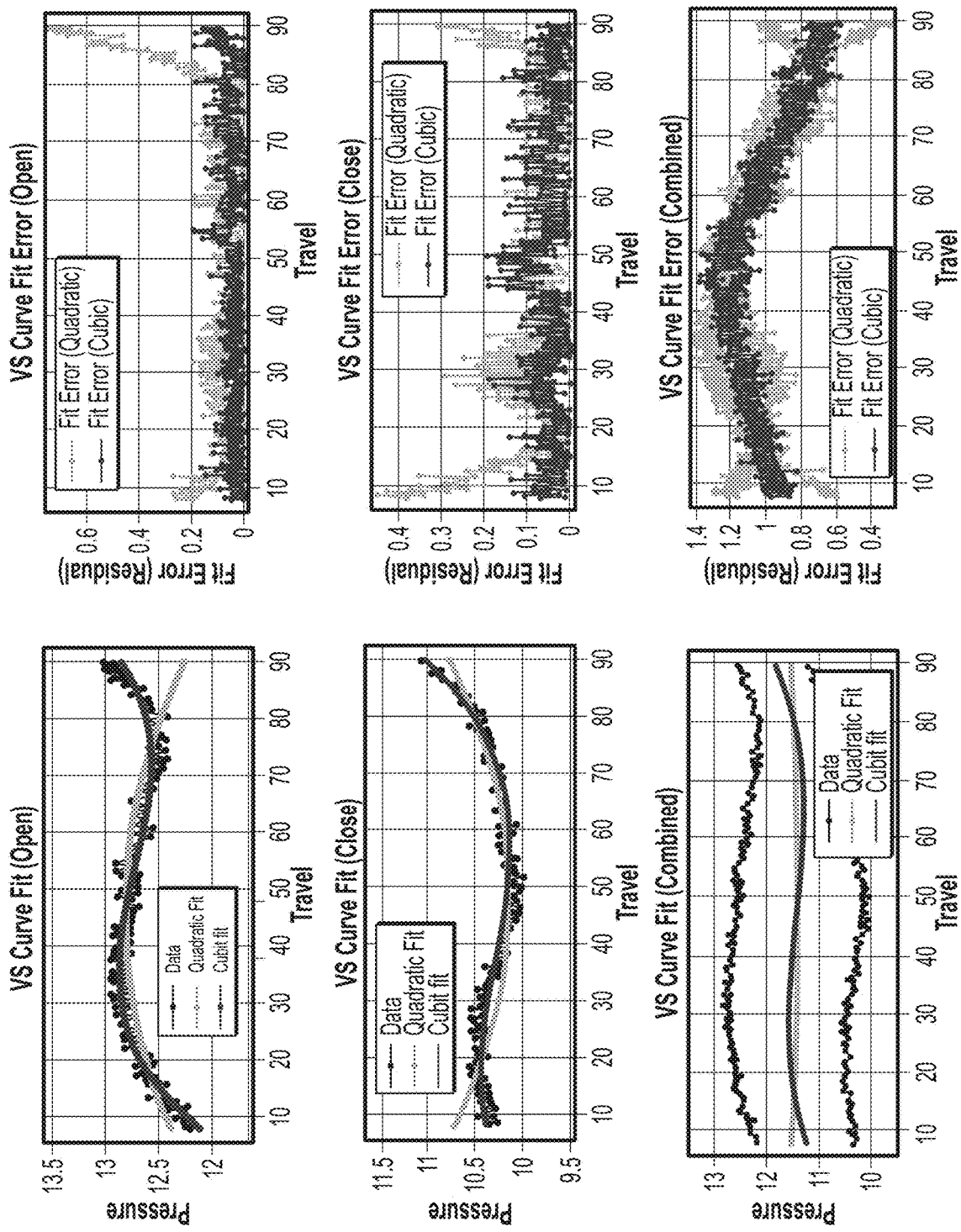

Turning to FIG. 7E, another example visualization similar to that of FIG. 7D is shown. Similar to the example of FIG. 7D, an opening stroke, closing stroke and combined opening/closing stroke are curve fit via a quadratic fit and a cubic fit. Further, the corresponding fit errors are also depicted.

Figure 8A:
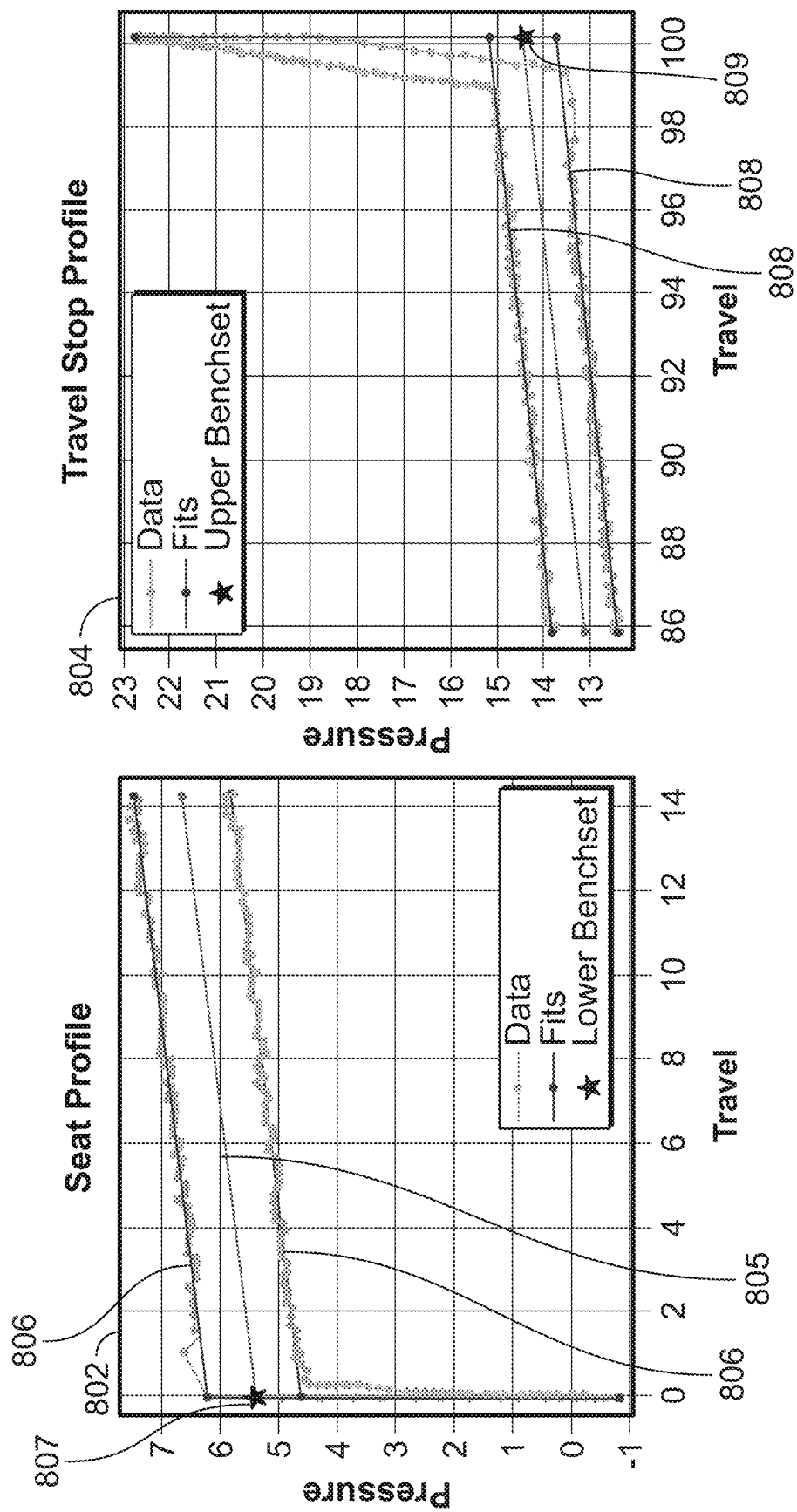
FIGS. 8A-8D illustrate example feature extraction that can be implemented in examples disclosed herein.

FIGS. 8A-8D illustrate example feature extraction that can be implemented in examples disclosed herein. For example, the feature extraction can be performed by the example bin analyzer circuitry 307. FIG. 8A depicts a detailed view of portions of a valve stroke curve fit. In particular, an example graph 802 depicts a seat profile (e.g., a seating travel edge) while an example graph 804 depicts a travel stop profile (e.g., a travel stop travel edge). In this example, the graph 802 and the graph 804 include opening and closing strokes of the flow control member 122.

In the illustrated example of FIG. 8A, bench set data is determined for both the seat profile and the travel stop profile. In this example, a lower bench set is fit for the seat profile and an upper bench set is fit for the travel stop profile. In particular, at least portions of the stroking region of the valve stroke curve are ignored and/or disregarded in determining the lower and upper bench sets. As a result, determination of the bench set data is not skewed and/or distorted by bins and/or regions associated with the stroking region. In some examples, bench set values (e.g., lower and upper bench set values) corresponding to extreme positions of the flow control member 122 are characterized and/or determined.

To determine the bench set and/or plot bench set data, travel edges are demarcated, determined and/or divided from the valve stroke curve. For example, the valve stroke curve is separated into bins corresponding to the seat profile and the travel stop profile. In turn, curves 806 corresponding to motion of the flow control member 122 in the seat profile are fit to the data. Further, a curve 805 corresponds to theoretical frictionless motion and can be referred to as a "zero friction line." In some examples, the curve 805 is fit as an average of the curves 806. Accordingly, a lower bench set value 807 is determined and/or characterized. Likewise, the travel stop profile of the valve stroke curve has corresponding curves 808 fit to characterize motion of the flow control member 122 in the travel stop portion of the valve stroke curve. In this example, an upper bench set value 809 is determined based on the fitted curves 808, According to examples disclosed herein In some examples, the lower bench set value 807 and the upper bench set value 809 are based on a fit and/or average of the fitted curves 806, 808, respectively. For example, the lower bench set value 807 and the upper bench set value 809 can be characterized as averages (e.g., curve averages) of the fitted curves 806, 808, thereby establishing bench set values and/or characteristics of the valve 102 to be accurately determined while mitigating distortions and/or non-linearities that may be present with at least portions of the stroking region, for example. However, any other appropriate methodology and/or calculation(s) can be utilized to determine bench sets (e.g., bench set values, bench set curve fits, etc.).

Figure 8B:
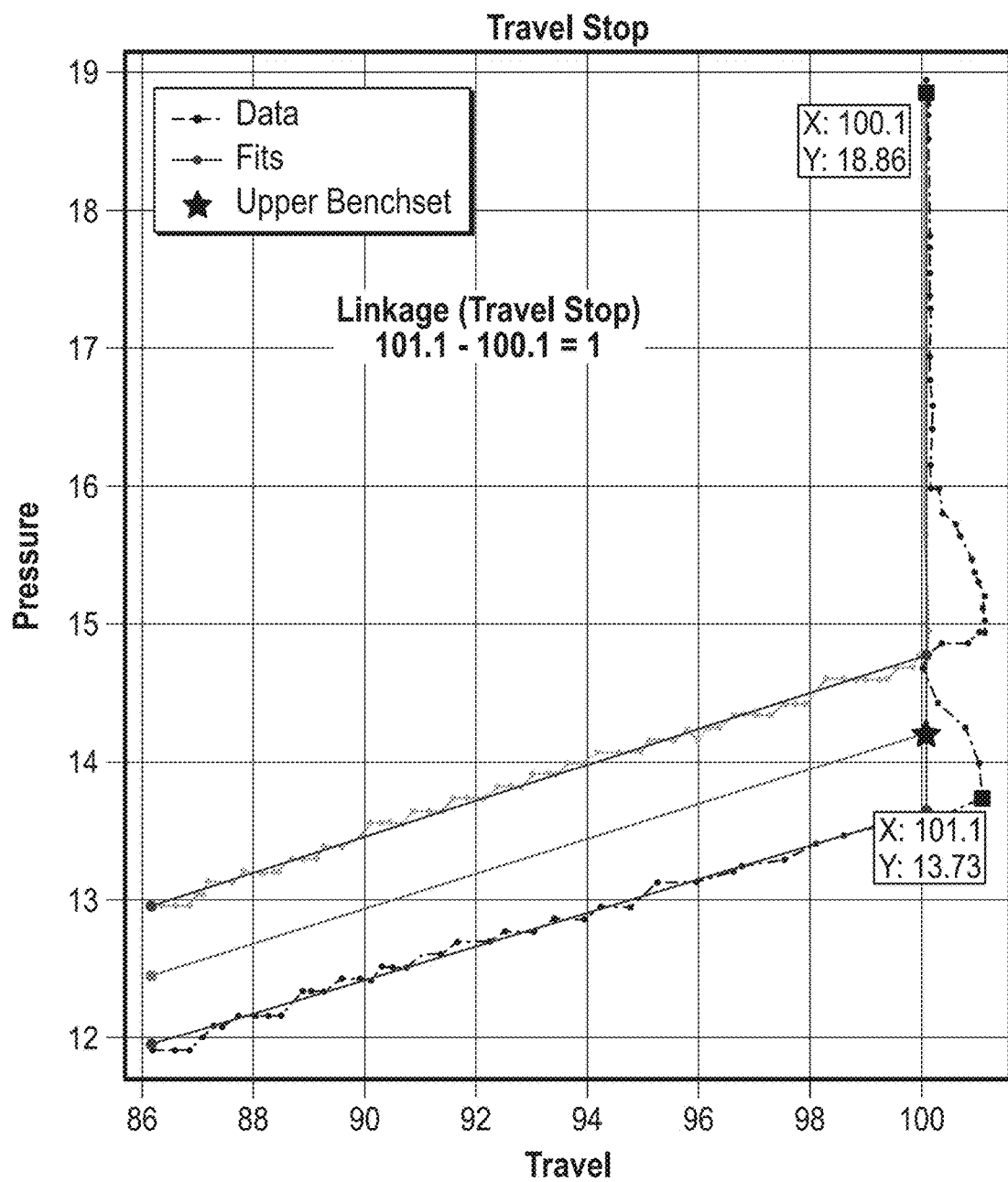

FIG. 8B depicts example determination and/or characterization of a linkage associated with the example valve 102. In this example, a zero travel (e.g., 0% travel) and full travel (e.g., 100% travel) of the flow control member 122 are calculated based on tail fits of seat/travel stop profiles, such as those shown above in connection with FIG. 8A. In some examples, the linkage seat is calculated as the absolute of (Travel Min-Zero Travel). Further, an error of the linkage travel stop, which can correspond to "slop" of a linkage, is calculated as the absolute of (Travel Max-Full Travel). In some examples, the tails of both the seat profile and the travel stop profile are characterized and/or fitted (e.g., via a linear fit, etc.). In some examples, Travel Min and Travel Max are calculated based on the $1^{st}$ and $99^{th}$ percentile of travel signal.

Figure 8C:
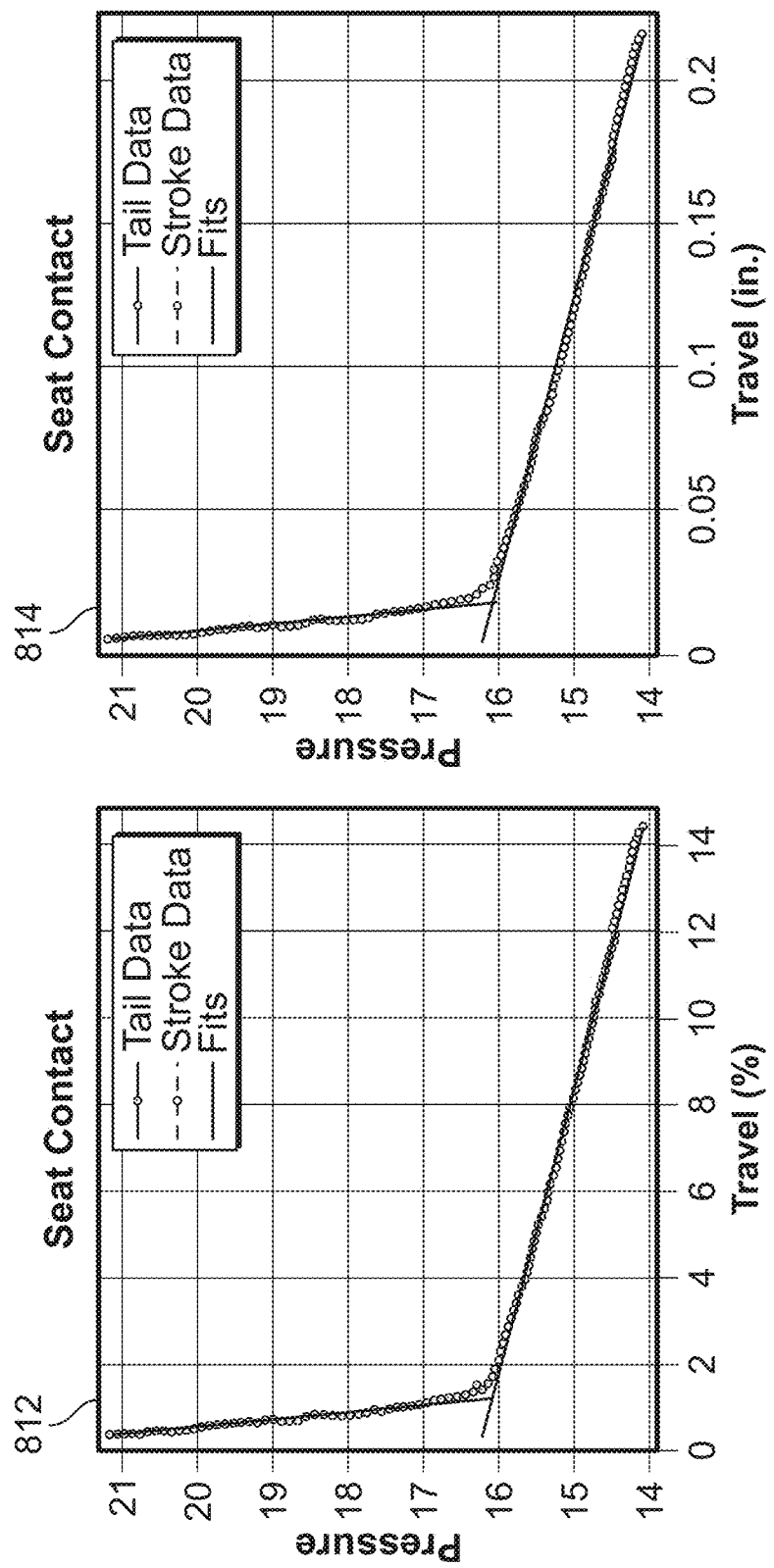

Turning to FIG. 8C, example graphs 812, 814 are shown. In particular, the graph 812 corresponds to tail and stroke data with respect to a travel percentage while the graph 814 corresponds to tail and stroke data with respect to travel (e.g., in inches). In this example, seat contact data is extracted from the valve stroke curve.

Figure 8D:
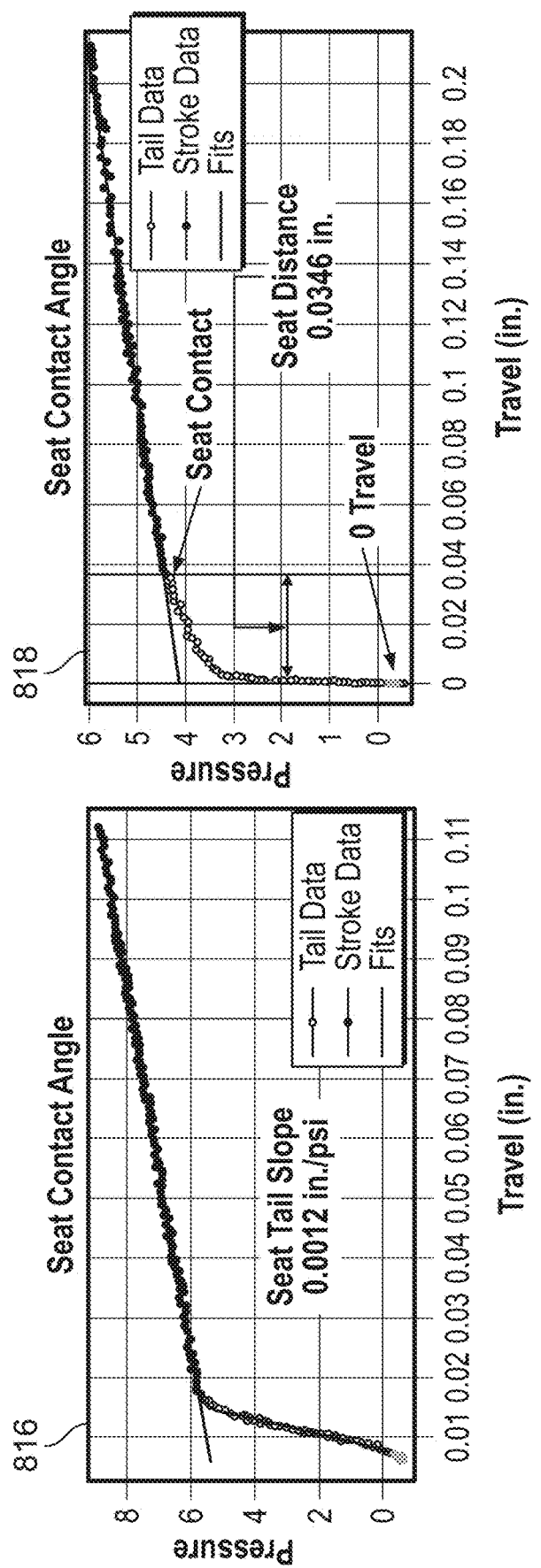

Turning to FIG. 8D, example feature extraction is shown. As can be seen in example graphs 816, 818, seat contact slope, seat contact travel position and a seat contact distance are determined, thereby enabling an accurate determination of a potentially malfunctioning seat and/or general operation of the flow control member 122. In this example, the seat contact slope and the seat contact distance can be strong indicators of a seat that is not operating properly and/or an unhealthy valve/actuator.

In the illustrated example of FIG. 8D, to determine seat distance, which is a distance from zero travel to the seat contact in this example, certain pressure ranges are utilized to mitigate the effect(s) of relatively large seat loads corresponding to the flow control member 122. Accordingly, in some examples, only data in certain pressure ranges, such as 1, 3 and 5 pounds per square inch (psi), are considered. Accordingly, the seat distance can indicate a condition of the seating of the flow control member 122. To that end, an out-of-specification and/or malfunctioning seat can have a relatively larger distance than a seat that is operating within operational and/or desired parameters.

In some examples, filtering is performed (e.g., error residual filtering, etc.) within a certain pressure range proximate the stroke. In some such examples, residuals/error values can be sorted to analyze the residuals with the highest values (e.g., the highest five residuals), thereby mitigating a necessity and/or requirement to accurately select and/or determine an accurate (e.g., nearly exact) seat contact point. For example, the second and third highest residuals having relatively large values can indicate that the seat of the flow control member 122 and/or the valve 102 is malfunctioning and/or not occurring within operating specifications. In some examples, the features extracted are done with respect to a percentage of travel of the flow control member 122 and in a distance (e.g., in inches). In some examples, the zero travel position is verified (e.g., a degree of closeness of the minimum travel to 0) for determination of an operational condition of the valve 102.

FIGS. 9A-9I illustrate example feature extraction and/or health information determination that can be implemented in examples disclosed herein, particularly by the example bin analyzer circuitry 307 and/or the example condition determiner circuitry 308, for example. In the examples of FIGS. 9A-9I, features related to pressure noise in the valve stroke curve are extracted. For example, error metrics can be utilized for a determination and/or analysis of an operating condition of the valve 102. Error metrics may be extracted individually for opening and closing strokes and can include, but are not limited to, fit metrics (e.g., mean squared error, mean absolute error, standard deviation of error, etc.), percent error above thresholds and/or a zero cross rate (e.g., a vibration metric that can be calculated). According to examples disclosed herein, pressure noise fit error is calculated using bin fits (i.e., segment fits) to mitigate the effects of non-linearities in the stroke. Accordingly, in some examples, only a defined range of travel of the valve stroke member 122 is utilized (e.g., 10%-90% of travel of the valve stroke member 122).

Figure 9A:
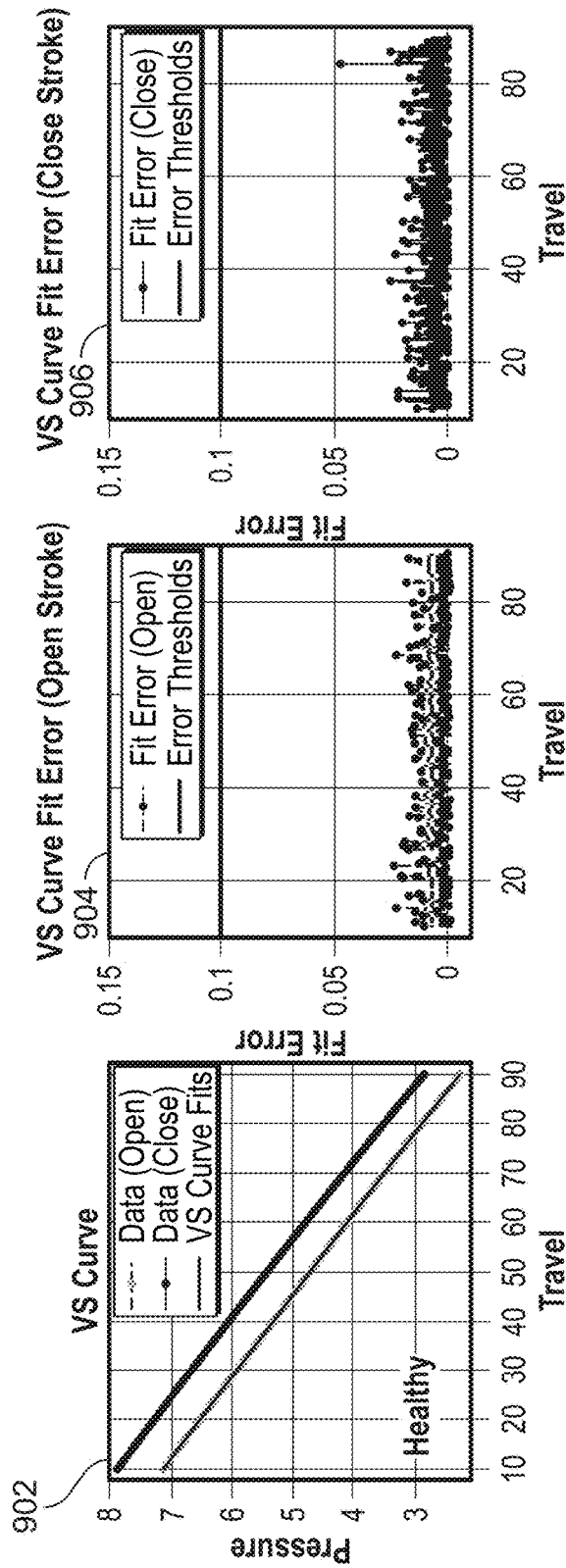

Turning to FIG. 9A, a portion of a graph 902 represents a portion of a valve stroke curve corresponding to 10% to 90% of travel. However, any appropriate travel percentage range can be utilized for characterization instead. Further, example graphs 904, 906 depict fit error during opening and closing strokes, respectively. According to examples disclosed herein, an amount of noise in a valve stroke curve can be utilized for comparing to thresholds. In this example, threshold values of fit errors of 0.10 and 0.15 indicate fault threshold that can be utilized in determining whether a fault is likely (e.g., exceeds a probability threshold). However, any other appropriate threshold values can be implemented instead.

Figure 9B:
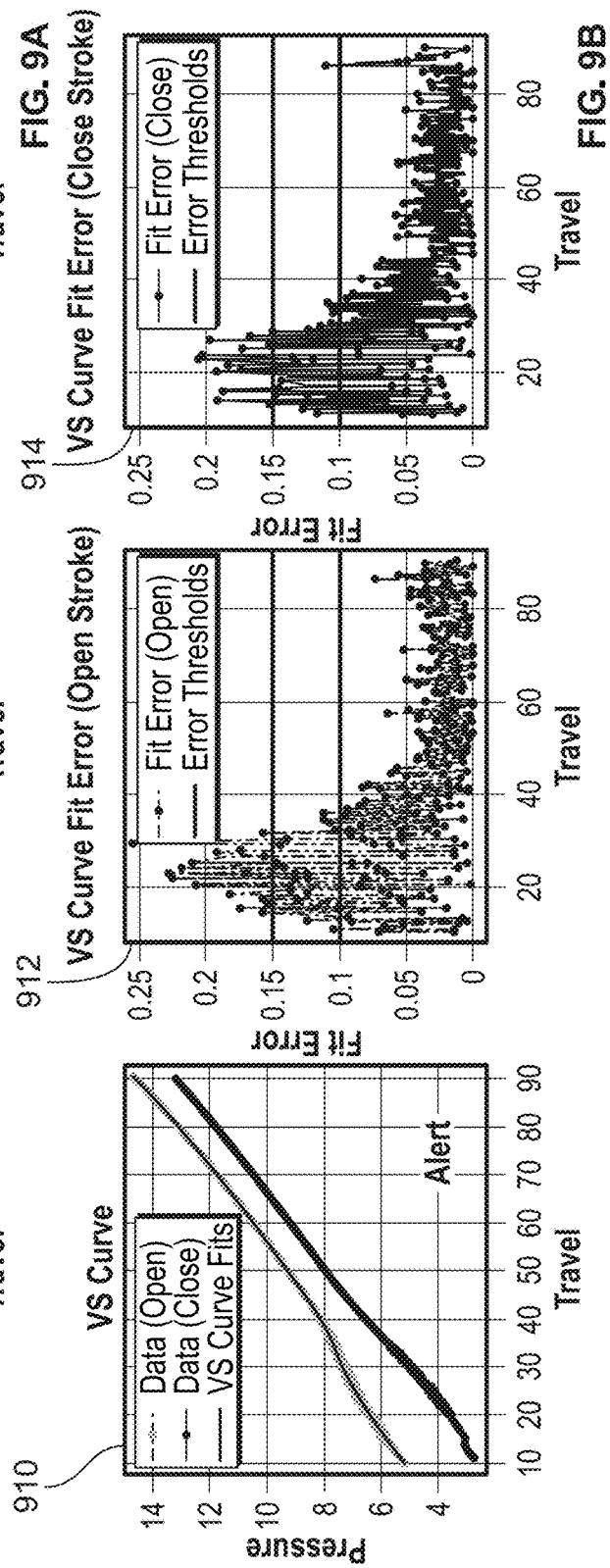

FIG. 9B depicts an example valve stroke curve 910 with corresponding fit error plots 912, 914. While the valve stroke curve 910 has a similar range to the valve stroke curve 902 shown in FIG. 9A, the fit errors during the opening stroke and the closing stroke exceed the fit error threshold values, thereby indicating a potential malfunction and/or incorrect operation of the valve 102, for example.

FIG. 9C depicts another valve stroke curve with corresponding fit errors. Similar to the example of FIG. 9B, the fit errors of both the opening and closing strokes exceed the fit error thresholds. Further, the fit errors in this example exceed the fit error thresholds over a wider range of travel of the flow control member 122 in comparison to the example of FIG. 9B.

FIGS. 9D-9F correspond to drive fits corresponding to a valve stroke curve. In particular, FIGS. 9D-9F correspond to features related to a drive of the valve 102 that can be determined and/or extracted. For example, aspects pertaining to operation of the valve 102 can be captured including, but not limited to, whether the valve 102 is within operating specifications, non-linearities and noise associated with operation of the valve 102. Fit metrics of the valve 102 can correspond to fit metrics (mean squared error, mean absolute error, standard deviation of error, etc.), percent error above thresholds associated with noise, zero cross rate (e.g., a vibration metric), and consecutive counts (positive and negative) corresponding to error imbalance and/or non-linearity. In some examples, only data over a portion of the range of travel of the flow control member 122 (e.g., 10% to 90% of the range of travel of the flow control member 122). Further, the minimum and maximum of the drive during the stroke can indicate whether the drive signal is operating within operational specifications.

FIG. 9D depicts a graph 920 that corresponds to a portion of the valve stroke curve between 10% and 90% of a range of travel of the flow control member 122. Example graphs 922 and 924 correspond to opening and closings strokes, respectively, of the flow control member 122. In this example, the drive errors of both opening and closing strokes does not exceed the drive error thresholds that are equal to approximately 0.5 and 1.0.

FIG. 9E depicts a valve stroke curve 926 with corresponding opening and closing stroke error graphs 927, 928, respectively. As can be seen in the error graphs 927, 928, the drive error exceeds the thresholds between a range of 10% to 20% during the opening stroke. However, the drive error threshold is not exceeded during any portion of the closing stroke.

FIG. 9F corresponds to a valve stroke curve with a relatively significant amount of drive noise. In this example, the drive error thresholds are exceeded by during both opening and closing strokes of the valve 102, thereby indicating a potentially faulty and/or incorrect operation thereof. In some examples, the bin analyzer circuitry 307 can make such a determination.

Figure 9G:
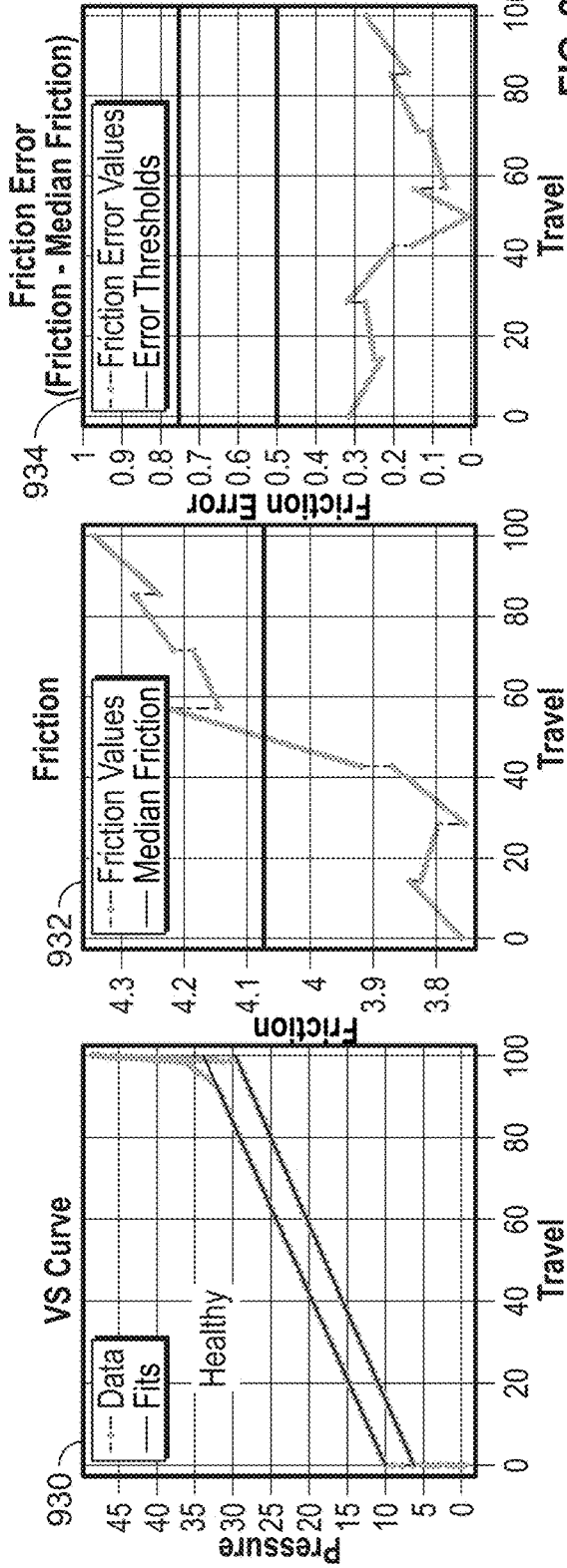
Figure 9H:
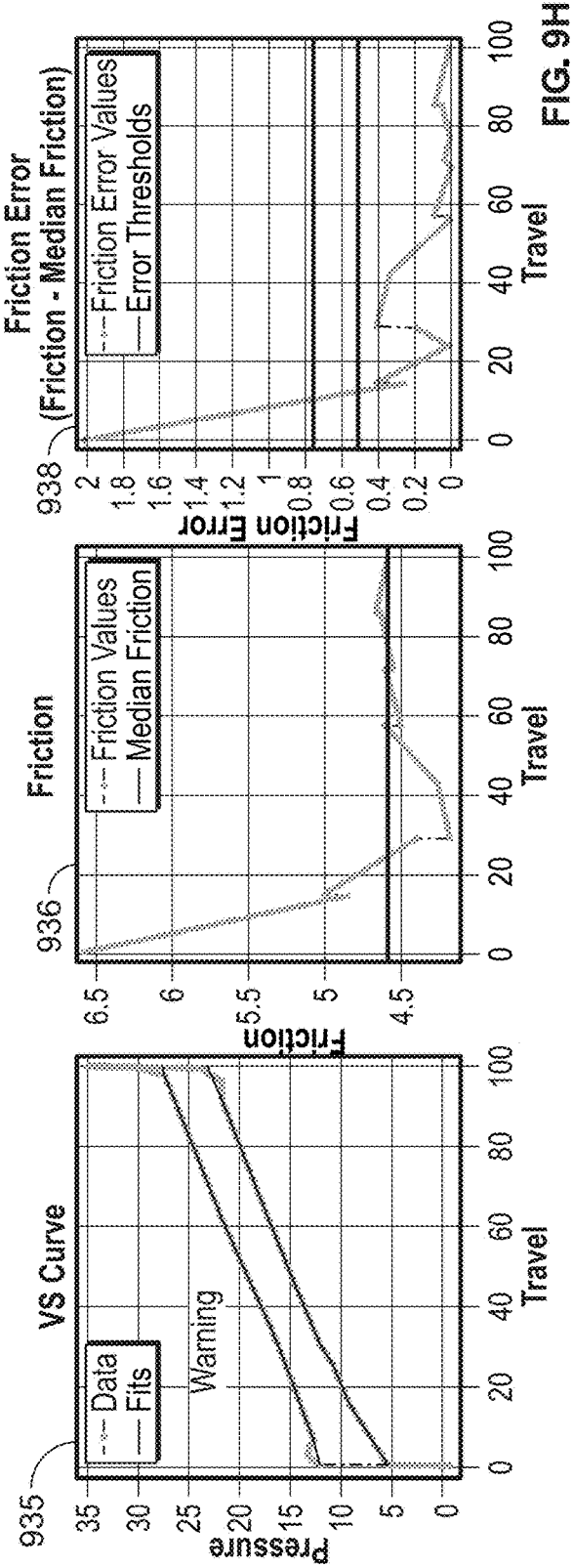

FIGS. 9G and 9H illustrate example friction analysis that can be implemented in examples disclosed herein. In some examples, friction is calculated using the bin fits to mitigate irregularities in the valve stroke curve. In some examples, various summary statistics are calculated from the friction (e.g., mean, median, min, max, variability). In some such examples, metadata is utilized in determining health models. In this example, friction error is determined by subtracting the median friction from friction. According to examples disclosed herein, similar summary statistics may be calculated for the error as well. The percentage error exceeding thresholds can be a particularly strong feature for friction.

Turning to FIG. 9G, a valve stroke curve 930 is shown with a corresponding friction curve 932, as well as a corresponding friction error curve 934. In this example, the friction curve 932 depicts a median friction across an entire range of travel of the flow control member 122 in addition to friction values across the range of travel. The example friction error curve 934 depicts friction error values across the range of travel and multiple error thresholds.

In the illustrated example of FIG. 9H, a valve stroke curve 935 is shown with a corresponding friction curve 936, as well as a corresponding friction error curve 938. In this example, the friction curve 936 depicts a median friction across an entire range of travel of the flow control member 122 in addition to friction values across the range of travel. The example friction error curve 938 depicts friction error values across the range of travel and error thresholds and corresponds to a warning level (e.g., an intermediate health condition level).

Figure 9I:
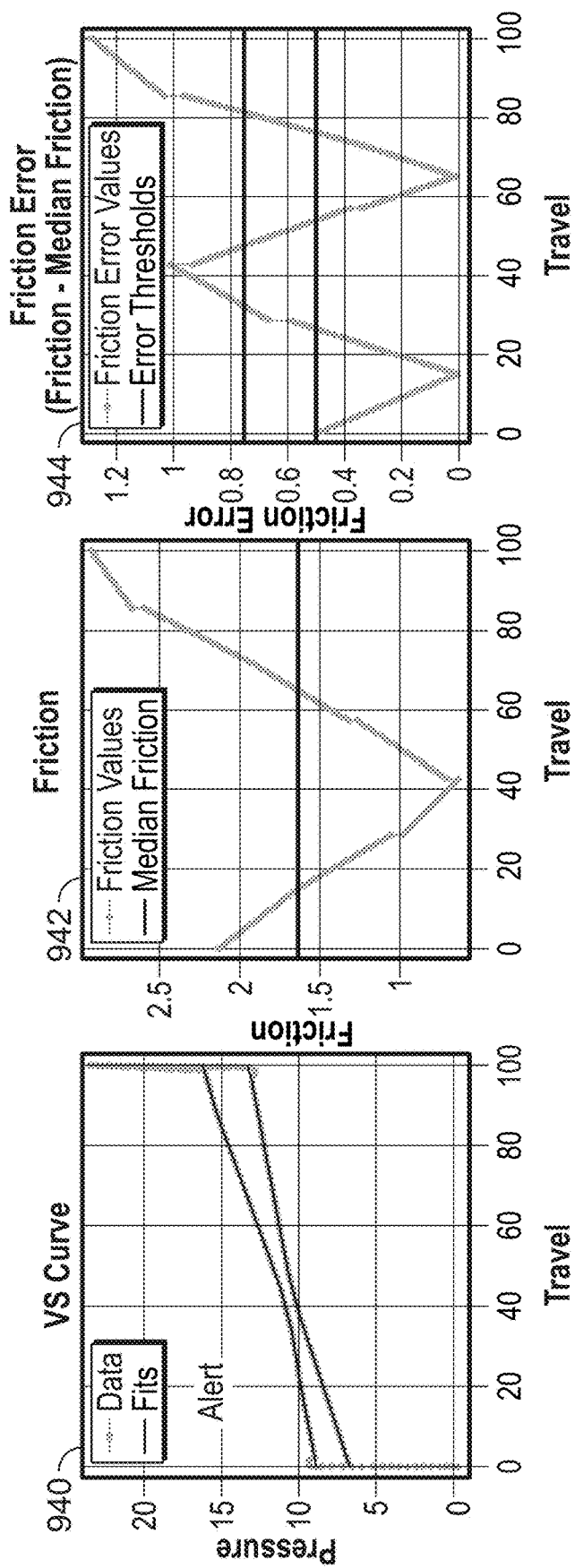

FIG. 9I depicts a valve stroke curve 940 with a corresponding friction curve 942 and a friction error curve 944. In this example, friction error exceeds friction threshold errors at numerous portions of the travel range of the flow control member 122. As a result, the valve 102 is deemed to have an alert operational status. According to examples disclosed herein, the alert operational status can correspond to an alert transmitted to a central/maintenance office (e.g., via the network 112 shown in FIG. 1A). The transmitted alert can indicate that the valve 102 is to be serviced and/or replaced.

Figure 10A:
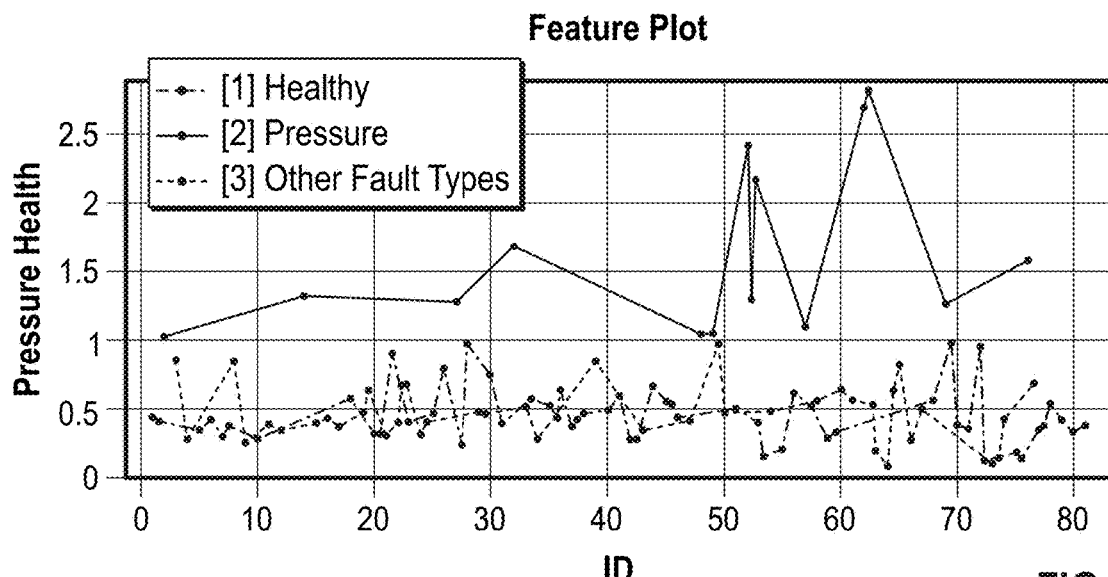
FIGS. 10A and 10B illustrate example health data analysis that can be implemented in examples disclosed herein.
Figure 10B:
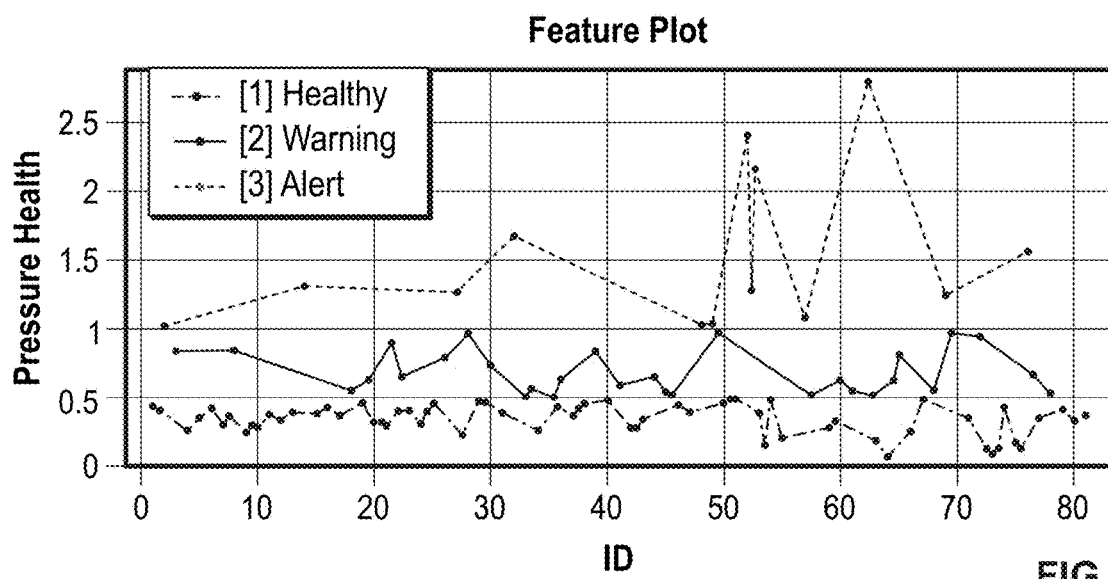

FIGS. 10A and 10B illustrate example health data analysis that can be implemented by the condition determiner circuitry 308, for example. According to examples disclosed herein, a health index can be determined to determine whether the valve 102 necessitates service or replacement. For example, the health index can be calculated by aggregating scaled residuals for inputs in each health model. In particular, residuals can be scaled with acceptance criterion thresholds for each feature (e.g., good, warning, alert, service, etc.), for example. In some examples, residuals are calculated using only the acceptance criterion but could incorporate machine learning and statistical thresholds in some examples. In some examples, fault diagnosis greatly improves use of the thresholds.

According to examples disclosed herein, model inputs can be checked and/or analyzed for dependent health models. While some health models use the outputs (health index) of other models, each model may have its own respective specified inputs, for example. In some examples, model inputs are located. In particular, model inputs can be located in a current feature header (e.g., updates for each model since those outputs are added).

In some examples, new feature headers model outputs) are initialized. In particular, three outputs for each feature (e.g., actual, residual, scaled residual) and one health value are utilized. According to some examples disclosed herein, residuals are calculated. In particular, features (e.g., model inputs) are pulled and/or accessed, and, in turn, scaled residuals are calculated.

In this example, a health index (e.g., aggregate residuals) is calculated by the condition determiner circuit 308. According to examples disclosed herein, a default aggregation method for the residuals is based on a maximum aggregate residual. However, each model can specify its own unique aggregation routine, for example. Some example aggregation routines utilize a technique where a certain feature (which can often be another model health output) is used to zero and/or normalize the other residuals for that model. In some examples, for the model valve stroke curve (e.g., related to pressure and noise), features can be utilized to identify (e.g., for pick up) valves with bad and/or malfunctioning potentiometers. Howe may not be preferable to diagnose bad potentiometers in the valve stroke curve (Pressure Noise) model. Therefore, for any valves that have a bad potentiometer health greater value than 1 (diagnosed bad pot), their corresponding residuals can be zeroed out, thereby resulting in a valve stroke curve (Pressure Noise) with a health value of 0, for example.

Turning to FIG. 10A, example valve grouping is illustrated. In this example, grouping by fault types is shown. In this example, a user designates which fault types to keep separate (keep_fault_types) and which ones to aggregate (Other Fault Types). In this example, groups are arranged as: (i) health, (ii) Fault Groups—valves will be grouped as selected and (iii) Other Fault Types—remaining valves (not healthy or selected—may not exist). An example valve can belong to two fault groups if selected. However, in such scenarios, the valve will not exist in Healthy or Other Fault Types.

Figure 11A:
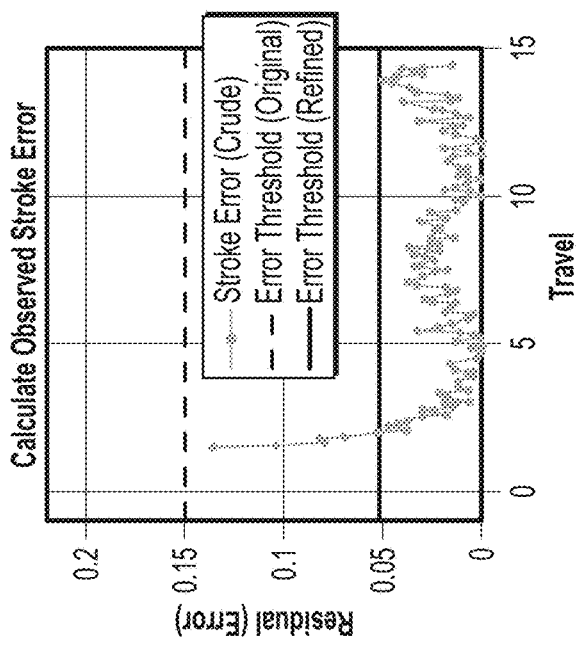
Figure 11A:
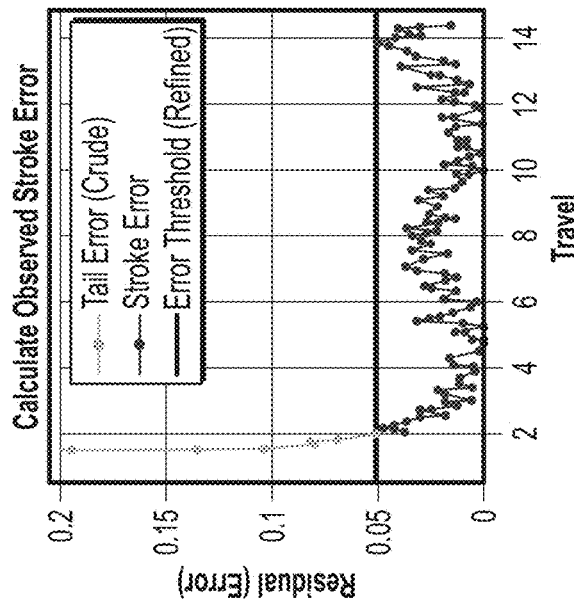

FIG. 10B illustrates grouping by health. In particular, a user can specify which health label to group, for example. The user can also change the warning and alert thresholds if desired. In some examples, there are three groups for health: (i) Healthy—health is between 0 and a warning level (0.5 default), (ii) Warning—health is between the warning level and an alert level (1 default), and (iii) Alert—health is greater than the alert level. In some examples, groups are removed if no runs match criteria FIGS. 11A-11D illustrate an example angle fit analysis that can be implemented in examples disclosed herein. For example, the analyses of FIGS. 11A-11D can be performed by the example bin analyzer circuitry 307. Turning to FIG. 11A, determination of an angle corner is shown. According to examples disclosed herein, during a first pass, the corner of the angle is located by finding the last pressure value within tolerance (err_threshold) of the bin fit (angle_err=actual−expected pressure). In some examples, it is assumed that the tail will be the last deviation away from the valve stroke curve (e.g., in the stroke portion of the valve stroke curve).

Figure 11B:
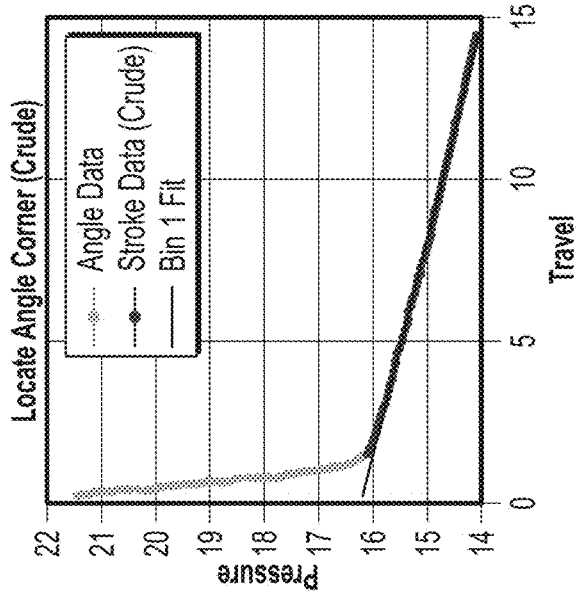
Figure 11B:
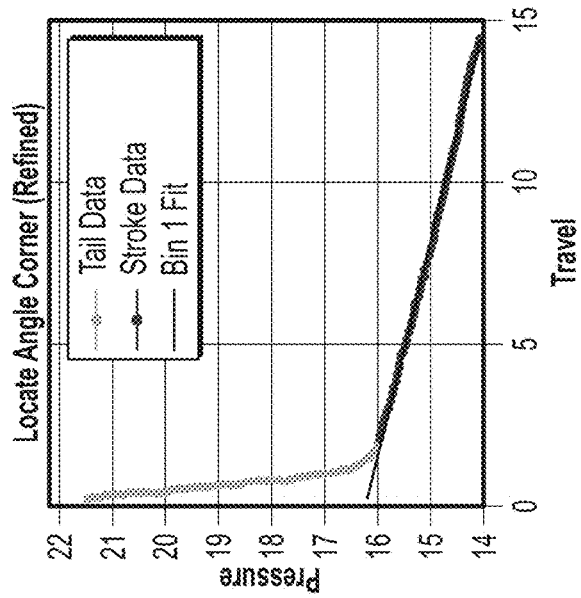

FIG. 11B depicts a refined example determination of angle corner in comparison to the example shown in FIG. 11A. The example of FIG. 11B can be performed as a "second pass" in response to a "first pass" performed in conjunction with the example of FIG. 11A. Alternatively, the example angle corner determination of FIG. 11B can be utilized as a primary/sole determination of the angle corner.

In this example, as a second pass, the angle corner is determined by locating a required number of consecutive samples greater than or less than the observed stroke error based on y_dir (increasing/decreasing). In some examples, a direction can be relevant because some valves can have anomalies in the tail (inverted or none) of the valve stroke curve. As a result, the direction of the error (pos/neg) can be analyzed in determining an operational health/condition of the valve 102.

In an example, for an air-to-open valve, the y_dir will be decreasing into the seat. In some examples, if the count threshold is five, for example, then the first five consecutive points that have pressure values less than their expected stroke pressure values are examined. In other words, their error will be negative (e.g., less than expected/predicted) and below the negative stroke threshold, for example. Alternatively, any other appropriate count threshold (e.g., two, ten, fifty, one hundred, etc.) can be implemented instead.

In some examples, an end of a tail is located (e.g., for a fit). While the end of the tail can have a significant amount of noise and/or irregularities, the end of tail can be defined to be below/above the pressure max/min. In some examples, for flagged tails, all data pertaining to the valve stroke curve can be utilized. The seat load also dictates how much/if any data is ignored (e.g., when the pressure span is less than 1, then utilize all data).

Turning to FIG. 11C, in some examples, indices are assigned for the stroke and tail of the valve stroke curve. In this example, data of the valve stroke curve is divided into tail data, stroke (stroking) data, and ignored data. Further, the stroke data and/or portion is fit with a linear fit (e.g., a linear regression fit) that characterizes pressure with respect to travel.

In the illustrated example of FIG. 11D, example fits of tail portions are shown. In some examples, if the tail is not flagged (e.g., inverted or none), the tail data is fit with a linear curve fit. In this example, the data for the fit is represented as travel versus pressure (e.g., x=pressure and y=travel). Alternatively, in some examples, if the tail is flagged, a curve fit is not performed and, instead, a vertical line for the tail is assumed and/or provided based on a median of the first 10 points for the intercept, for example. However, any appropriate other number points can be implemented instead.

Figure 11E:
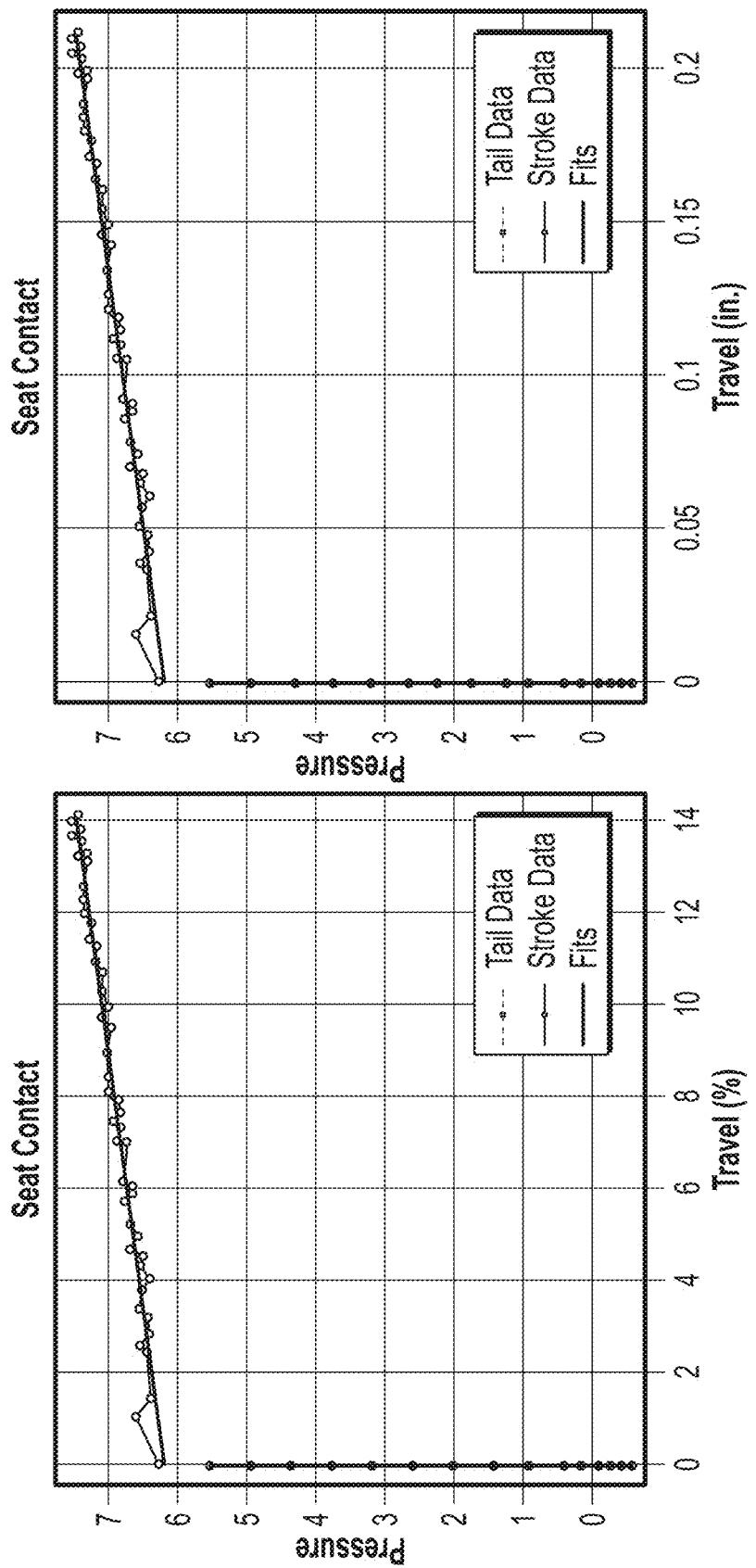

Turning to FIG. 11E, according to examples disclosed herein, angle fits can be performed by the curve fit circuitry 304. To that end, FIG. 11E illustrates an example illustrating how the curve fit circuitry 304 can analyze at least a portion of the valve stroke curve to determine angle fits (e.g., simple angle fits).

In an example simple fit analysis (e.g., for less relevant angles), inputs can include, but are not limited to: 1.) bin_fit (struct)—results from first bin fit (close), 2.) angle_type (string)—[Exit/Contact] whether coming out of or into the angle, 3.) y_dir (string)—[Increasing/Decreasing] defines direction of the pressure into angle, 4.) err_threshold (float)—tolerance for locating angle corner (crude), 5.) fit_type (string)—type of fit linear/quadratic/cubic), and 6.) robust (boolean)—use robust fitting or not. In turn, example output(s) can include an angle_fit (structure) that contains fit results for an angle (e.g. tail and stroke fits, error). In some examples, for the tail fit, x=pressure and y=travel due to fitting a relatively vertical line can be difficult such that a horizontal line can be relatively easier to fit.

In this example, fit results are stored and, in turn, tail and stroke bins are identified by the bin analyzer circuitry 307. In particular, each angle is separated into a tail and stroke portion, for example, and depending on the angle type, the stroke is first followed by the tail or the tail is followed by the stroke. Further, an angle corner (e.g., an exit angle) is located. In the illustrated example, when exiting an angle, the tail bin/segment is first followed by the stroke. Therefore, according to examples disclosed herein, a corner point can be located after locating and/or finding the first point within the error tolerance of the stroke fit, for example. It is noted that some valves can have anomalous tail profiles (e.g., no tail). Particularly, a tail can be missing and/or indistinguishable. In such cases, all the data will be within tolerance and the corner can be assigned at index 1 and corner_idx can be set to index two (e.g., at a single point of the tail). In other words, the data is indexed at an offset from the anomalous tail profile. According to examples disclosed herein, indexing can be utilized to designate a new or shifted endpoint for analysis, for example. However, it is not common to have corner_idx being empty.

According to examples disclosed herein, an end of a tail can be located (e.g., for a fit), such as an exit angle. Because first values of the tail can typically have a relatively large amount of noise, it can be advantageous to define the start of the tail above/below the pressure min/max based on the direction of pressure. For example, if the pressure span is too small, all data can be utilized (start_idx=1). In this example, indices are assigned for a tail and a stroke pertaining to the exit angle. For exit angles, a tail is first and followed by a stroke. This error handling may correspond to encountered noise and/or lack of data in relatively constant travel with changing pressure regions, for example.

In this example, an angle corner (e.g., a contact angle) is determined. For example, when coming in contact (e.g., at a contact angle), the stroke bin/segment is first followed by the tail. Therefore, the corner point is located by finding the last point that is within an error tolerance of the seat (e.g., based on the tail being the next/adjacent point). Some valves can have anomalous tail profiles (e.g., no tail). In such cases, all the data can be within tolerance and, thus, the corner will be at index N, for example. As a result, a corner_idx is set to N-1 (single point in tail). Typically, corner_idx is not empty.

In this example, an end of a tail is located for a fit (e.g., a contact angle fit). Further, indices are assigned for a stroke and a tail (e.g., contact angle). For contact angles, a stroke is followed by a tail. In this example, the stroke portion is fit with a linear fit (pressure vs travel). If the tail contains more than ten samples, for example, the tail is fit using a linear curve fit. However any other appropriate number samples can be utilized instead. In this example, the data for the fit is travel vs pressure (x=pressure and y=travel). Alternatively, if there are less than ten samples in the tail, then it is determined that there are an insufficient number of samples to fit, for example. In such examples, the tail is not fit, a vertical line is utilized and/or generated, instead.

To generate a curve fit for x and y (vectors), examples disclosed herein can utilize the following inputs: 1.) data—data to use for fitting model, assumes two formats: a. (structure) data.x and data.y, b. (matrix) [x y] where each is in its respective columns; 2.) fit_type—(string) type of fit (linear/quadratic/cubic); and 3.) robust—(boolean) use robust fitting or not. In turn, examples disclosed herein can have an output of results, such as data a structure that contains fit data, mdl, estimated values, error, and error (fit) statistics (mean squared error, root mean squared error, etc.).

In some examples, fit error metrics can be applied. The fit error metrics can include inputs such as, but not limited to, data (vector)—fit actual values; err(vector)—fit residuals (error), and N_coefs (scalar)—number of coefficients in the fit. Example outputs include, but are not limited to, err_stats (struct)—fit metrics are field in structure (means square error, mean absolute, etc.), R-squared error, mean squared error, root mean square error, standard deviation (of error), mean absolute error, maximum absolute error, and standard deviation of absolute error.

Figure 12A:
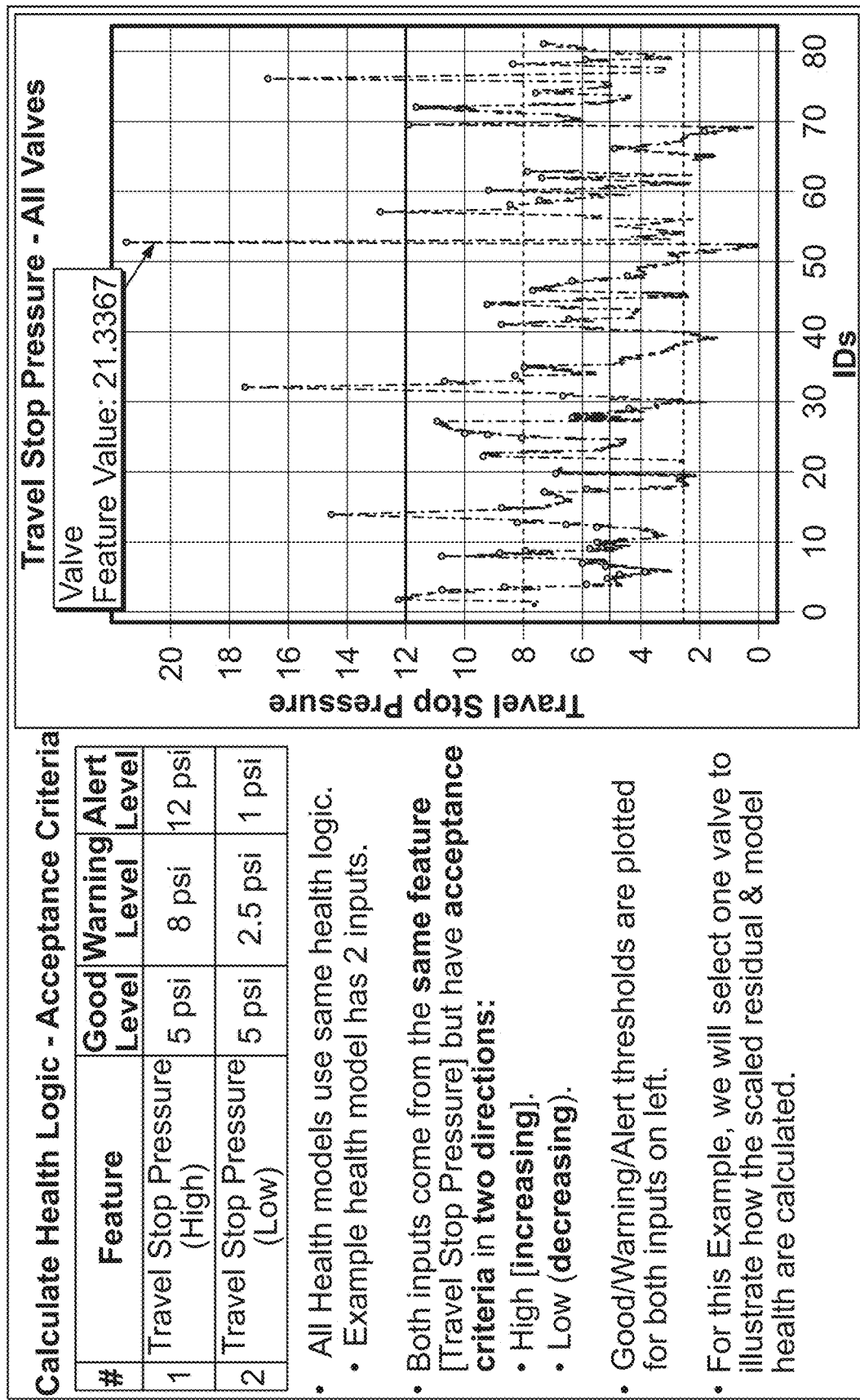
FIGS. 12A-12H illustrate example analyses that can be implemented in examples disclosed herein.

FIGS. 12A-12H illustrate example analyses that can be implemented in examples disclosed herein by the bin analyzer circuitry 307 and/or the condition determiner circuitry 308. Turning to FIG. 12A, example health criteria is shown. In the illustrated example, the health model utilizes two inputs such that both inputs may correspond to the same feature (e.g., travel stop pressure) and can have criteria in multiple (e.g., two) different directions (e.g., high/increasing, low/decreasing, etc.). In other words, multiple criteria can be utilized for each of the directions (e.g., good level, warning level, alert level, etc.). According to examples disclosed herein, model health (e.g., a predicted operational life) can be calculated.

According to examples disclosed herein, scaled residual acceptance (e.g., error normalization) can be implemented. The inputs can be mdl_inputs (vector), which contains features values (model inputs), and mdl (struct), which contains necessary model parameters (input directions, good, warning, and alert levels). Example outputs include residuals (vector)—model inputs—(minus) good levels (not true residuals) and scaled residuals (vector)—scaled residuals for each input corresponding to 0 (good), 0.5 (warn), and 1 (alert). According to examples disclosed herein, model inputs as are regarded and/or taken as inputs but could take the outputs of a machine learning model. For example, neural networks (NN) or Auto-Associative Kernel Regression (AAKR) can be implemented to formulate predictions, which can be utilized as inputs.

In some examples, preprocessing is performed (e.g., from a model). In turn, residuals are calculated such that: (i) Residuals=model inputs–good levels (not true residuals in a sense)' and (ii) Residuals are zeroed if >/<good level dependent on input direction (decreasing/increasing). In some examples, residuals are scaled, which may be based on input direction. Accordingly, subfunctions can be developed. For example, a scaled residual can be calculated based on good (GL), warn (WL), and alert (AL) levels, when acceptance criterion is decreasing. The following pseudocode indicates an example determination of a scaled residual:

```
if isnan (val) || val >= GL
    scaled_val=0;
elseif val >=WL
    scaled_val= (GL-val)/(GL-WL)*0.5;
else
    scaled_val= 0.5 + (WL-val)/(WL-AL)*0.5;
end
```

In some examples, a scaled residual can be calculated based on good (GL), warn (WL), and alert (AL) levels, when acceptance criterion is increasing, for example, as shown in the example pseudocode below:

```
if isnan (val)|| val <= GL
    scaled_val=0;
elseif val <=WL
    scaled_val= (val-GL)/(WL-GL)*0.5;
else
    scaled_val= 0.5 + (val-WL)/(AL-WL)*0.5;
end
```

Figure 12B:
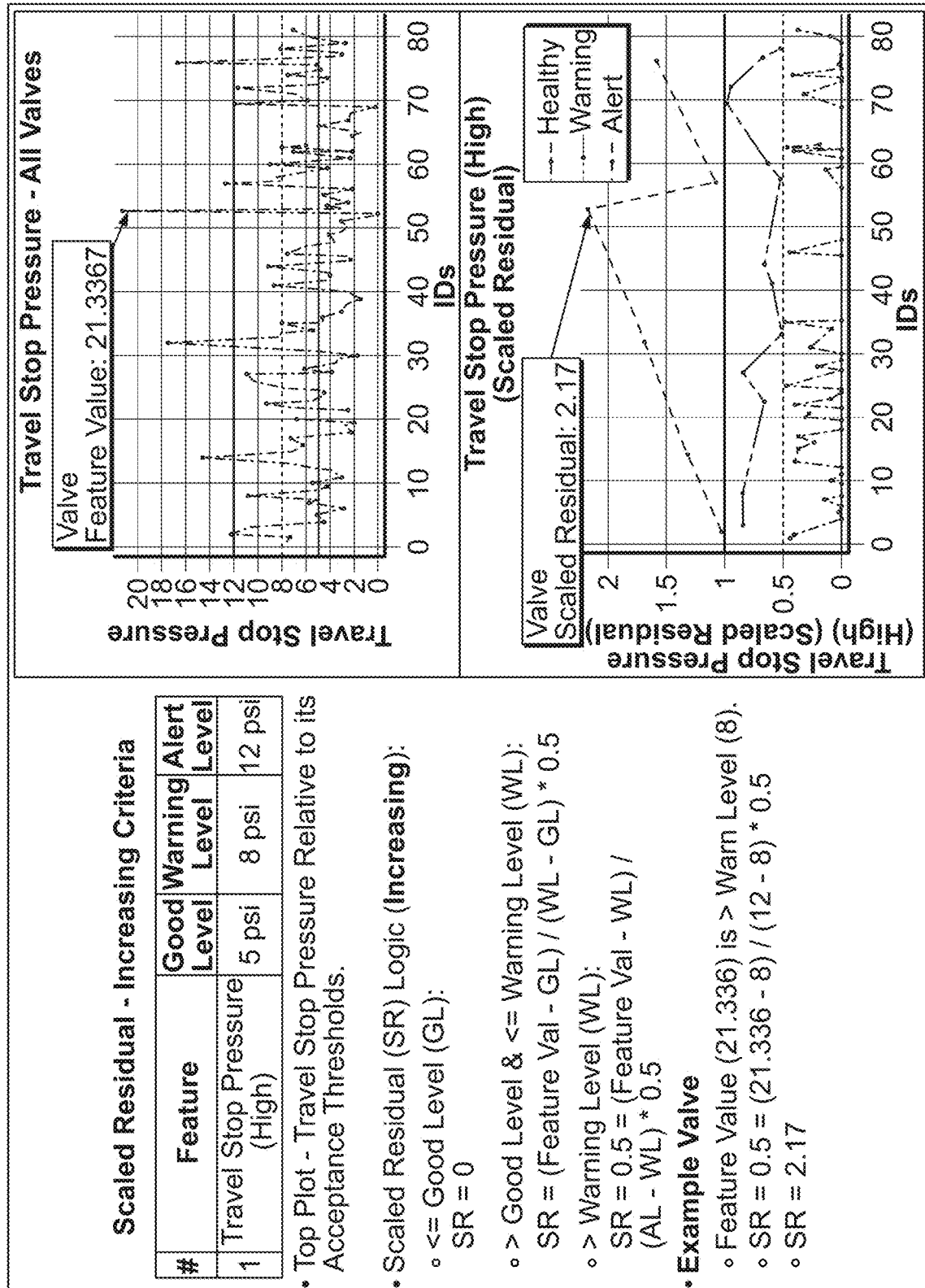

FIG. 12B corresponds to scaled residuals with increasing criteria that can be implemented in examples disclosed herein. In this example, the top plot (in the view of FIG. 12B) corresponds to travel stop pressure relative to acceptance thresholds while the bottom plot corresponds to a scaled residual of travel stop pressure. In the bottom plot, the peak scaled residual corresponds to the peak travel stop pressure shown above. As can be seen in the example of FIG. 12B, scaled residual criteria and/or thresholds can be implemented to characterize and/or determine an overall health of valves.

In this example, a good level corresponds to a scaled residual being approximately 0. In this example, a scaled residual (SR) greater than the good level (i.e., a scaled residual greater than 0) and greater than or equal to a WL (WL) corresponds to Equation 1 below.

$$SR = \frac{(\text{Feature } Val - GL)}{(WL - GL)} * 0.5, \quad (1)$$

where GL=good level, WL=warning level. Further, for warning levels example Equation 2 below can be applicable.

$$SR = 0.5 + \frac{(\text{Feature } Val - WL)}{(AL - WL)} * 0.5 \quad (2)$$

However, any other appropriate equations and/or calculations can be implemented instead. Further, any appropriate scalar values can be implemented instead.

Figure 12C:
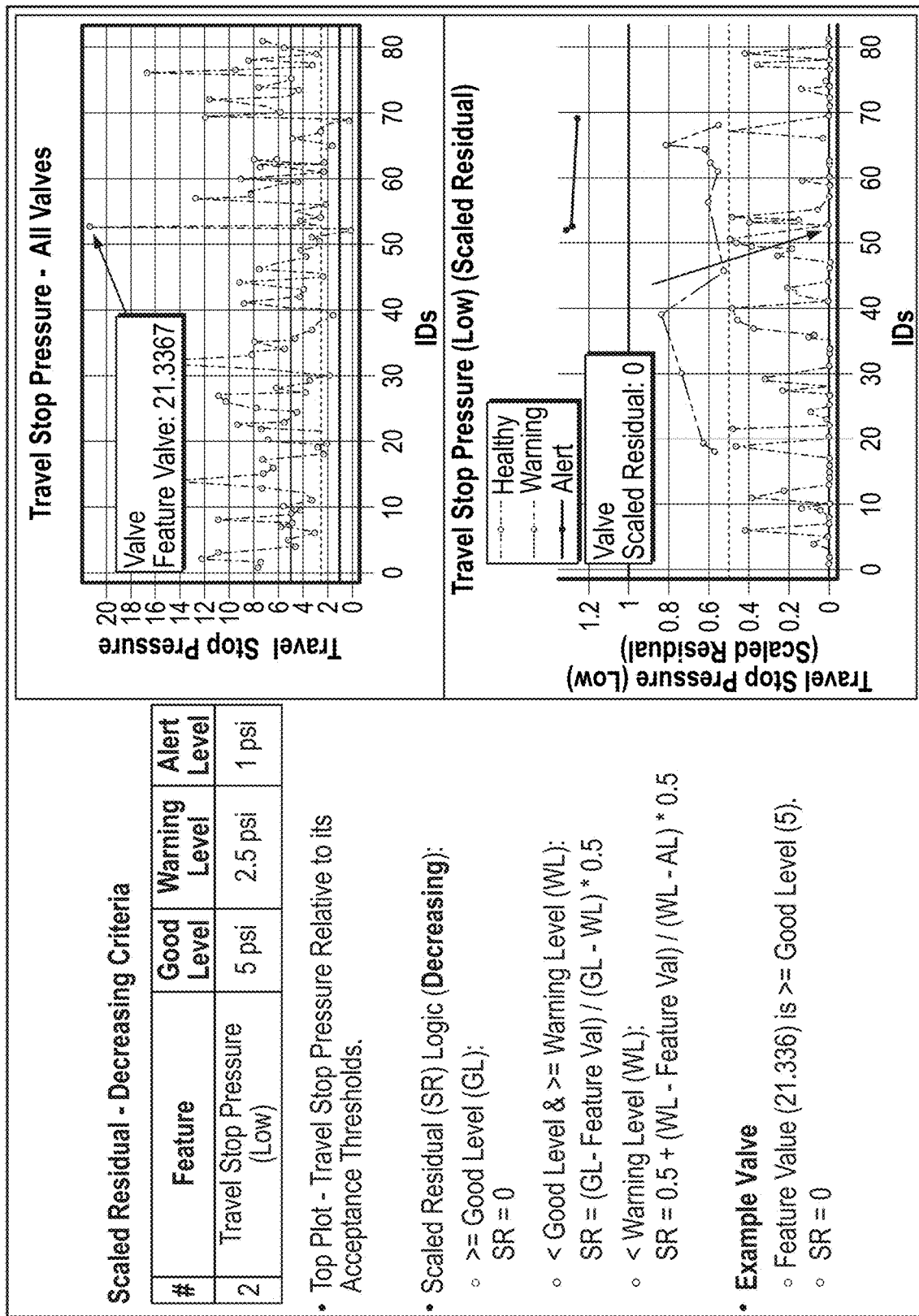

FIG. 12C corresponds to scaled residuals with decreasing criteria that can be implemented in examples disclosed herein. Similar to the example of FIG. 12B, scaled residuals are utilized. The example calculations shown are different from those shown in connection with FIG. 12B.

In this example, a good level corresponds to a scaled residual being approximately 0. Further, a scaled residual (SR) less than the good level (GL) (i.e., a scaled residual value less than 0) and greater than or equal to a warning level (WL) corresponds to example Equation 3 below.

$$SR = \frac{(GL - \text{Feature } Val)}{(GL - WL)} * 0.5, \quad (3)$$

where GL=good level, WL=warning level. Further, for warning levels, example Equation 4 below can be applicable.

$$SR = 0.5 + \frac{(WL - \text{Feature } Val)}{(WL - AL)} * 0.5 \quad (4)$$

However, any other appropriate equations and/or calculations can be implemented instead. Further, any appropriate scalar values can be implemented instead.

Figure 12D:
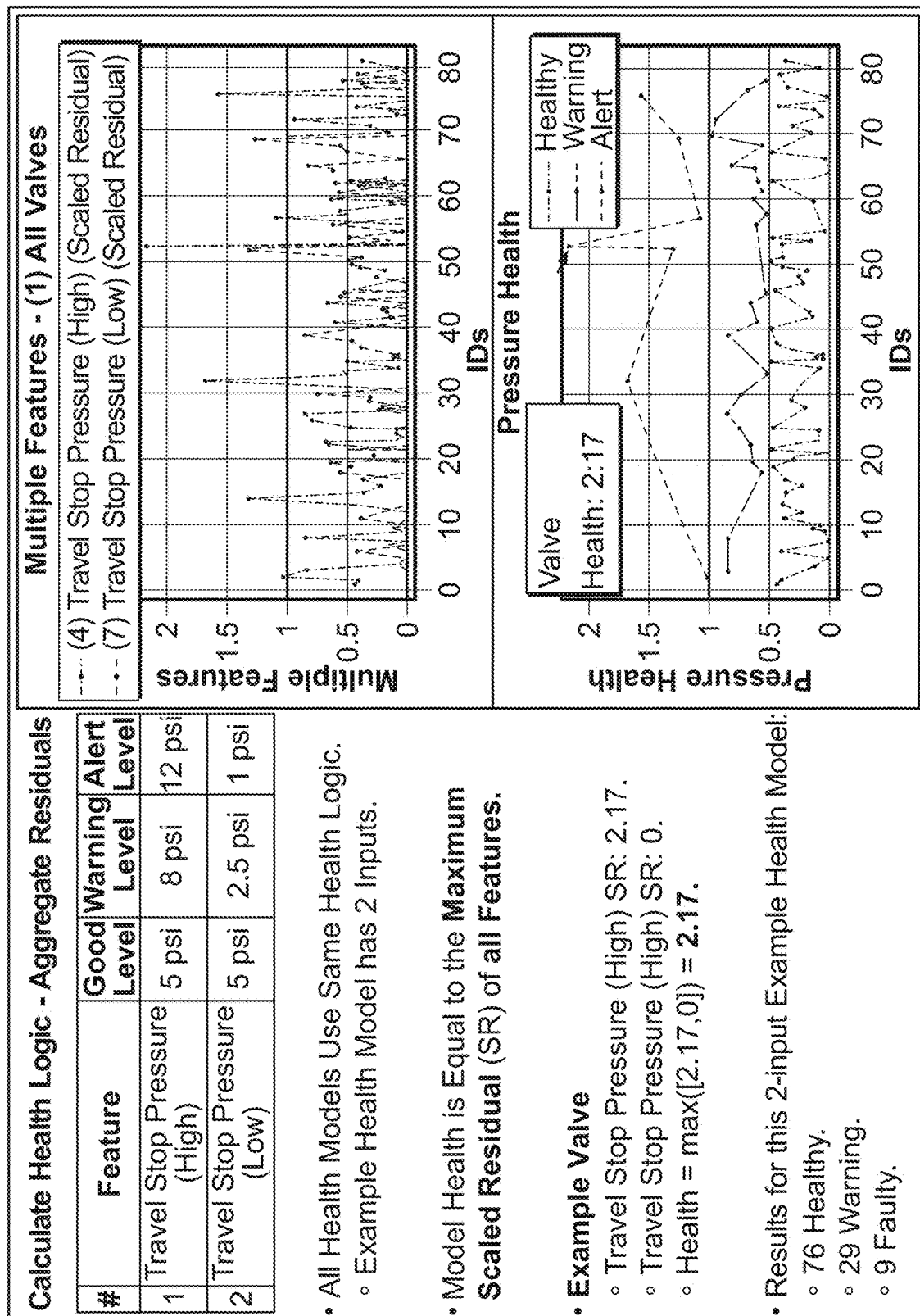

Turning to FIG. 12D, an example analysis of aggregate residuals is shown. In this example, the health model includes two inputs and the model health is equivalent to the maximum scaled residual of all features.

Figure 12E:
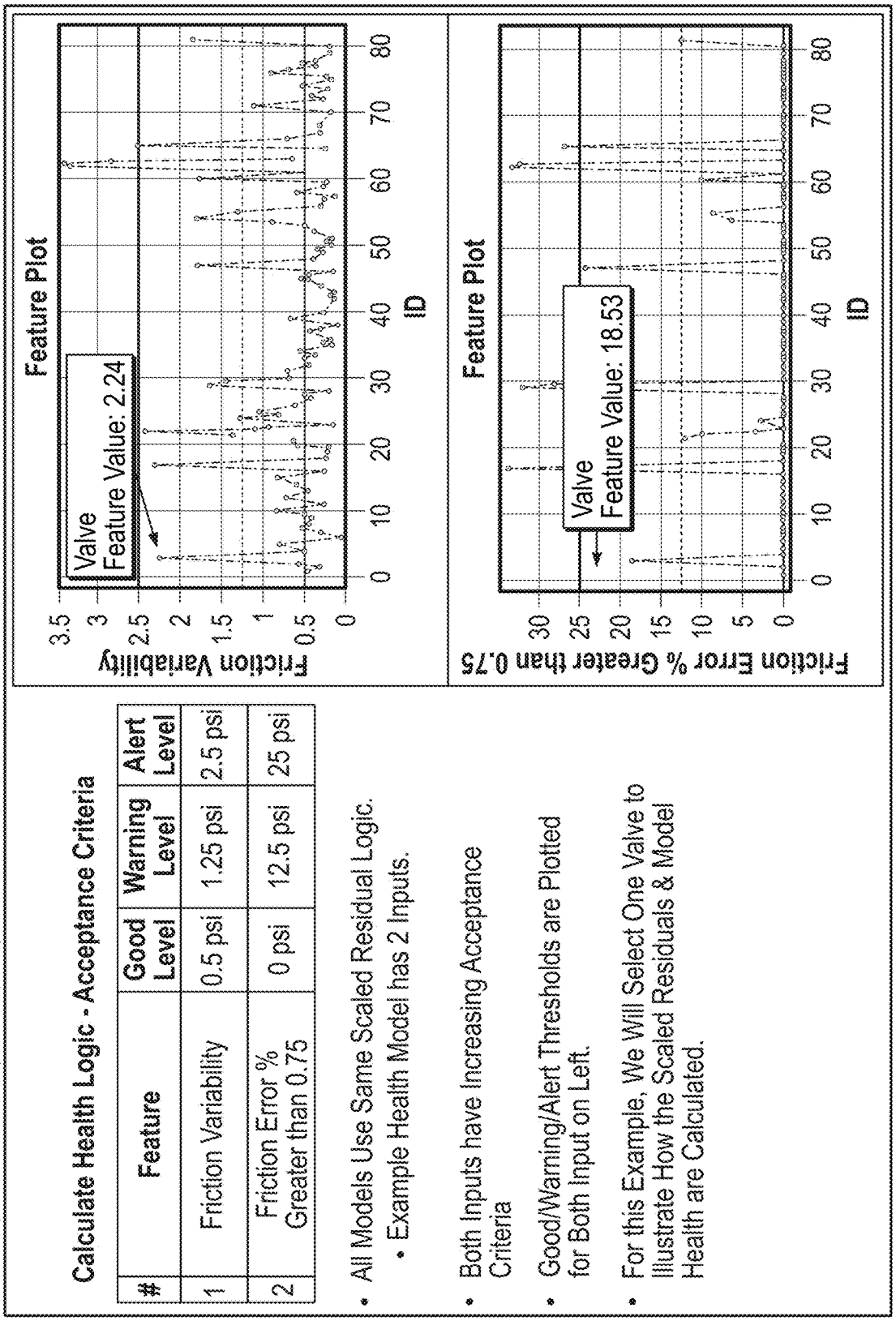

FIG. 12E illustrates utilization of acceptance criteria that can be implemented in examples disclosed herein. According to the example of FIG. 12E, two inputs are utilized for the health model and both inputs have increasing acceptance criteria.

Figure 12F:
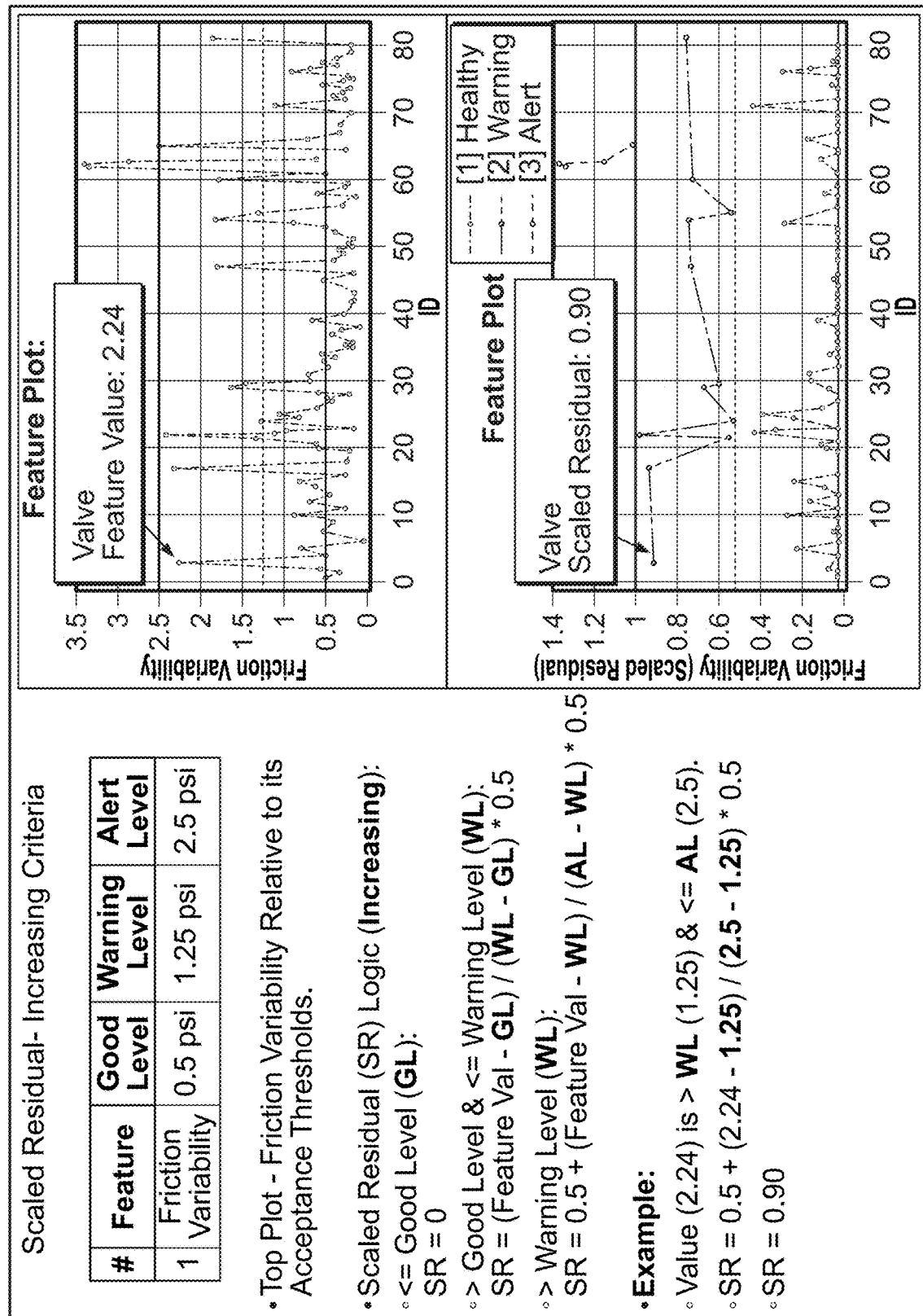

Turning to FIG. 12F another example of a scaled residual with increasing criteria is shown. In this example, the top plot in the view of FIG. 12F corresponds to friction variability relative to acceptance thresholds. In this example, Equations 1 and 2 described above in connection with FIG. 12B can be utilized.

Figure 12G:
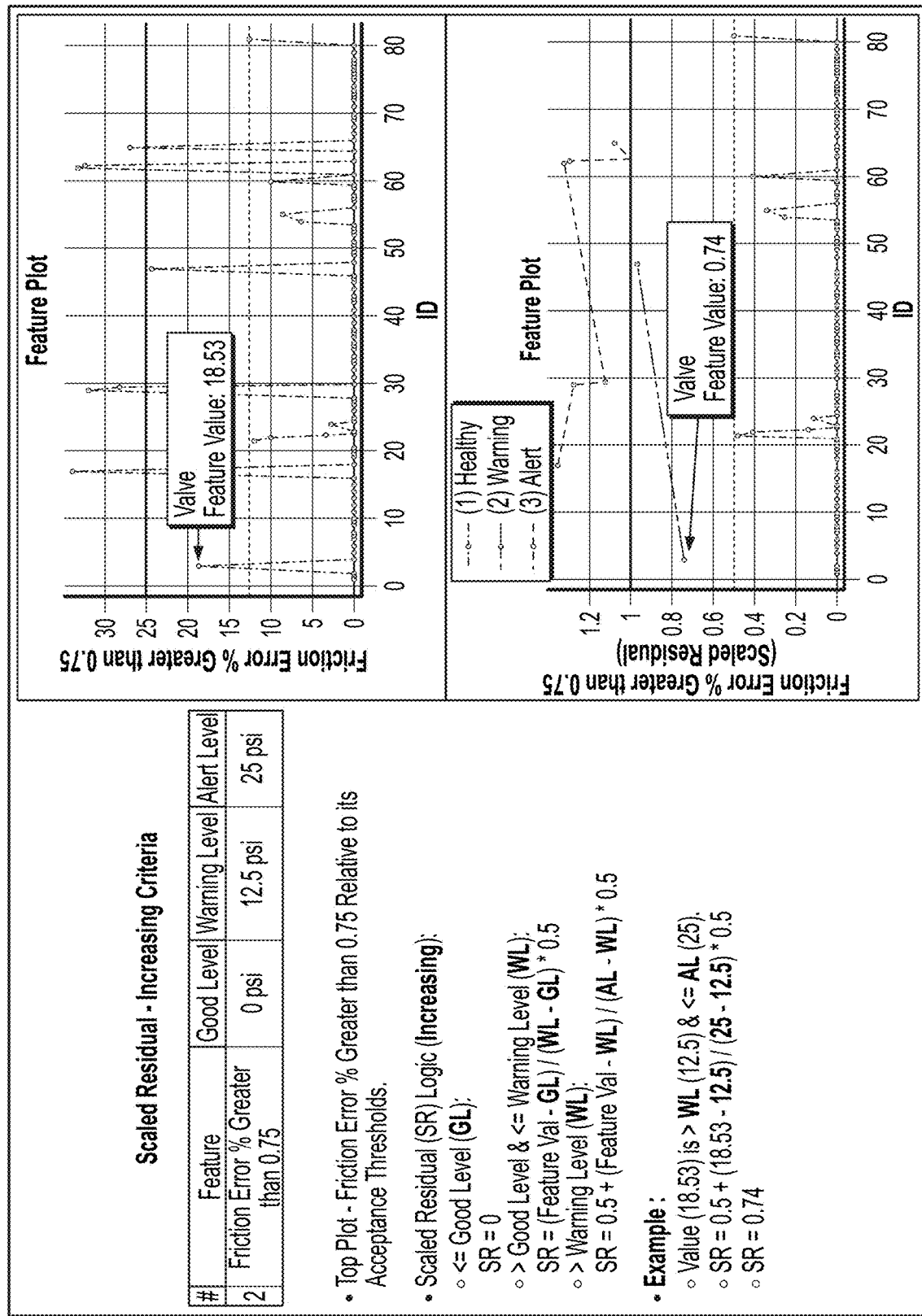

FIG. 12G corresponds to an analysis of scaled residuals with respect to increasing criteria. In this example, the feature corresponds to a friction error percentage that exceeds 0.75 relative to corresponding acceptance thresholds. However, any other appropriate threshold can, instead, be implemented. In this example, Equations 1 and 2 described above in connection with FIG. 12B can be utilized.

Figure 12H:
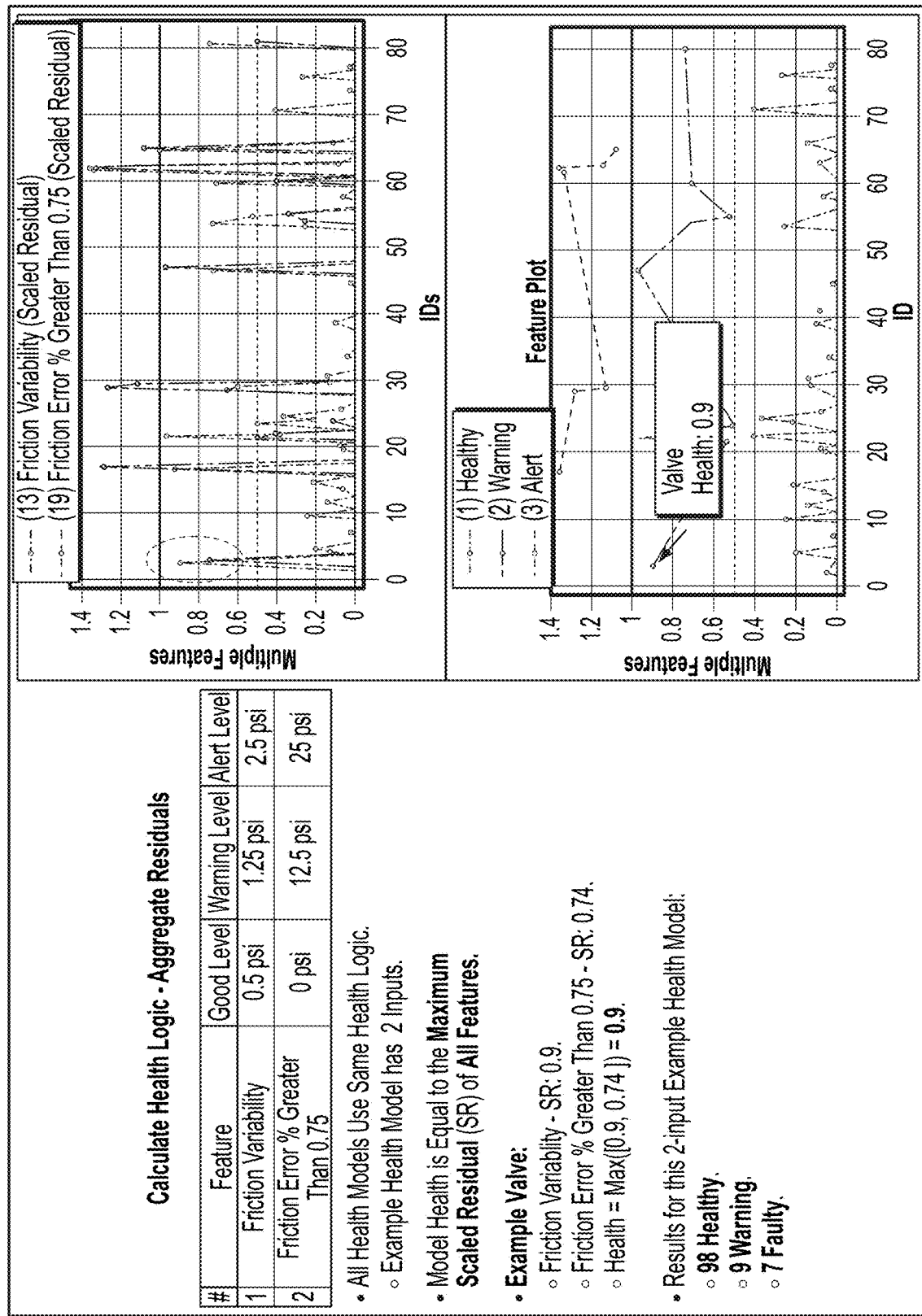

FIG. 12H corresponds to an analysis of aggregate residuals that can be implemented in examples disclosed herein. In the illustrated example, the model health is equal to the maximum scaled residual of all features. In this example, the features analyzed are friction variability and friction error percentage(s) being greater than 0.75.

Figure 13:
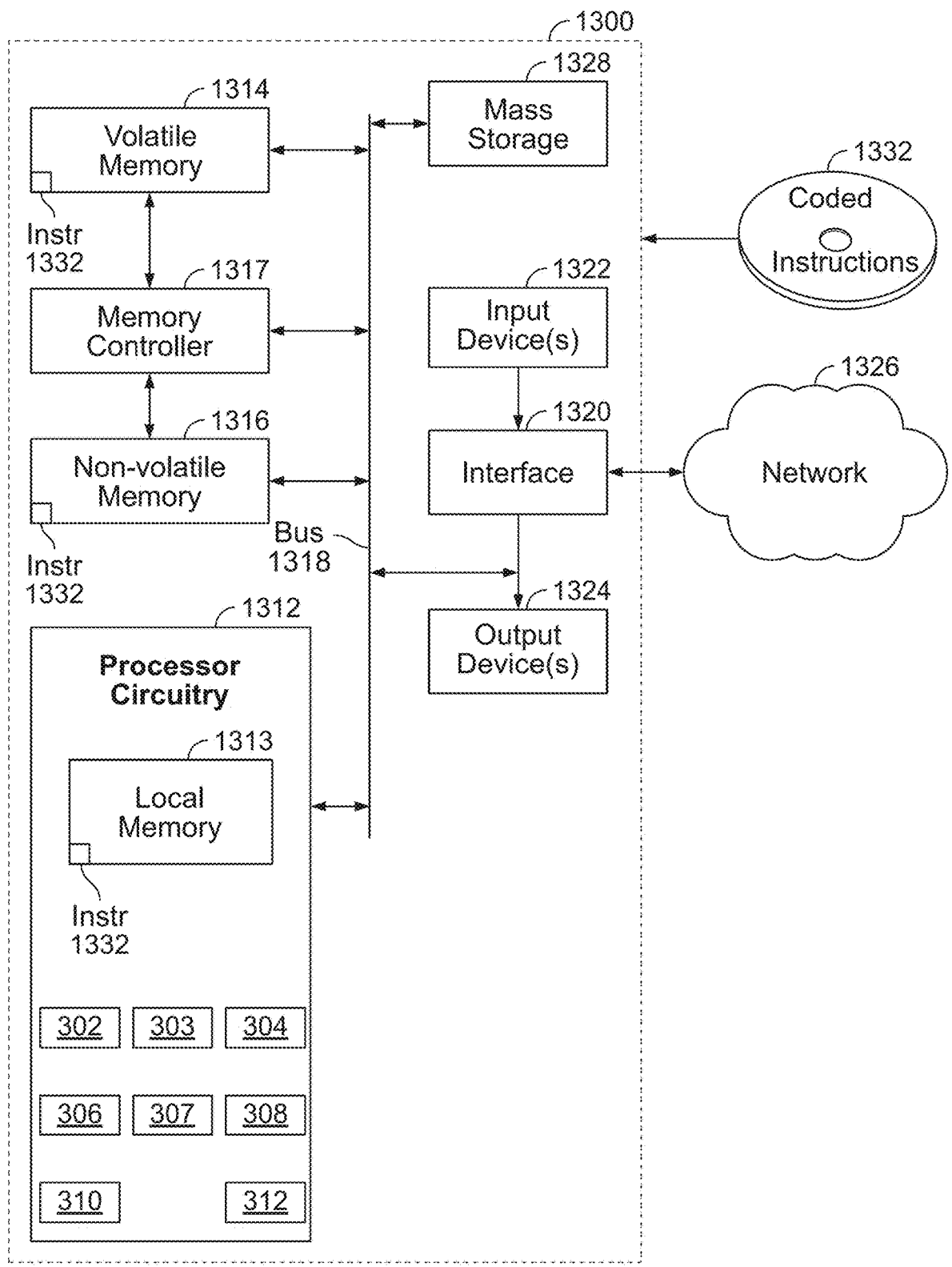
FIG. 13 is a block diagram of an example processing platform including processor circuitry structured to execute the example machine readable instructions and/or the example operations of FIG. 3 to implement the process control analysis system of FIG. 1A and/or the example valve analysis system of FIG. 3.

FIG. 13 is a block diagram of an example processor platform 1300 structured to execute and/or instantiate the machine readable instructions and/or the operations of FIGS. 4A-4C to implement the valve characteristic analyze 300 of FIG. 3. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements the example data processor circuitry 302, the example bin definer circuitry 303, the example curve fit circuitry 304, the example filter circuitry 306, the example bin analyzer circuitry 307, the example condition determiner circuitry 308, and the example actuator characteristic analyzer circuitry 310.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuitry 1320 of the illustrated example. The output device(s) 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1332, which may be implemented by the machine readable instructions of FIGS. 4A-4C, may be stored in the mass storage device 1328, in the volatile memory 1314, in the non-volatile memory 1316, and/or on a removable non-transitory computer readable storage medium such as a CD or DVD.

Figure 14:
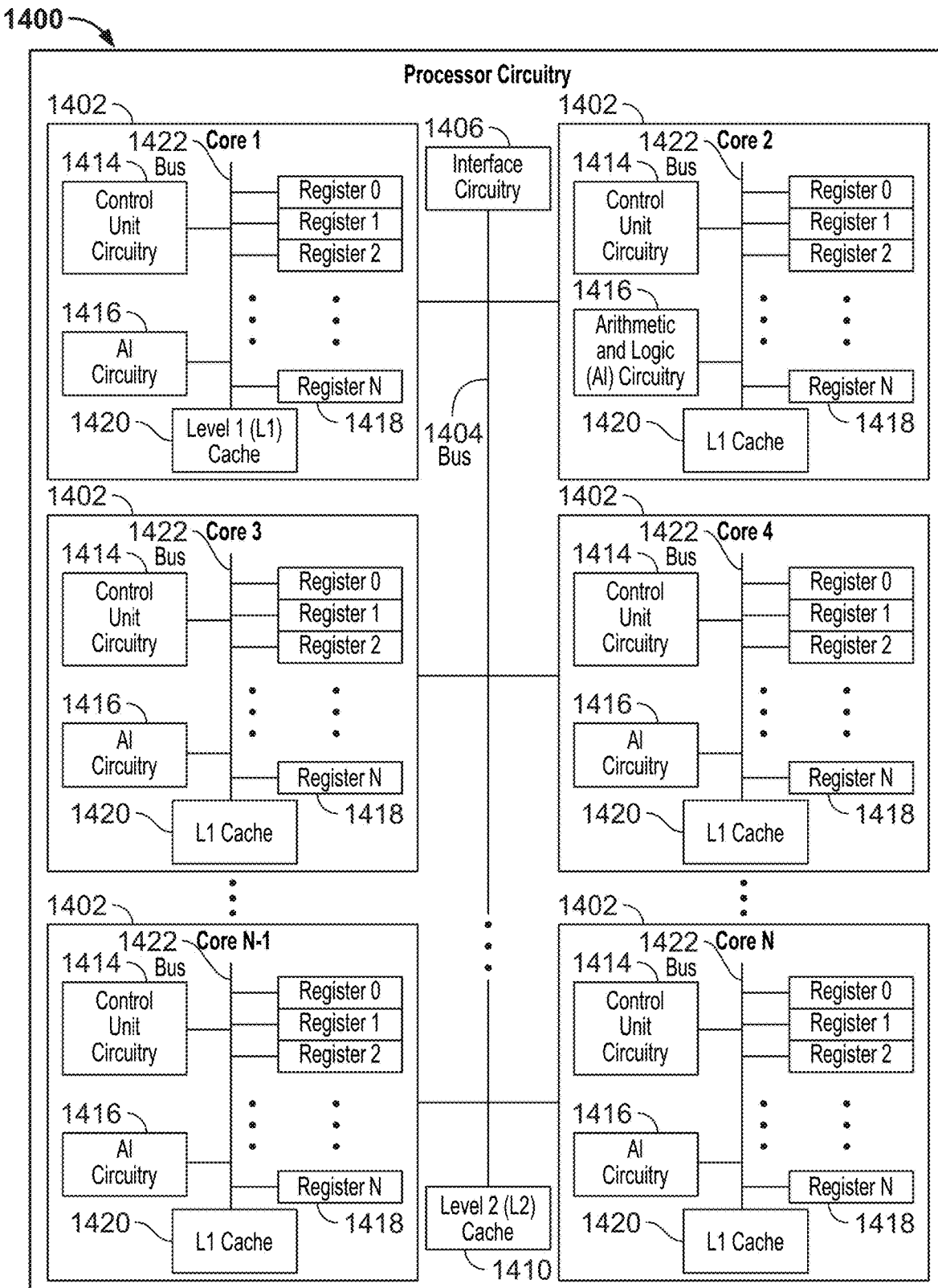
FIG. 14 is a block diagram of an example implementation of the processor circuitry of FIG. 13.

FIG. 14 is a block diagram of an example implementation of the processor circuitry 1312 of FIG. 13. In this example, the processor circuitry 1312 of FIG. 13 is implemented by a microprocessor 1400. For example, the microprocessor 1400 may be a general purpose microprocessor (e.g., general purpose microprocessor circuitry). The microprocessor 1400 executes some or all of the machine readable instructions of the flowcharts of FIGS. 4A-4C to effectively instantiate the circuitry of FIG. 3 as logic circuits to perform the operations corresponding to those machine readable instructions. In some such examples, the circuitry of FIG. 3 is instantiated by the hardware circuits of the microprocessor 1400 in combination with the instructions. For example, the microprocessor 1400 may be implemented by multi-core hardware circuitry such as a CPU, a DSP, a GPU, an XPU, etc. Although it may include any number of example cores 1402 (e.g., 1 core), the microprocessor 1400 of this example is a multi-core semiconductor device including N cores. The cores 1402 of the microprocessor 1400 may operate independently or may cooperate to execute machine readable instructions. For example, machine code corresponding to a firmware program, an embedded software program, or a software program may be executed by one of the cores 1402 or may be executed by multiple ones of the cores 1402 at the same or different times. In some examples, the machine code corresponding to the firmware program, the embedded software program, or the software program is split into threads and executed in parallel by two or more of the cores 1402. The software program may correspond to a portion or all of the machine readable instructions and/or operations represented by the flowcharts of FIGS. 4A-4C.

The cores 1402 may communicate by a first example bus 1404. In some examples, the first bus 1404 may be implemented by a communication bus to effectuate communication associated with one(s) of the cores 1402. For example, the first bus 1404 may be implemented by at least one of an Inter-Integrated Circuit (I2C) bus, a Serial Peripheral Interface (SPI) bus, a PCI bus, or a PCIe bus. Additionally or alternatively, the first bus 1404 may be implemented by any other type of computing or electrical bus. The cores 1402 may obtain data, instructions, and/or signals from one or more external devices by example interface circuitry 1406. The cores 1402 may output data, instructions, and/or signals to the one or more external devices by the interface circuitry 1406. Although the cores 1402 of this example include example local memory 1420 (e.g., Level 1 (L1) cache that may be split into an L1 data cache and an L1 instruction cache), the microprocessor 1400 also includes example shared memory 1410 that may be shared by the cores (e.g., Level 2 (L2 cache)) for high-speed access to data and/or instructions. Data and/or instructions may be transferred (e.g., shared) by writing to and/or reading from the shared memory 1410. The local memory 1420 of each of the cores 1402 and the shared memory 1410 may be part of a hierarchy of storage devices including multiple levels of cache memory and the main memory (e.g., the main memory 1314, 1316 of FIG. 13). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1402 may be referred to as a CPU, DSP, GPU, etc., or any other type of hardware circuitry. Each core 1402 includes control unit circuitry 1414, arithmetic and logic (AL) circuitry (sometimes referred to as an ALU) 1416, a plurality of registers 1418, the local memory 1420, and a second example bus 1422. Other structures may be present. For example, each core 1402 may include vector unit circuitry, single instruction multiple data (SIMD) unit circuitry, load/store unit (LSU) circuitry, branch/jump unit circuitry, floating-point unit (FPU) circuitry, etc. The control unit circuitry 1414 includes semiconductor-based circuits structured to control (e.g., coordinate) data movement within the corresponding core 1402. The AL circuitry 1416 includes semiconductor-based circuits structured to perform one or more mathematic and/or logic operations on the data within the corresponding core 1402. The AL circuitry 1416 of some examples performs integer based operations. In other examples, the AL circuitry 1416 also performs floating point operations. In yet other examples, the AL circuitry 1416 may include first AL circuitry that performs integer based operations and second AL circuitry that performs floating point operations. In some examples, the AL circuitry 1416 may be referred to as an Arithmetic Logic Unit (ALU).

The registers 1418 are semiconductor-based structures to store data and/or instructions such as results of one or more of the operations performed by the AL circuitry 1416 of the corresponding core 1402. For example, the registers 1418 may include vector register(s), SIMD register(s), general purpose register(s), flag register(s), segment register(s), machine specific register(s), instruction pointer register(s), control register(s), debug register(s), memory management register(s), machine check register(s), etc. The registers 1418 may be arranged in a bank as shown in FIG. 14. Alternatively, the registers 1418 may be organized in any other arrangement, format, or structure including distributed throughout the core 1402 to shorten access time. The second bus 1422 may be implemented by at least one of an I2C bus, a SPI bus, a PCI bus, or a PCIe bus Each core 1402 and/or, more generally, the microprocessor 1400 may include additional and/or alternate structures to those shown and described above. For example, one or more clock circuits, one or more power supplies, one or more power gates, one or more cache home agents (CHAs), one or more converged/common mesh stops (CMS s), one or more shifters (e.g., barrel shifter(s)) and/or other circuitry may be present. The microprocessor 1400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators may include ASICs as those discussed herein. Accelerators may be on-board the processor circuitry, in the same chip package as the processor circuitry and/or in one or more separate packages from the processor circuitry.

Figure 15:
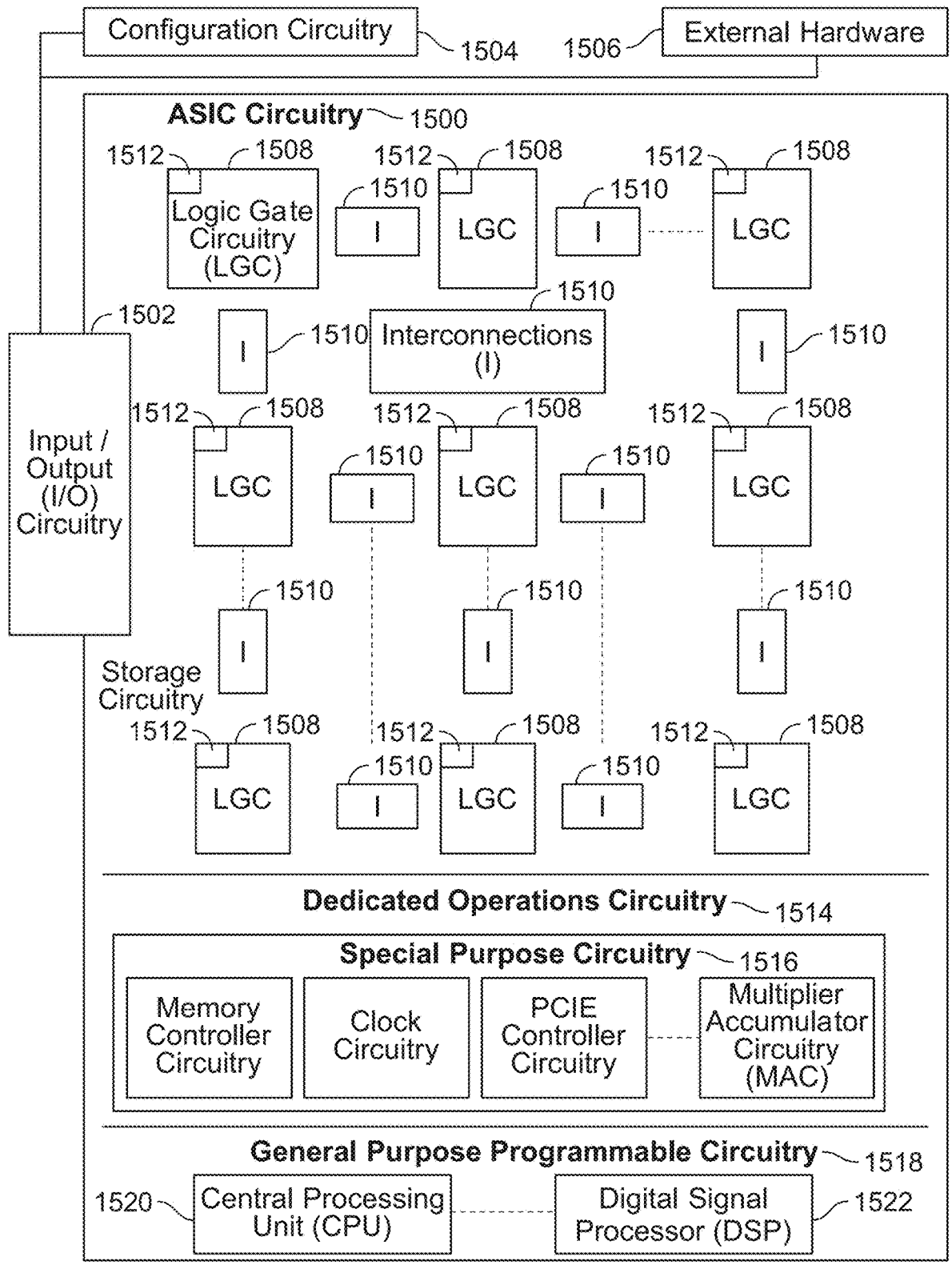
FIG. 15 is a block diagram of another example implementation of the processor circuitry of FIG. 13.

FIG. 15 is a block diagram of another example implementation of the processor circuitry 1312 of FIG. 13. In this example, the processor circuitry 1312 is implemented by ASIC circuitry 1500. For example, the ASIC circuitry 1500 may be implemented by an FPGA. The ASIC circuitry 1500 can be used, for example, to perform operations that could otherwise be performed by the example microprocessor 1400 of FIG. 14 executing corresponding machine readable instructions. However, once configured, the ASIC circuitry 1500 instantiates the machine readable instructions in hardware and, thus, can often execute the operations faster than they could be performed by a general purpose microprocessor executing the corresponding software.

More specifically, in contrast to the microprocessor 1400 of FIG. 14 described above (which is a general purpose device that may be programmed to execute some or all of the machine readable instructions represented by the flowcharts of FIGS. 4A-4C but whose interconnections and logic circuitry are fixed once fabricated), the ASIC circuitry 1500 ASIC circuitry 1500 of the example of FIG. 15 includes interconnections and logic circuitry that may be configured and/or interconnected in different ways after fabrication to instantiate, for example, some or all of the machine readable instructions represented by the flowcharts of FIGS. 4A-4C. In particular, the ASIC circuitry 1500 may be thought of as an array of logic gates, interconnections, and switches. The switches can be programmed to change how the logic gates are interconnected by the interconnections, effectively forming one or more dedicated logic circuits (unless and until the ASIC circuitry 1500 ASIC circuitry 1500 is reprogrammed). The configured logic circuits enable the logic gates to cooperate in different ways to perform different operations on data received by input circuitry. Those operations may correspond to some or all of the software represented by the flowcharts of FIGS. 4A-4C. As such, the ASIC circuitry 1500 may be structured to effectively instantiate some or all of the machine readable instructions of the flowcharts of FIGS. 4A-4C as dedicated logic circuits to perform the operations corresponding to those software instructions in a dedicated manner analogous to an ASIC. Therefore, the ASIC circuitry 1500 may perform the operations corresponding to the some or all of the machine readable instructions of FIGS. 4A-4C faster than the general purpose microprocessor can execute the same.

In the example of FIG. 15, the ASIC circuitry 1500 is structured to be programmed (and/or reprogrammed one or more times) by an end user by a hardware description language (HDL) such as Verilog. The ASIC circuitry 1500 of FIG. 15, includes example input/output (I/O) circuitry 1502 to obtain and/or output data to/from example configuration circuitry 1504 and/or external hardware 1506. For example, the configuration circuitry 1504 may be implemented by interface circuitry that may obtain machine readable instructions to configure the ASIC circuitry 1500, or portion(s) thereof. In some such examples, the configuration circuitry 1504 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1506 may be implemented by external hardware circuitry. For example, the external hardware 1506 may be implemented by the microprocessor 1400 of FIG. 14. The ASIC circuitry 1500 also includes an array of example logic gate circuitry 1508, a plurality of example configurable interconnections 1510, and example storage circuitry 1512. The logic gate circuitry 1508 and the configurable interconnections 1510 are configurable to instantiate one or more operations that may correspond to at least some of the machine readable instructions of FIGS. 4A-4C and/or other desired operations. The logic gate circuitry 1508 shown in FIG. 15 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1508 to enable configuration of the electrical structures and/or the logic gates to form circuits to perform desired operations. The logic gate circuitry 1508 may include other electrical structures such as look-up tables (LUTs), registers (e.g., flip-flops or latches), multiplexers, etc.

The configurable interconnections 1510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1508 to program desired logic circuits.

The storage circuitry 1512 of the illustrated example is structured to store result(s) of the one or more of the operations performed by corresponding logic gates. The storage circuitry 1512 may be implemented by registers or the like. In the illustrated example, the storage circuitry 1512 is distributed amongst the logic gate circuitry 1508 to facilitate access and increase execution speed.

The example ASIC circuitry 1500 of FIG. 15 also includes example Dedicated Operations Circuitry 1514. In this example, the Dedicated Operations Circuitry 1514 includes special purpose circuitry 1516 that may be invoked to implement commonly used functions to avoid the need to program those functions in the field. Examples of such special purpose circuitry 1516 include memory (e.g., DRAM) controller circuitry, PCIe controller circuitry, clock circuitry, transceiver circuitry, memory, and multiplier-accumulator circuitry. Other types of special purpose circuitry may be present. In some examples, the ASIC circuitry 1500 may also include example general purpose programmable circuitry 1518 such as an example CPU 1520 and/or an example DSP 1522. Other general purpose programmable circuitry 1518 may additionally or alternatively be present such as a GPU, an XPU, etc., that can be programmed to perform other operations.

Although FIGS. 14 and 15 illustrate two example implementations of the processor circuitry 1312 of FIG. 13, many other approaches are contemplated. For example, as mentioned above, modern ASIC circuitry may include an on-board CPU, such as one or more of the example CPU 1520 of FIG. 15. Therefore, the processor circuitry 1312 of FIG. 13 may additionally be implemented by combining the example microprocessor 1400 of FIG. 14 and the example ASIC circuitry 1500 of FIG. 15. In some such hybrid examples, a first portion of the machine readable instructions represented by the flowcharts of FIGS. 4A-4C may be executed by one or more of the cores 1402 of FIG. 14, a second portion of the machine readable instructions represented by the flowcharts of FIGS. 4A-4C may be executed by the ASIC circuitry 1500 of FIG. 15, and/or a third portion of the machine readable instructions represented by the flowcharts of FIGS. 4A-4C may be executed by an ASIC. It should be understood that some or all of the circuitry of FIG. 3 may, thus, be instantiated at the same or different times. Some or all of the circuitry may be instantiated, for example, in one or more threads executing concurrently and/or in series. Moreover, in some examples, some or all of the circuitry of FIG. 3 may be implemented within one or more virtual machines and/or containers executing on the microprocessor.

In some examples, the processor circuitry 1312 of FIG. 13 may be in one or more packages. For example, the microprocessor 1400 of FIG. 14 and/or the ASIC circuitry 1500 of FIG. 15 may be in one or more packages. In some examples, an XPU may be implemented by the processor circuitry 1312 of FIG. 13, which may be in one or more packages.

Figure 16:
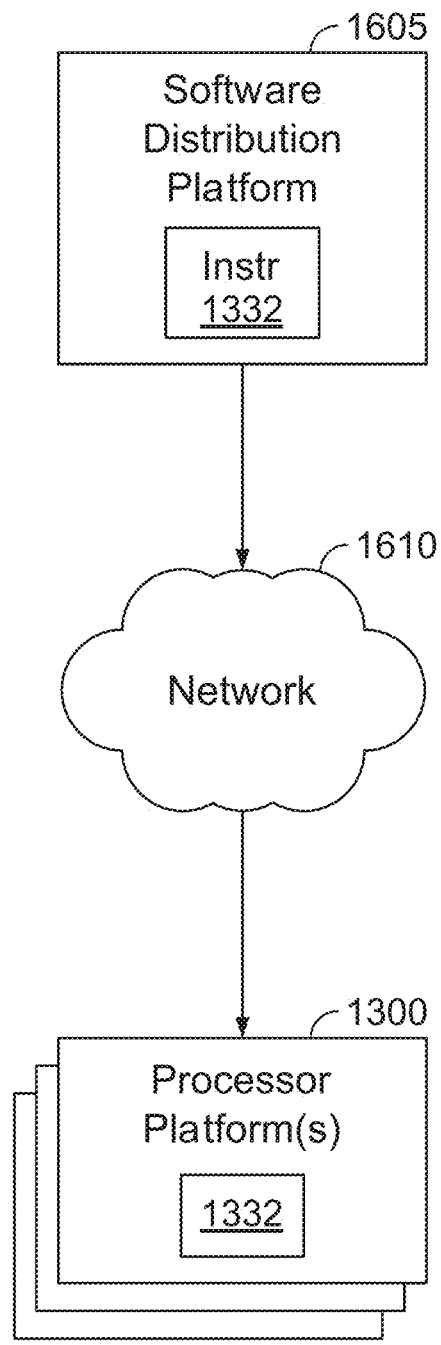
FIG. 16 is a block diagram of an example software distribution platform (e.g., one or more servers) to distribute software (e.g., software corresponding to the example machine readable instructions of FIGS. 4A-4D) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1605 to distribute software such as the example machine readable instructions 1332 of FIG. 13 to hardware devices owned and/or operated by third parties is illustrated in FIG. 16. The example software distribution platform 1605 may be implemented by any computer server, data facility, cloud service, etc., capable of storing and transmitting software to other computing devices. The third parties may be customers of the entity owning and/or operating the software distribution platform 1605. For example, the entity that owns and/or operates the software distribution platform 1605 may be a developer, a seller, and/or a licensor of software such as the example machine readable instructions 1332 of FIG. 13. The third parties may be consumers, users, retailers, OEMs, etc., who purchase and/or license the software for use and/or re-sale and/or sub-licensing. In the illustrated example, the software distribution platform 1605 includes one or more servers and one or more storage devices. The storage devices store the machine readable instructions 1332, which may correspond to the example machine readable instructions 400, 412, 412' of FIGS. 4A-4C, as described above. The one or more servers of the example software distribution platform 1605 are in communication with an example network 1610, which may correspond to any one or more of the Internet and/or any of the example networks 112 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1332 from the software distribution platform 1605. For example, the software, which may correspond to the example machine readable instructions 400, 412, 412' of FIGS. 4A-4C, may be downloaded to the example processor platform 1300, which is to execute the machine readable instructions 1332 to implement the example valve characteristic analyzer 300. In some examples, one or more servers of the software distribution platform 1605 periodically offer, transmit, and/or force updates to the software (e.g., the example machine readable instructions 1332 of FIG. 13) to ensure improvements, patches, updates, etc., are distributed and applied to the software at the end user devices.

Example methods, apparatus, systems, and articles of manufacture to enable effective characterization of valves are disclosed herein. Further examples and combinations thereof include the following:

Example 1 includes an apparatus to determine at least one characteristic of a valve, the apparatus comprising at least one memory, machine readable instructions, and processor circuitry to at least one of instantiate or execute the machine readable instructions to partition a valve stroke curve of the valve to define bins thereof, the valve stroke curve corresponding to stroke data of the valve, filter data points associated with a seat contact portion of the valve stroke curve, fit curves of the bins to define fitted curves, and characterize a seat contact of the valve based on the fitted curves.

Example 2 includes the apparatus as defined in example 1, wherein the processor circuitry is to execute the instructions to at least one of instantiate or execute the machine readable instructions to determine a seat contact distance corresponding to the fitted curves to characterize the seat contact.

Example 3 includes the apparatus as defined in example 2, wherein the processor circuitry is to execute the instructions to at least one of instantiate or execute the machine readable instructions to calculate a seat contact slope, and wherein the characterization of the seat contact is at least partially based on the seat contact distance and the seat contact slope.

Example 4 includes the apparatus as defined in any of examples 2 or 3, wherein the processor circuitry is to at least one of instantiate or execute the machine readable instructions to determine a health of the valve based on the seat contact distance.

Example 5 includes the apparatus as defined in any of examples 1 to 4, wherein the processor circuitry is to at least one of instantiate or execute the machine readable instructions to calculate a seat contact slope to determine a health index of the valve.

Example 6 includes the apparatus as defined in any of examples 1 to 5, wherein the processor circuitry is to at least one of instantiate or execute the machine readable instructions to generate at least one portion of the valve stroke curve based on the seat contact.

Example 7 includes the apparatus as defined in any of examples 1 to 6, wherein the processor circuitry is to at least one of instantiate or execute the machine readable instructions to identify a seat load region, a seat contact region and a stroking region of the valve stroke curve.

Example 8 includes a non-transitory machine readable storage medium comprising instructions that, when executed, cause processor circuitry to at least partition a valve stroke curve of a valve to define bins of the valve stroke curve, the valve stroke curve corresponding to stroke data of the valve, filter data points associated with a seat contact portion of the valve stroke curve, fit curves of the bins to define fitted curves, and characterize a seat contact of the valve based on the fitted curves.

Example 9 includes the non-transitory machine readable storage medium as defined in example 8, wherein the instructions are to cause the processor circuitry to determine a seat contact distance corresponding to the fitted curves.

Example 10 includes the non-transitory machine readable storage medium as defined in example 9, wherein the instructions are to cause the processor circuitry to calculate a seat contact slope, and wherein the characterization of the seat contact is at least partially based on the seat contact distance and the seat contact slope.

Example 11 includes the non-transitory machine readable storage medium as defined in any of examples 9 or 10, wherein the instructions are to cause the processor circuitry to determine a health of the valve based on the seat contact distance.

Example 12 includes the non-transitory machine readable storage medium as defined in any of examples 8 to 11, wherein the instructions are to cause the processor circuitry to calculate a seat contact slope to determine a health index of the valve.

Example 13 includes the non-transitory machine readable storage medium as defined in any of examples 8 to 12, wherein the instructions are to cause the processor circuitry to generate at least one portion of the valve stroke curve based on the seat contact.

Example 14 includes the non-transitory machine readable storage medium as defined in any of examples 8 to 13, wherein the instructions are to cause the processor circuitry to define a seat load region, a seat contact region and a stroking region of the valve stroke curve.

Example 15 includes a method comprising partitioning, by executing instructions with processor circuitry, a valve stroke curve of a valve to define bins of the valve stroke curve, the valve stroke curve corresponding to stroke data of the valve, filtering, by executing instructions with the processor circuitry, data points associated with a seat contact portion of the valve stroke curve, fitting, by executing instructions with the processor circuitry, curves of the bins to define fitted curves, and characterizing, by executing instructions with the processor circuitry, a seat contact of the valve based on the fitted curves.

Example 16 includes the method as defined in example 15, further including determining, by executing instructions with the processor circuitry, a seat contact distance corresponding to the fitted curves.

Example 17 includes the method as defined in example 16, further including calculating, by executing instructions with the processor circuitry, a seat contact slope, and wherein the characterization of the seat contact is at least partially based on the seat contact distance and the seat contact slope.

Example 18 includes the method as defined in any of examples 16 or 17, further including determining, by executing instructions with the processor circuitry, a health of the valve based on the seat contact distance.

Example 19 includes the method as defined in any of examples 15 to 18, wherein the instructions are to cause the processor circuitry to calculate a seat contact slope to determine a health index of the valve.

Example 20 includes the method as defined in any of examples 15 to 19, further including generating, by executing instructions with the processor circuitry, at least one portion of the valve stroke curve based on the seat contact.

Example 21 includes the method as defined in any of examples 15 to 20, further including defining, by executing instructions with the processor circuitry, a seat load region, a seat contact region and a stroking region of the valve stroke curve.

From the foregoing, it will be appreciated that example systems, methods, apparatus, and articles of manufacture have been disclosed that enable accurate characterization of process control devices, such as valves and actuators, for example. Examples disclosed herein can enable extraction of features, as well as effective determination of health/operational conditions of the process control devices. Examples disclosed herein can also enable accurate monitoring of operational process control device, thereby enabling the process control device to be replaced prior to non-preferred operation, unexpected wear and/or failure thereof. Disclosed systems, methods, apparatus, and articles of manufacture improve the efficiency of using a computing device by processing data associated with process control devices to improve analysis thereof, thereby saving computational and time resources. Disclosed systems, methods, apparatus, and articles of manufacture are accordingly directed to one or more improvement(s) in the operation of a machine such as a computer or other electronic and/or mechanical device.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to determine at least one characteristic of a valve, the apparatus comprising:
    machine readable instructions; and
    programmable circuitry to execute the machine readable instructions to:
        partition a valve stroke curve of the valve to define bins thereof, the valve stroke curve corresponding to stroke data of the valve,
        filter data points associated with a seat contact portion of the valve stroke curve,
        fit curves of the bins to define separate fitted curves based on the filtered data points, wherein ones of the fitted curves correspond to ones of the respective bins,
        characterize a seat contact of the valve based on the separate fitted curves, and
        adjust operation of the valve based on the characterized seat contact.

2. The apparatus as defined in claim 1, wherein the programmable circuitry is to execute the instructions to at least one of instantiate or execute the machine readable instructions to determine a seat contact distance corresponding to the fitted curves to characterize the seat contact.

3. The apparatus as defined in claim 2, wherein the programmable circuitry is to execute the instructions to at least one of instantiate or execute the machine readable instructions to calculate a seat contact slope, and wherein the characterization of the seat contact is at least partially based on the seat contact distance and the seat contact slope.

4. The apparatus as defined in claim 2, wherein the programmable circuitry is to at least one of instantiate or execute the machine readable instructions to determine a health of the valve based on the seat contact distance.

5. The apparatus as defined in claim 1, wherein the programmable circuitry is to at least one of instantiate or execute the machine readable instructions to calculate a seat contact slope to determine a health index of the valve.

6. The apparatus as defined in claim 1, wherein the programmable circuitry is to at least one of instantiate or execute the machine readable instructions to generate at least one portion of the valve stroke curve based on the seat contact.

7. The apparatus as defined in claim 1, wherein the programmable circuitry is to at least one of instantiate or execute the machine readable instructions to identify a seat load region, a seat contact region and a stroking region of the valve stroke curve.

8. A non-transitory machine readable storage medium comprising instructions that, when executed, cause programmable circuitry to at least:
partition a valve stroke curve of a valve to define bins of the valve stroke curve, the valve stroke curve corresponding to stroke data of the valve;
filter data points associated with a seat contact portion of the valve stroke curve;
fit curves of the bins to define separate fitted curves based on the filtered data points, wherein ones of the fitted curves correspond to ones of the respective bins; and
characterize a seat contact of the valve based on the separate fitted curves, and
adjust operation of the valve based on the characterized seat contact.

9. The non-transitory machine readable storage medium as defined in claim 8, wherein the instructions are to cause the programmable circuitry to determine a seat contact distance corresponding to the fitted curves.

10. The non-transitory machine readable storage medium as defined in claim 9, wherein the instructions are to cause the programmable circuitry to calculate a seat contact slope, and wherein the characterization of the seat contact is at least partially based on the seat contact distance and the seat contact slope.

11. The non-transitory machine readable storage medium as defined in claim 9, wherein the instructions are to cause the programmable circuitry to determine a health of the valve based on the seat contact distance.

12. The non-transitory machine readable storage medium as defined in claim 8, wherein the instructions are to cause the programmable circuitry to calculate a seat contact slope to determine a health index of the valve.

13. The non-transitory machine readable storage medium as defined in claim 8, wherein the instructions are to cause the programmable circuitry to generate at least one portion of the valve stroke curve based on the seat contact.

14. The non-transitory machine readable storage medium as defined in claim 8, wherein the instructions are to cause the programmable circuitry to define a seat load region, a seat contact region and a stroking region of the valve stroke curve.

15. A method comprising:
partitioning, by executing instructions with programmable circuitry, a valve stroke curve of a valve to define bins of the valve stroke curve, the valve stroke curve corresponding to stroke data of the valve;
filtering, by executing instructions with the programmable circuitry, data points associated with a seat contact portion of the valve stroke curve;
fitting, by executing instructions with the programmable circuitry, curves of the bins to define separate fitted curves based on the filtered data points, wherein ones of the fitted curves correspond to ones of the respective bins;
characterizing, by executing instructions with the programmable circuitry, a seat contact of the valve based on the separate fitted curves; and
adjusting, by executing instructions with the programmable circuitry, operation of the valve based on the characterized seat contact.

16. The method as defined in claim 15, further including determining, by executing instructions with the programmable circuitry, a seat contact distance corresponding to the fitted curves.

17. The method as defined in claim 16, further including calculating, by executing instructions with the programmable circuitry, a seat contact slope, and wherein the characterization of the seat contact is at least partially based on the seat contact distance and the seat contact slope.

18. The method as defined in claim 16, further including determining, by executing instructions with the programmable circuitry, a health of the valve based on the seat contact distance.

19. The method as defined in claim 15, wherein the instructions are to cause the programmable circuitry to calculate a seat contact slope to determine a health index of the valve.

20. The method as defined in claim 15, further including generating, by executing instructions with the programmable circuitry, at least one portion of the valve stroke curve based on the seat contact.

21. The method as defined in claim 15, further including defining, by executing instructions with the programmable circuitry, a seat load region, a seat contact region and a stroking region of the valve stroke curve.

* * * * *